United States Patent
Hasegawa et al.

(10) Patent No.: US 7,489,907 B2
(45) Date of Patent: Feb. 10, 2009

(54) TRANSMITTER FOR SUPPRESSING A VARIATION IN INPUT LEVEL OF A MULTICARRIER SIGNAL

(75) Inventors: Norio Hasegawa, Tokyo (JP); Tetsuhiko Miyatani, Tokyo (JP); Hisashi Kawai, Tokyo (JP); Masami Yoshida, Tokyo (JP); Jun Watanabe, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 173 days.

(21) Appl. No.: 10/532,338

(22) PCT Filed: Oct. 20, 2003

(86) PCT No.: PCT/JP03/13370

§ 371 (c)(1),
(2), (4) Date: Mar. 13, 2006

(87) PCT Pub. No.: WO2004/038973

PCT Pub. Date: May 6, 2004

(65) Prior Publication Data

US 2006/0189282 A1    Aug. 24, 2006

(30) Foreign Application Priority Data

Oct. 23, 2002    (JP)    ............................ 2002-307907

(51) Int. Cl.
*H04B 1/00*    (2006.01)
*H04B 7/00*    (2006.01)

(52) U.S. Cl. ...................... 455/69; 455/63.1; 455/67.11; 455/67.13; 455/67.14; 455/127.1; 455/114.3; 455/115.1; 455/115.3; 455/522

(58) Field of Classification Search ................ 455/63.1, 455/67.11, 67.13, 67.14, 127.1, 114.3, 115.1, 455/115.3, 69, 522
See application file for complete search history.

(56) References Cited

U.S. PATENT DOCUMENTS 6,931,239 B2 *    8/2005    Hongo et al. ................ 455/103

(Continued)

FOREIGN PATENT DOCUMENTS

JP    11-313042    11/1999

(Continued)

*Primary Examiner*—Nay A Maung
*Assistant Examiner*—Ping Y. Hsieh
(74) *Attorney, Agent, or Firm*—Jacobson Holman PLLC

(57) ABSTRACT

A transmitter for averagedly suppressing the variation in input level of an amplifier according to variation in carrier level. The transmitter includes an input power calculation section for calculating mean input power of each carrier, an output power calculating section for calculating mean output power of each carrier after the carrier band is limited, a monitoring section for identifying a carrier having the maximum mean input power, acquiring the maximum value, acquiring the mean output power of the identified carrier, determining the ratio of the mean input power to the mean output power, and calculating level control information which is the ratio of the ratio determined above to a predetermined expected value, and a signal level adjusting section for adjusting the level of a multicarrier signal by multiplying the level control information outputted from the monitoring section.

4 Claims, 35 Drawing Sheets

U.S. PATENT DOCUMENTS

| | | | |
|---|---|---|---|
| 7,020,447 B2 * | 3/2006 | Nagatani et al. | 455/114.3 |
| 7,068,980 B2 * | 6/2006 | Seo et al. | 455/91 |
| 7,203,247 B2 * | 4/2007 | Bauder et al. | 375/296 |
| 7,295,815 B1 * | 11/2007 | Wright et al. | 455/91 |
| 2001/0007435 A1 * | 7/2001 | Ode et al. | 330/149 |
| 2002/0065095 A1 * | 5/2002 | Kobayashi et al. | 455/522 |

FOREIGN PATENT DOCUMENTS

| | | |
|---|---|---|
| JP | 2001-251148 | 9/2001 |
| JP | 2002-044054 | 2/2002 |
| JP | 2002-305489 | 10/2002 |

* cited by examiner

TRANSMITTER FOR SUPPRESSING A VARIATION IN INPUT LEVEL OF A MULTICARRIER SIGNAL

This is a nationalization of PCT/JP03/013370 filed Oct. 20, 2003 and published in Japanese.

TECHNICAL FIELD

The present invention relates to a transmitter of a multicarrier signal, and more specifically, it relates to a transmitter that, for multiple carriers, can averagedly suppress a variation in input level of a multicarrier signal to an amplifier according to a variation in input level of each carrier.

BACKGROUND ART

Generally, in a base station device (CDMA base station device) having a mobile communication system which adopts W-CDMA (Wideband Code Division Multiple Access) scheme as a mobile communication scheme, it is necessary to cause a radio signal to reach a remote mobile station device (CDMA mobile station device). Thus, there is need for transmitting and outputting a signal to be transmitted having been highly amplified by an amplifier.

The amplifier, which is an analog device, exhibits nonlinear input/output characteristics. In particular, the output power level of the amplifier becomes almost constant even when the input power level of the amplifier increases beyond an amplification limit referred to as a saturation point. Such nonlinear output leads to a nonlinear distortion in the output signal.

Typically, signal components outside of a desired signal band are suppressed to a low level by a band-pass filter before a transmission signal is amplified. However, after the transmission signal is amplified at the amplifier, the amplified signal exhibits a nonlinear distortion, entailing the leakage of signal components of the amplified signal into undesired signal bands (adjacent channels).

For example, since the transmission power level at the base station can be high as described above, the level of the leakage power into the adjacent channels need be suppressed below a certain strictly defined level. To this end, techniques for reducing adjacent channel leakage power (ACP) have been used.

As one of the techniques, a technique in which a peak limiter for limiting the maximum power (peak) of the signal to be transmitted to output the maximum power limited signal is introduced at a front end of the amplifier and the maximum power (peak) limited signal is used as an input signal of the amplifier.

As a CDMA base station transmitter having the peak limiter, in Japanese Patent Laid-Open No. 2002-44054 on Feb. 8, 2002 (Applicant: HITACHI INTERNATIONAL ELECTRIC INCORPORATED, and Inventor: SASAKI KOHEI), 'Combination Carrier Transmission Circuit with Limiter Circuit' has been suggested.

In the combination carrier transmission circuit with limiter circuit, when a multicarrier is transmitted from the base station, the ratio of instantaneous power to mean power is calculated as an instantaneous peak factor, based on a signal obtained by multiplexing all of the carriers with the limiter circuit (peak limiter). The instantaneous peak factor is compared to a peak factor threshold value which is a reference value. Based on the comparison result, a limit factor suitable for the extent that clipping is needed is outputted. Then, by multiplying the limit factor for each carrier, the peak is limited. Thus, the dynamic range of the amplifier which amplifies the multicarrier can be effectively utilized and the bit error rate in the mobile station can be reduced without unnecessarily limiting the peak. (Patent Document 1)

As Patent Document 1, Japanese Patent Laid-Open No. 2002-44054 (P. 5 to 7 and FIG. 1) is exemplified.

The conventional peak limiter suppresses the maximum power of the input signal to the amplifier. Thus, for the input signal, the mean power of the input signal and the instantaneous power of the input signal are detected. From information of the mean power and information of the instantaneous power, it is detected whether there exists a peak to be power-limited, so that peak detection information is outputted. Then, according to the peak detection information, the peak to be power-limited is detected. In this case, the power level of the input signal may be limited to predetermined limit power level and the output signal limited to the limit power level may be outputted. As a result, the signal limited to the limit power level may be inputted to the amplifier.

Further, in a transmitter which handles multiple carriers, a multicarrier signal in which the multiple carriers are multiplexed (combined) is inputted to the amplifier. Thus, the peak limiter calculates the instantaneous power and the mean power after the carriers are multiplexed and, based on these values, performs the detection of whether there exists the peak to be power-limited.

Here, as a detection method of whether there exists the peak to be power-limited, a method in which the ratio between the instantaneous power and the mean power of the input signal is calculated and, when it is larger than the predetermined peak factor threshold value, judges the peak of the input signal as the peak to be power-limited can be considered. Here, the peak factor is the ratio between the maximum power and the mean power of the input signal of the amplifier as shown in FIG. 8. That is, the smaller the difference of the maximum power from the mean power is, the smaller the peak factor is. FIG. 8 is an explanatory view of the peak factor of a general amplifier.

Typically, the input signal input to the peak limiter is a baseband signal before the band limitation and, after the limiter process is performed by the peak limiter, the band is limited by a filter. Thus, the distortion in the amplifier does not occur. Further, since the peak value of the input signal is limited by the peak limiter, the peak factor of the input signal becomes small. Therefore, the operating point of the amplifier that performs amplification after the band limitation can be raised, which results in enhancing power efficiency.

Here, since the band is limited after the limiter is performed by the peak limiter, the peak factor after the band limitation typically is larger than the peak factor before the band limitation. This is because a rectangular wave before the band limitation becomes obtuse after the band limitation and a point at which the peak becomes high is present. Here, the predetermined peak factor threshold value of the peak limiter needs to be set low in consideration that the peak factor after the band limitation becomes large.

However, in a general CDMA base station transmitter, there is a problem, when the peak limitation (suppression) is performed for the multiple carriers, if the input level of the carrier varies, the level after the peak limitation varies.

As described above, when the peak limitation of the multiple carriers is performed, the peak limiter calculates the instantaneous power and the mean power based on the input level after multiplexing each carrier, that is, the sum of the power levels of the carriers and compares the ratio between the instantaneous power and the mean power to the peak factor threshold value to detect whether or not there exist the peak, and performs the peak limitation for each carrier.

In the peak limiter, the peak factor threshold value is optimized when the respective carriers have the maximum output and the same level. However, when all carriers do not have the maximum output and the same level, the peak suppression is performed. Further, in general, the peak factor threshold value is determined depending on the number of the carriers.

That is, the peak limitation in a peak power suppressing section (peak limiter) of a general transmitter performs the peak power suppression equally for each carrier at a uniform suppression ratio when the peak is detected based on the sum of the power levels of the carriers, on the assumption that, for the device configuration, the carrier signals exist in all of the multi input carriers and the respective carrier signals have the same level. Accordingly, desired peak suppression is achieved with the sum of the power levels of all of the multiple carriers. As a result, the peak factor for the multicarrier becomes small.

When such a peak power suppressing section is used for the transmitter, if the input level of an identified carrier temporarily varies abruptly, the peak limitation (suppression) is performed for all carriers, so that the level after the peak limitation varies. As a result, there is a problem in that the level of the multicarrier signal after the combination varies.

Here, when the input level of any carrier varies while the peak factor threshold value is fixed, the sum of the power levels of the carriers varies. Thus, the peak limitation by the peak limiter is not optimized and the power deviation occurs. That is, the level of the multicarrier signal varies within the range of ±0.3 dB.

Further, when the input level of the identified carrier is constant, if the input levels of all other carriers vary, the sum of the power levels of the carriers also varies. Accordingly, the peak limitation by the peak limiter is not optimized and the power deviation occurs. That is, the level of the carrier having the constant input level varies after the limitation. The power deviation depends on the number of the carriers. When the total number of the carriers is two, the level of the carrier varies within the range of ±0.3 dB, and when the total number of the carriers is four, the level of the carrier varies within the range of ±1.2 dB.

That is, in the case of the general transmitter, when the input level of the identified carrier abruptly varies, the sum of the power levels of the carriers also abruptly varies. Accordingly, even when the mean power does not vary significantly, the instantaneous power becomes abruptly large and the peak factor becomes large, so that the peak is detected. As a result, uniform peak suppression is performed for all carriers and a carrier the input level of which does not vary is greatly influenced by the peak suppression. Therefore, there occurs a first problem in that power is totally lowered and the level of the multicarrier signal is lowered.

Further, for example, when any carrier among the multiple carriers is interrupted, the input level of the identified carrier among operating carriers abruptly varies. Further, when the peak factor of the peak limiter becomes large and the peak is detected, the peak suppression is uniformly performed at the suppression rate on an assumption that all of the carriers including the interrupted carrier have the same level. Accordingly, when any carrier is interrupted, the suppression rate is not sufficient in the peak limiter. Therefore, there occurs a second problem in that the level of the multicarrier signal cannot be sufficiently lowered.

Further, in the peak power suppressing section, as described above, the peak factor threshold value is set low in consideration of a peak which is caused by subsequent band limitation (waveform shaping filter). Thus, there occurs a third problem in that the peak suppression unnecessarily operates in the circuit at the present state.

On the other hand, in the W-CDMA communication scheme, the power control is realized such that the output difference in the transmitter of the base station is equivalent to 0.1 dB or 0.5 dB. However, in the above-described transmitter, the number of the transmission carriers and the input level of each carrier increase or decrease due to the above-described problems. Accordingly, the peak limitation is not sufficiently performed or the peak limitation is excessively performed so that the level is excessively suppressed. As a result, there is a problem in that the output difference according to the rules cannot be achieved.

The present invention has been made in consideration of the above-described problems, and it is an object of the present invention to provide a transmitter that can averagedly suppress a variation in input level of a multicarrier signal to an amplifier according to an increase or decrease in the number of the transmission carriers or a variation in input level of each carrier.

DISCLOSURE OF THE INVENTION

According to the present invention, there is provided a transmitter comprising a peak suppressing section for detecting whether there exists a peak based on the level of a signal inputted and outputting a level suppressed signal when the peak is detected, an input power calculating section for calculating the level of the signal before the signal is inputted to the peak suppressing section, and an output power calculating section for calculating the level of the level suppressed signal after the level suppressed signal is outputted from the peak suppressing section. The transmitter further has an adjusting unit for controlling the signal level of a signal to be outputted such that the signal level of the signal is adjusted based on the level calculated by the input power calculating section and the level calculated by the output power calculating section.

Further, according to the present invention, there is provided a transmitter which adjusts the signal level of a multicarrier signal obtained by combining multiple carriers. The transmitter comprises a peak suppressing section for detecting whether there exists a peak based on the sum of power levels of input carriers and outputting the carriers the power levels of which are suppressed such that the sum of the power levels is smaller than a predetermined peak threshold value when the peak is detected, an input power calculating section for calculating a mean power level for each carrier before the carriers are inputted to the peak suppressing section, an output power calculating section for calculating a mean power level for each carrier after the carriers are outputted from the peak suppressing section, a monitoring section for outputting level control information which controls the signal level of the multicarrier signal based on the mean power level calculated by the input power calculating section and the mean power level calculated by the output power calculating section, and a level adjusting section for adjusting the level of the multicarrier signal based on the level control information outputted from the monitoring section.

Further, according to the present invention, there is provided a transmitter which controls the signal level of a multicarrier signal obtained by combining multiple carriers such that the signal level of the multicarrier signal is adjusted. The transmitter comprises a peak suppressing section for detecting whether there exists a peak based on the sum of power levels of input carriers and outputting the carriers the power levels of which are suppressed such that the sum of the power levels is smaller than a predetermined peak threshold value when the peak is detected, an input power calculating section for calculating a mean power level for each carrier before the carriers are inputted to the peak suppressing section, an output power calculating section for calculating a mean power level for each carrier after the carriers are outputted from the peak suppressing section, a monitoring section for outputting level control information which controls the signal level of each carrier outputted from the peak suppressing section based on the mean power level calculated by the input power calculating section and the mean power level calculated by the output power calculating section for each carrier, and a level adjusting section for adjusting the level of each carrier based on the corresponding level control information for each carrier.

Further, according to the present invention, there is provided a transmitter which adjusts the signal level of a multicarrier signal obtained by combining multiple carriers. The transmitter comprises a peak suppressing section for detecting whether there exists a peak based on the sum of power levels of input carriers and outputting the carriers the power levels of which are suppressed such that the sum of the power levels is smaller than a predetermined peak threshold value when the peak is detected, an input power calculating section for calculating a mean power level of the sum for each carrier before the carriers are inputted to the peak suppressing section, an output power calculating section for calculating a mean power level of the sum for each carrier after the carriers are outputted from the peak suppressing section, a monitoring section for outputting level control information which controls the signal level of the multicarrier signal based on the mean power level of the sum calculated by the input power calculating section and the mean power level of the sum calculated by the output power calculating section, and a level adjusting section for adjusting the level of the multicarrier signal based on the level control information outputted from the monitoring section.

Further, according to the present invention, there is provided a transmitter which adjusts the signal level of a multicarrier signal obtained by combining multiple carriers. The transmitter comprises a peak suppressing section for detecting whether there exists a peak based on a power level of the input multicarrier signal and outputting the multicarrier signal the power level of which is suppressed such that the power level is smaller than a predetermined peak threshold value when the peak is detected, an input power calculating section for calculating a mean power level for the multicarrier signal before the multicarrier signal is inputted to the peak suppressing section, an output power calculating section for calculating a mean power level for the multicarrier signal outputted from the peak suppressing section, a monitoring section for outputting level control information which controls the signal level of the multicarrier signal based on the mean power level calculated by the input power calculating section and the mean power level calculated by the output power calculating section, and a level adjusting section for adjusting the level of the multicarrier signal based on the level control information outputted from the monitoring section.

BEST MODE FOR CARRYING OUT THE INVENTION

Figure 1:
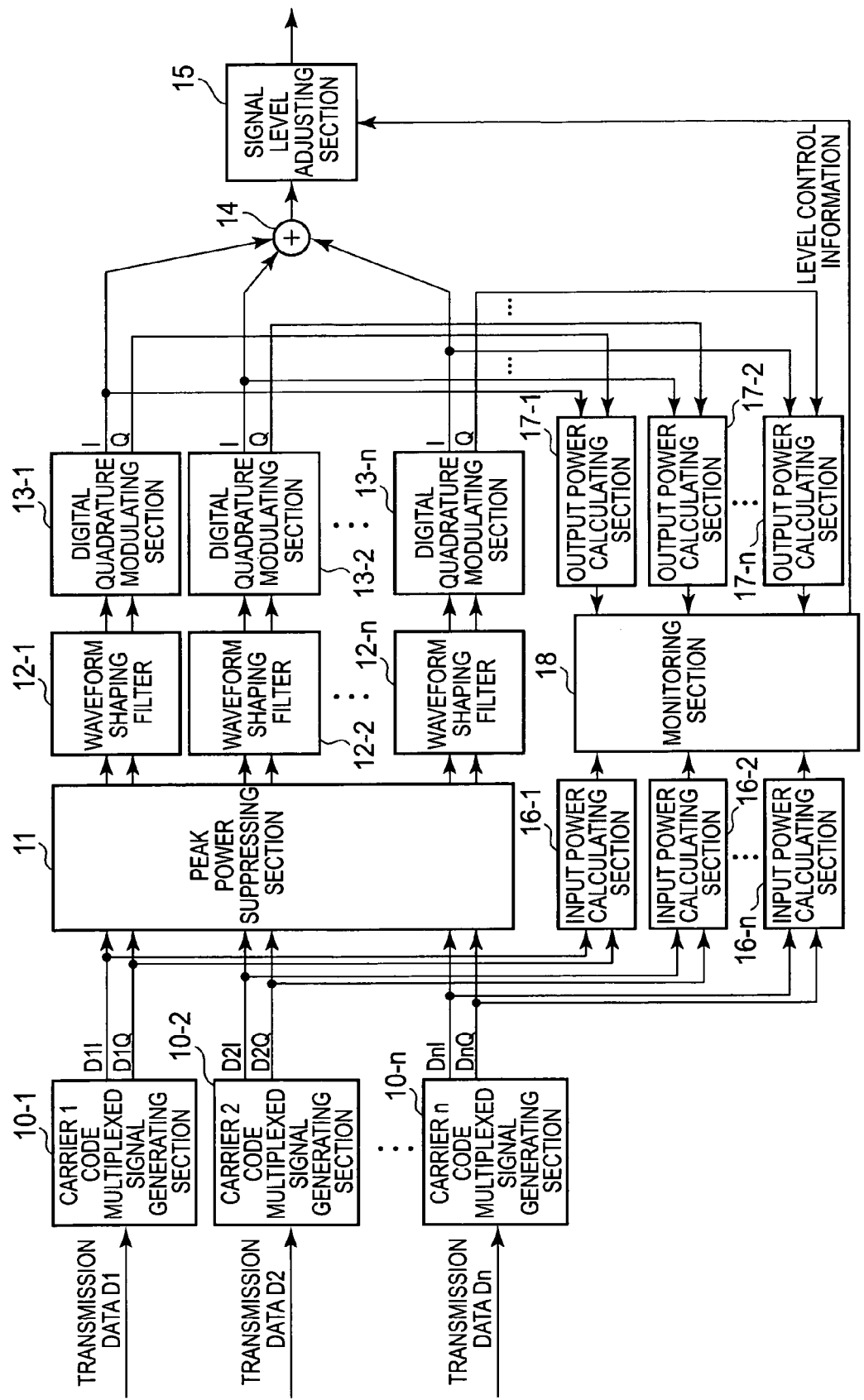
FIG. 1 is a block diagram showing a configuration of a transmitter according to a first embodiment of the present invention.

Preferred embodiments of the present invention will be described with reference to the drawings.

Moreover, the functional elements described in the preferred embodiments can be implemented by any other circuits or devices as long as they can implement such features. Further, some or all of the functions thereof may be implemented by software. In addition, each of the functional elements can be implemented by a plurality of circuits or a plurality of functional elements can be configured in a single circuit.

Transmitters according to the embodiments of the present invention are broadly divided into four types.

As a first type, a transmitter, which transmits a multicarrier signal obtained by combining multiple carriers through peak power suppression, band limitation, and quadrature modulation (collectively referred to as a digital signal process), performs carrier level adjustment for adjusting the signal level of each carrier after the digital signal process based on mean input power of the carrier (and, in some cases, mean output power of the carrier after the digital signal process), performs multicarrier level adjustment for adjusting the signal level of the multicarrier signal based on mean input power of an identified carrier (and, in some cases, mean output power of the identified carrier after the digital signal process), or performs both of the carrier level adjustment and the multicarrier level adjustment.

The first type transmitter will be described in detail by way of first to fourth embodiments.

As a second type, a transmitter, which transmits a multicarrier signal obtained by combining multiple carriers through peak power suppression, band limitation, and quadrature modulation, adjusts the signal level of the multicarrier signal based on mean input power of the sum of all carriers (and, in some cases, mean output power of the multicarrier signal).

The second type transmitter will be described in detail by way of fifth and sixth embodiments.

As a third type, a transmitter, which transmits a multicarrier signal obtained by combining multiple carriers through peak power suppression, band limitation, and quadrature modulation, adjusts the signal level of a peak power suppressed signal of each carrier based on mean input power before peak power suppression of the carrier and, in some cases, mean output power after the peak power suppression of the carrier.

The third type transmitter will be described in detail by way of a seventh embodiment.

As a fourth type, a transmitter, which transmits a multicarrier signal obtained by combining multiple carriers through band limitation and quadrature modulation with peak power having been suppressed, adjusts the signal level of a peak power suppressed signal of a multicarrier based on mean input power before peak power suppression of the multicarrier (and, in some cases, mean output power after peak power suppression of the multicarrier).

The fourth type transmitter will be described in detail by way of an eighth embodiment.

Moreover, in various kinds of transmitters, in order to determine the level control amount for adjusting the signal level of the carrier or the multicarrier signal, three methods described below are provided.

As a first method, there is provided a method in which the mean input power and the mean output power of the carrier or the multicarrier signal are calculated and the level control amount is calculated and determined from the calculated mean input power and mean output power. This method is referred to as a 'feed-forward control by calculation'.

As a second method, there is provided a method in which the level control amount corresponding to the mean input power of the carrier or the multicarrier signal is determined by using a table in which an estimated value of the mean input power of the carrier or the multicarrier signal is correlated with the level control amount. This method is referred to as a 'feed-forward control by table'.

As a third method, there is provided a method in which, by using a table in which the estimated value of the mean input power of the carrier or the multicarrier signal is correlated with an ideal value of the mean output power of the carrier or the multicarrier signal, the ideal value of the mean output power corresponding to the mean input power of the carrier or the multicarrier signal is identified and the level control amount is adjusted such that actual mean output power becomes equal to the ideal value and is converged into a proper level control amount. This method is referred to as a 'feed-forward control by table'.

Moreover, the details of the respective methods will be described by way of the respective embodiments.

Further, in the descriptions of the embodiments of the present invention, monitoring sections 18, 32, and 41, a signal level adjusting section 15, and a multiplying section 31 in the respective drawings are equivalent to an adjusting unit in claims. In addition, the signal level adjusting section 15 or the multiplying section 31 is equivalent to a level adjusting section in claims.

Prior to describing the transmitter according to the embodiment of the present invention, a transmission amplifier which uses the transmitter of the present invention will be described.

Figure 6:
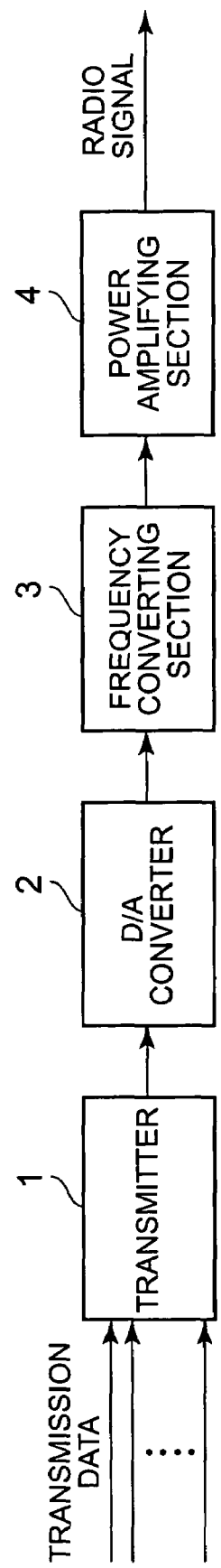
FIG. 6 is a block diagram showing a configuration of a transmission amplifier which is used for a general CDMA base station.

As shown in FIG. 6, the transmission amplifier (hereinafter, referred to as the present transmission amplifier), which uses the transmitter of the present invention, has a transmitter 1 which modulates and combines n carriers (where n>2) and outputs a multicarrier signal, a D/A converter 2 which performs digital-to-analog conversion, a frequency converting section 3 which performs a conversion process to a radio frequency, and a power amplifier 4 which amplifies a radio frequency signal. FIG. 6 is a block diagram showing a configuration of a transmission amplifier which is used for a general CDMA base station.

In a base station of a CDMA communication scheme, the present transmission amplifier performs modulation for n carriers (where n>2), combines the carriers to generate a multicarrier signal, and amplifies the generated multicarrier signal, to thereby perform a wireless communication.

The present transmission amplifier performs the level control of the carrier in the transmitter 1, which is different from that in the conventional CDMA base station transmission amplifier.

The transmitter 1 performs diffusion modulation, band limitation, and quadrature modulation for transmission data of multiple carriers which are digital data, combines the carriers (only I-phase components), and outputs the combined signal to the D/A converter 2 as the multicarrier signal.

Further, the transmitter 1 performs an adjustment control of the level of the multicarrier signal based on an input level of each carrier. The details of the adjustment control will be described by way of the description of the transmitter.

The D/A converter 2 analog-converts the multicarrier signal from the transmitter 1 and outputs the analog-converted signal to the frequency converting section 3.

The frequency converting section 3 converts the multicarrier signal to a radio frequency for the wireless communication and outputs the converted multicarrier signal to the power amplifier 4.

The power amplifier 4 amplifies the multicarrier signal converted to the radio frequency, such that the wireless communication is performed via an antenna (not shown).

Figure 18:
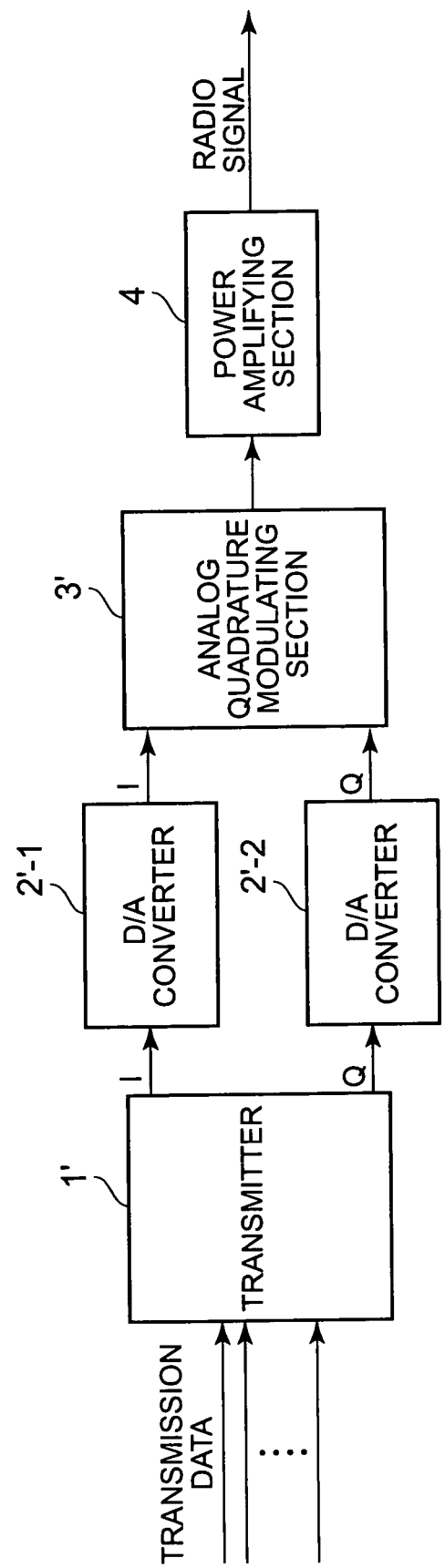
FIG. 18 is a block diagram showing another configuration of the transmission amplifier which is used for the general CDMA base station.

According to another configuration of the transmission amplifier which uses the transmitter of the present invention, as shown in FIG. 18, a transmitter 1' performs diffusion modulation, band limitation, and quadrature modulation for the transmission data of the multiple carriers which are digital data, and combines the carriers to output I-phase and Q-phase components as a multicarrier signal. D/A converters 2'-1 and 2'-2 which are respectively provided for the I-phase and Q-phase components analog-convert the I-phase and Q-phase components respectively. An analog quadrature converting section 3' converts the analog-converted multicarrier signal to a radio frequency for a wireless communication. Then, a power amplifier 4 amplifies the radio frequency-converted multicarrier signal. As a result, the wireless communication is performed via an antenna.

FIG. 18 is a block diagram showing another configuration of the transmission amplifier which is used for the general CDMA base station.

Figure 7:
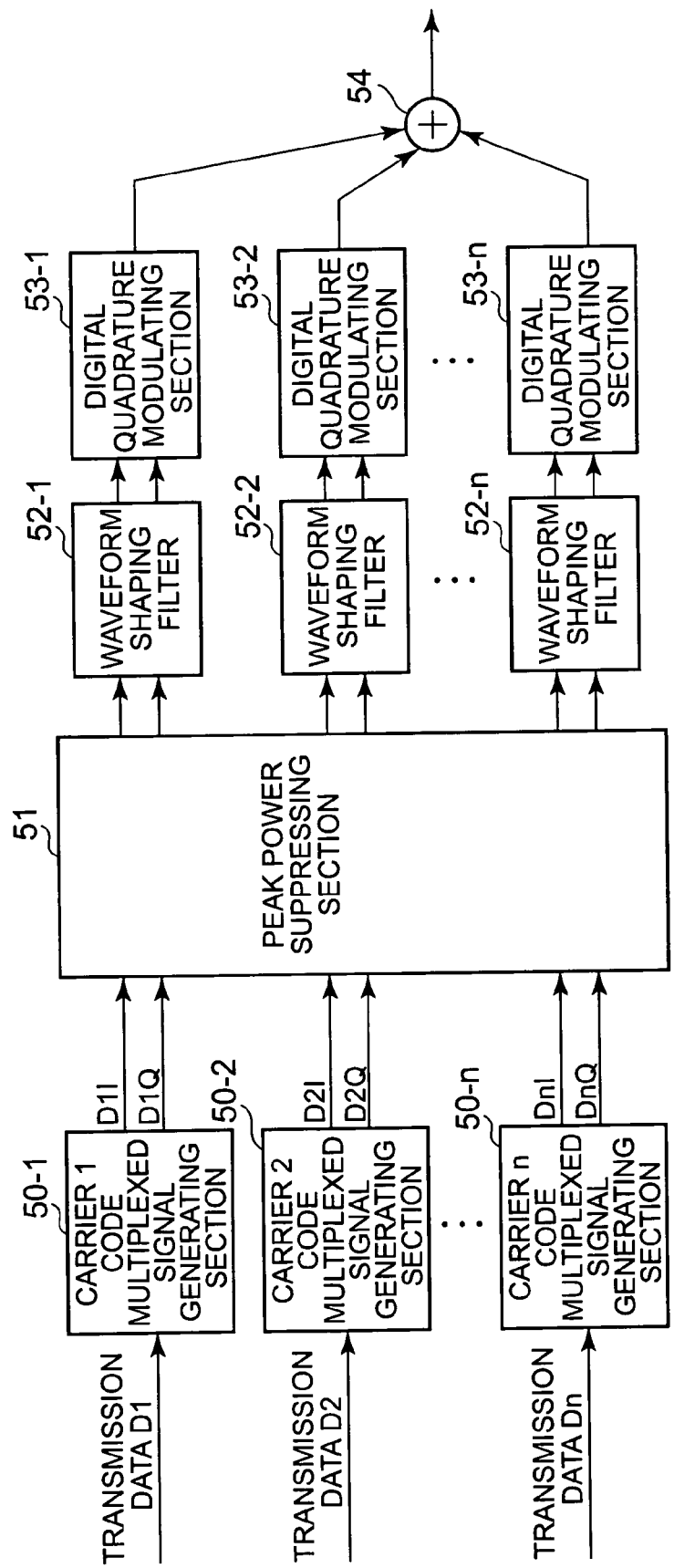
FIG. 7 is a block diagram showing a configuration of a general CDMA base station transmitter.
Figure 8:
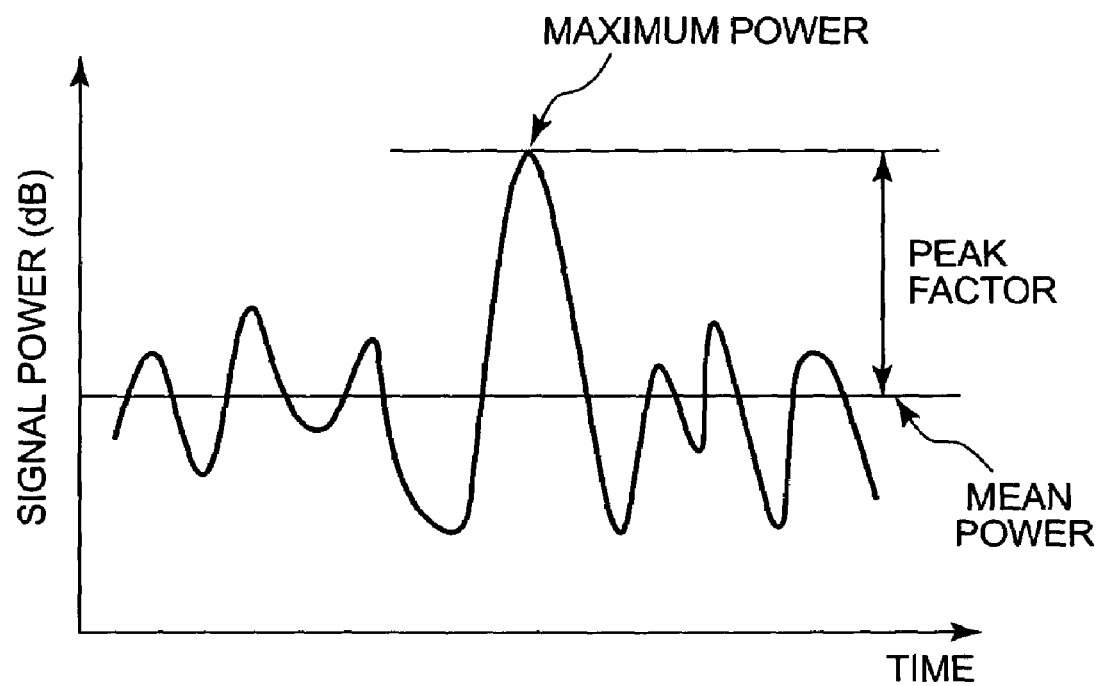
FIG. 8 is an explanatory view of a peak factor of a general amplifier.

Next, prior to describing the respective embodiments of the transmitter of the present invention which is equivalent to the transmitter 1 or 1' of the present transmission amplifier, a general transmitter which is a premise of the transmitter of the present invention will be described with reference to FIG. 7. FIG. 7 is a block diagram showing a configuration of the general CDMA base station transmitter.

The general transmitter shown in FIG. 7 is equivalent to the transmitter 1 of FIG. 6. The general transmitter has carrier code multiplexed signal generating sections 50-1 to 50-n which perform diffusion modulation for transmission data of the respective carriers to combine the carriers, a peak power suppressing section (peak limiter) 51 which performs signal peak limitation for each carrier in a separate sequence, waveform shaping filters 52-1 to 52-n which perform band limitation for the respective carriers, digital quadrature modulation sections 53-1 to 53-n which performs digital quadrature modulation for the respective carriers, and an adder 54 which combines the digital quadrature-modulated carriers.

The operation of the CDMA base station transmitter of FIG. 7 is as follows. Transmission data of each carrier which is digital data is inputted to the corresponding one of the carrier code multiplexed signal generating sections 50-1 to 50-n and is diffusion-modulated and combined with a unique diffusion code. Then, an inphase component (I component) and a quadrature component (Q component) of each carrier are outputted. Further, a peak value of each carrier is limited based on a predetermined peak factor threshold value by the peak power suppressing section 51. For each peak value-limited carriers, the band limitation is performed by the corresponding one of the waveform shaping filters 52-1 to 52-n and the quadrature modulation is performed by the corresponding one of the digital quadrature modulation sections 53-1 to 53-n. Then, the quadrature-modulated carriers are combined by the adder 54 and the combined signal is outputted as the multicarrier signal.

The multicarrier signal outputted from the transmitter of FIG. 7 is analog-converted by the D/A converter 2 shown in FIG. 6. The analog-converted multicarrier signal is converted to the radio frequency by the frequency converting section 3 and then is amplified by the power amplifier 4. The multicarrier signal after the amplification is transmitted via the antenna (not shown) in wireless manner.

That is, in the transmission amplifier of FIG. 6, the peak value of each carrier is limited by the peak power suppressing section 51 of the transmitter 1 and the band limitation and up-conversion are performed for each carrier. Then, the carriers are combined. The multicarrier signal after the combination is amplified by the power amplifier 4. Accordingly, the peak factor of the carrier before the combination becomes small, and thus the peak factor of the multicarrier signal after the combination also becomes small. As a result, the peak factor of the input signal to the power amplifier 4 is suppressed, so that the operating point in the power amplifier 4 can be raised.

Next, a transmitter that belongs to the first type of the present invention will be described.

The transmitter that belongs to the first type of the present invention will be described according to elements. The transmitter has an input power calculating section for calculating mean input power of each carrier, an output power calculating section for calculating mean output power of each carrier which is mean power after the carrier band is limited, a monitoring section for identifying a carrier having the maximum mean input power, acquiring the maximum value, acquiring the mean output power of the identified carrier, determining the ratio of the mean input power to the mean output power, and outputting level control information which is the ratio of the ratio predetermined above to a predetermined expected value, and a signal level adjusting section for adjusting the level of a multicarrier signal by multiplying the level control information outputted from the monitoring section. Accordingly, a variation in level of the multicarrier signal can be averagedly suppressed according to a variation in input level of the carrier.

Further, a multiplier which performs multiplication of the carrier and a gain value after the band limitation is provided for each carrier. The monitoring section determines the ratio of the mean input power to the mean output power for each carrier, calculates the gain value of each carrier based on the ratio of the ratio determined above to the predetermined expected value, and output the calculated gain value to the corresponding multiplier. Accordingly, the variation in level of each carrier after the band limitation can be averagedly suppressed every carrier and thus the variation in level of the multicarrier signal can be averagedly suppressed.

Further, in the monitoring section, as another determination method of the level control information of the multicarrier or the gain value of each carrier, a method in which the determination is performed with a table in which an estimated value of the mean input power of the carrier is correlated with a level control amount or the gain value or a method in which the level control amount or the gain value is adjusted and determined with a table in which the estimated value of the mean input power of the carrier is correlated with an ideal value of the mean output power of the multicarrier signal or the carrier such that the mean output power is equal to the ideal value is implemented. Accordingly, with a simple control, the variation in level of each carrier after the band limitation can be averagedly suppressed every carrier, and thus the variation in level of the multicarrier signal can be averagedly suppressed.

An example of a specified configuration of the transmitter that belongs to the first type of the present invention will be described by way of the first to fourth embodiments.

First Embodiment

According to the first embodiment of the present invention, there is provided a transmitter which adjusts the transmission signal level of a multicarrier signal obtained by combining multiple carriers through band limitation and quadrature modulation. The transmitter has a monitoring section for outputting a level control amount which is the ratio of the input to output level ratio, which is the ratio of a mean input level to a mean output level for a carrier selected among the multiple carriers under a specified condition, to a predetermined expected value and a level adjusting section for performing level adjustment by multiplying the level of a multicarrier signal by the level control amount. Thus, the variation in level of the multicarrier signal according to the variation in input level of the carrier can be suppressed.

Further, according to the first embodiment of the present invention, there is provided a transmitter which adjusts the transmission signal level of a multicarrier signal obtained by combining multiple carriers through band limitation and quadrature modulation. The transmitter has a monitoring section, which has a table storing an estimated value of mean input level of each carrier in correlation with a level control amount of the multicarrier signal, for reading and outputting the level control amount corresponding to the estimated value, which is equivalent to the mean input level of a carrier selected among the multiple carriers under a specified condition, from the table and a level adjusting section for performing level adjustment by multiplying the level of the multicarrier signal by the level control amount. Thus, the variation in level of the multicarrier signal can be suppressed according to the variation in input level of the carrier.

First, a configuration example of the transmitter according to the first embodiment of the present invention (hereinafter, referred to as first transmitter) will be described with reference to FIG. 1. FIG. 1 is a block diagram showing a configuration of the first transmitter.

The first transmitter has carrier code multiplexed signal generating sections 10-1 to 10-n, a peak power suppressing section 11, waveform shaping filters 12-1 to 12-n, digital quadrature modulating sections 13-1 to 13-n, an adder 14, a signal level adjusting section 15, input power calculating sections 16-1 to 16-n, output power calculating sections 17-1 to 17-n, a monitoring section 18.

Next, a configuration of each element of the first transmitter will be described.

The carrier code multiplexed signal generating sections 10-1 to 10-n are respectively provided for each carrier and respectively store diffusion codes corresponding to the carriers in advance.

When transmission data of a corresponding carrier is inputted in channels, each of the carrier code multiplexed signal generating sections 10-1 to 10-n performs diffusion modulation using the stored diffusion codes, combines transmission data after the diffusion modulation, divides the combined signal into an inphase component (hereinafter, referred to as I component) and a quadrature component (hereinafter, referred to as Q component), and outputs them to the peak power suppressing section 11.

The peak power suppressing section 11 performs power limitation of the carrier based on the level of the diffusion-modulated carrier outputted from each of the carrier code multiplexed signal generating sections 10-1 to 10-n and outputs each carrier after the limitation to the corresponding one of the waveform shaping filters 12-1 to 12-n.

The peak power suppressing section 11 is the limiter identical to that in the conventional art. Here, it is important that peak detection is performed based on power tentatively combined using the respective input carriers and, when the peak is detected, the power limitation is performed for each carrier at a uniform suppression rate, such that a peak factor can be suppressed when a multicarrier obtained by combining the carriers is inputted to the power amplifier 4 of the transmission amplifier.

The details of the operation of the peak power suppressing section 11 will be described later.

The waveform shaping filters 12-1 to 12-n are respectively provided for each carrier. Each of the waveform shaping filter 12-1 to 12-n performs the band limitation on the power-limited carrier outputted from the peak power suppressing section 11 and outputs the band-limited carrier to the corresponding one of the digital quadrature modulating sections 13-1 to 13-n.

In each of the waveform shaping filters 12-1 to 12-n, through the band limitation, spectral shaping is performed such that the occupied band of the corresponding carrier is converged into a predetermined value.

The digital quadrature modulating sections 13-1 to 13-n are respectively provided for each carrier. Each of the digital quadrature modulating sections 13-1 to 13-n quadrature-modulates the band-limited carrier outputted from the corresponding one of the waveform shaping filters 12-1 to 12-n and outputs a quadrature-modulated I component to the adder 14. Further, both quadrature-modulated I and Q components are outputted to the corresponding one of the output power calculating sections 17-1 to 17-n.

The adder 14 combines the I components of the quadrature-modulated carriers outputted from the respective digital quadrature modulating sections 13-1 to 13-n and outputs the combined signal to the signal level adjusting section 15 as the multicarrier signal.

The signal level adjusting section 15 performs level adjustment on the multicarrier signal from the adder 14 based on the level control information outputted from the later-described monitoring section 18.

The input power calculating sections 16-1 to 16-n are respectively provided for each carrier. Each of the input power calculating sections 16-1 to 16-n calculates the mean input power of the corresponding carrier based on the power level of the diffusion-modulated carrier outputted from the corresponding one of the carrier code multiplexed signal generating sections 10-1 to 10-n and outputs the mean input power of the corresponding carrier to the monitoring section 18. In each of the input power calculating sections 16-1 to 16-n, the calculation method of the mean input power will be described later.

The output power calculating sections 17-1 to 17-n are respectively provided for each carrier. Each of the output power calculating sections 17-1 to 17-n calculates the mean output power of the corresponding carrier based on the power level of the quadrature-modulated carrier (both I and Q components) outputted from the corresponding one of the digital quadrature modulating sections 13-1 to 13-n and outputs the mean output power of the corresponding carrier to the monitoring section 18. In each of the output power calculating sections 17-1 to 17-n, the calculation method of the mean output power will be described later.

In each of the input power calculating sections 16-1 to 16-n and each of the output power calculating sections 17-1 to 17-n, a configuration for an averaging operation or a method for the averaging operation are preferably equal to each other in consideration of the delay time of the input of the mean input power and the mean output power to the monitoring section 18 or the averaging time.

The monitoring section 18 calculates parameters regarding the level adjustment of the multicarrier signal based on the mean input power outputted from each of the input power calculating sections 16-1 to 16-n and the mean output power outputted from each of the output power calculating sections 17-1 to 17-n and outputs the parameters to the signal level adjusting section 15 as the level control information.

The details of the calculation method of the level control information in the monitoring section 18 will be described later.

Next, the operation of the first transmitter will be described.

In FIG. 1, transmission data of each carrier which is digital data is inputted to the corresponding one of the carrier code multiplexed signal generating sections 10-1 to 10-n of the transmitter on channel unit basis. In each of the carrier code multiplexed signal generating sections 10-1 to 10-n, transmission data undergoes the diffusion modulation using the previously stored diffusion codes and, after the combination, is outputted to the peak power suppressing section 11 for each of the IQ components.

When the diffusion-modulated carrier is inputted, the peak power suppressing section 11 calculates instantaneous power and mean power for the sum of the power levels of the carriers, calculates the ratio between the instantaneous power and the mean power, compares the calculated ratio with a predetermined peak factor threshold value to detect whether there exists a peak, and performs the level adjustment of the carrier based on the comparison result.

Here, the calculation method of the instantaneous power and the mean power of the sum of the power levels of the carriers will be described by way of the following equation. The input signal of each carrier is represented by the following equation (1).

[Expression 1]

$$S_k = I_k(t) + j \cdot Q_k(t) (k=1,2,\ldots n) \tag{1}$$

First, the peak power suppressing section 11 combines the input carriers and multiplexes the combined signal. The multiplexing process of the carriers is represented by the following equation (2).

[Expression 2]

$$A_i(t) = \sum_{k=1}^{n} I_k(t) \tag{2}$$

$$A_q(t) = \sum_{k=1}^{n} Q_k(t)$$

In the equation (2), $A_i(t)$ and $A_q(t)$ respectively represent the multiplexing result of the inphase component of the input signal and the multiplexing result of the quadrature component thereof.

With the use of the equation (2), the instantaneous power and the mean power of the sum of the power levels of each carrier are respectively represented by the following equations (3) and (4).

[Expression 3]

$$\text{Instantaneous Power} = P\text{int}(t) = A_i(t)^2 + A_q(t)^2 \tag{3}$$

$$\text{Average Power} = \frac{1}{T} \sum_{k=t}^{t-T} P\text{int}(k) \tag{4}$$

In the equation (4), T represents the number of power values to be averaged among old instantaneous power values and is previously set by the peak power suppressing section 11. Further, the peak power suppressing section 11 stores the instantaneous power value in a storage unit (not shown) whenever it is calculated. The stored instantaneous power values are read from the storage unit when the mean power is calculated.

The peak power suppressing section 11 determines the ratio (hereinafter, instantaneous to mean power ratio) between the instantaneous power and the mean power of the sum of the power levels of the carriers and compares the ratio with the predetermined peak factor threshold value to detect whether there exists the peak.

The peak factor threshold value used in the peak power suppressing section 11 is a fixed value which depends on the number of the carriers. Further, the peak factor threshold value is optimized when each carrier has the maximum level. However, even when all carriers do not have the maximum level, the peak power suppressing section 11 performs the peak suppression.

As the result of the comparison, if the instantaneous to mean power ratio is larger than the peak factor threshold value, the peak power suppressing section 11 judges that the limitation must be performed on each carrier, limits power of each carrier such that the power of each carrier after the combination becomes specified power, and outputs the power-limited carrier to the corresponding one of the waveform shaping filters 12-1 to 12-n. Specifically, the power limitation (peak limitation) is performed by uniformly multiplying a multiplication factor corresponding to the sum of the power levels for each carrier.

If the instantaneous to mean power ratio is smaller than the peak factor threshold value, each carrier is outputted to the corresponding one of the waveform shaping filters 12-1 to 12-n without undergoing the power limitation.

As described above, since each carrier undergoes the band limitation after the peak limitation, the peak factor of the carrier after the band limitation is larger than that before the band limitation. For this reason, an output characteristic of the power amplifier 4 is nonlinear, which results in nonlinear distortion.

In order to suppress the maximum power of the multicarrier signal inputted to the power amplifier 4, the peak power suppressing section 11 detects the peak based on the instantaneous power and the mean power to the sum of the power levels of the carriers, limits the power value of each carrier when the peak is detected, and outputs the power-limited carrier. Accordingly, the peak factor of the multicarrier signal can be reduced, and thus the nonlinear distortion in the power amplifier 4 can be prevented from being caused.

The first transmitter uses the peak power suppressing section 11 that performs the peak limitation of each carrier on a basis of the peak factor threshold value as described above. However, another method is used for the peak limitation only if it is intended to limit the peak of the multicarrier signal. For example, a method which performs the peak limitation of each carrier based on a power threshold value may be used.

In the peak limitation based on the power threshold value, the peak power suppressing section 11 sets the power threshold value in advance and, when the power value of the multicarrier signal after the respective carriers are combined exceeds the power threshold, performs the power limitation of each carrier such that the power is limited by the amount beyond the power threshold value.

In FIG. 1, each carrier outputted from the peak power suppressing 11 is band-limited by the corresponding one of the waveform shaping filters 12-1 to 12-n, quadrature-modulated by the corresponding one of the digital quadrature modulating sections 13-1 to 13-n. Then, the I components are combined by the adder 14 and the combined signal is outputted to the signal level adjusting section 15 as the multicarrier signal.

Further, each carrier diffusion-modulated by each of the carrier code multiplexed signal generating sections 10-1 to 10-n is inputted to the corresponding input power calculating sections 16-1 to 16-n, in addition to the peak power suppressing section 11.

Each of the input power calculating sections 16-1 to 16-n calculates the mean input power which is the mean power of each carrier based on the input carrier and outputs the calculated mean input power to the monitoring section 18.

Here, the calculation method of the mean input power in each of the input power calculating sections 16-1 to 16-n will be described by way of the following equation. First, the input power calculating section 16 calculates the power value of the input carrier. When the input signal of the carrier is represented by the equation (1), a power value Pow of the input signal is represented by the following equation (5).

[Expression 4]

$$Pow(t)=I(t)^2+Q(t)^2 \qquad (5)$$

Next, the input power calculating section 16 calculates the mean power using the calculated power value Pow. The input power calculating section 16 performs a weighted averaging calculation process represented by the following equation (6) using a previously stored weighting factor $\lambda$ ($0 \leq \lambda \leq 1$).

[Expression 5]

$$AvgW(t) = \frac{Pow(t)}{\lambda} + \frac{1-\lambda}{\lambda} \cdot AvgW(t-1) \qquad (6)$$

In the equation (6), AvgW(t–1) represents the weighted averaging calculation result calculated just before. The input power calculating section 16 stores the weighting calculation result in a built-in storage unit (not shown) whenever it is calculated. The stored weighting calculation result is read from the storage unit when a new weighting calculation is performed.

Further, the input power calculating section 16 performs an averaging process represented by the following equation (7) using the calculation result of the equation (6).

[Expression 6]

$$Avg(t) = \frac{1}{x} \cdot \sum_{k=t}^{t-x} AvgW(k) \qquad (7)$$

In the equation (7), x represents the number of the results to be averaged among the old weighted averaging calculation results and is set by the input power calculating section 16 in advance. In addition, the input power calculating section 16 stores the weighting calculation result in the storage unit whenever it is calculated. The stored weighting calculation result is read from the storage unit when the mean power is calculated.

Then, the input power calculating section 16 outputs the mean power Avg(t) calculated by the equation (7) to the monitoring section 18 as the mean input power. This is the calculation method of the mean input power in the input power calculating section 16.

Further, the I and Q components of each carrier quadrature-modulated by each of the digital quadrature modulating sections 13-1 to 13-n are inputted to the corresponding one of the output power calculating sections 17-1 to 17-n, in addition to the adder 14 (only the I component). Each of the output power calculating sections 17-1 to 17-n calculates the mean output power, which is mean power of each carrier after the band limitation, based on the input carrier and outputs the calculated mean output power to the monitoring section 18.

The calculation method of the mean output power in each of the output power calculating sections 17-1 to 17-n is the same as the above-described calculation method of the mean input power in each of the input power calculating sections 16-1 to 16-n, except that the power value of the carrier after the quadrature modulation is used, and the description thereof will be omitted.

The monitoring section 18 calculates the parameters regarding the level adjustment of the multicarrier signal based on the mean input power outputted from each of the input power calculating sections 16-1 to 16-n and the mean output power outputted from each of the output power calculating sections 17-1 to 17-n and outputs the parameters to the signal level adjusting section 15 as the level control information.

The monitoring section 18 described herein is to realize the 'feed-forward control by calculation' of the first method that determines the level control amount for adjusting the signal level of the multicarrier signal.

Figure 9:
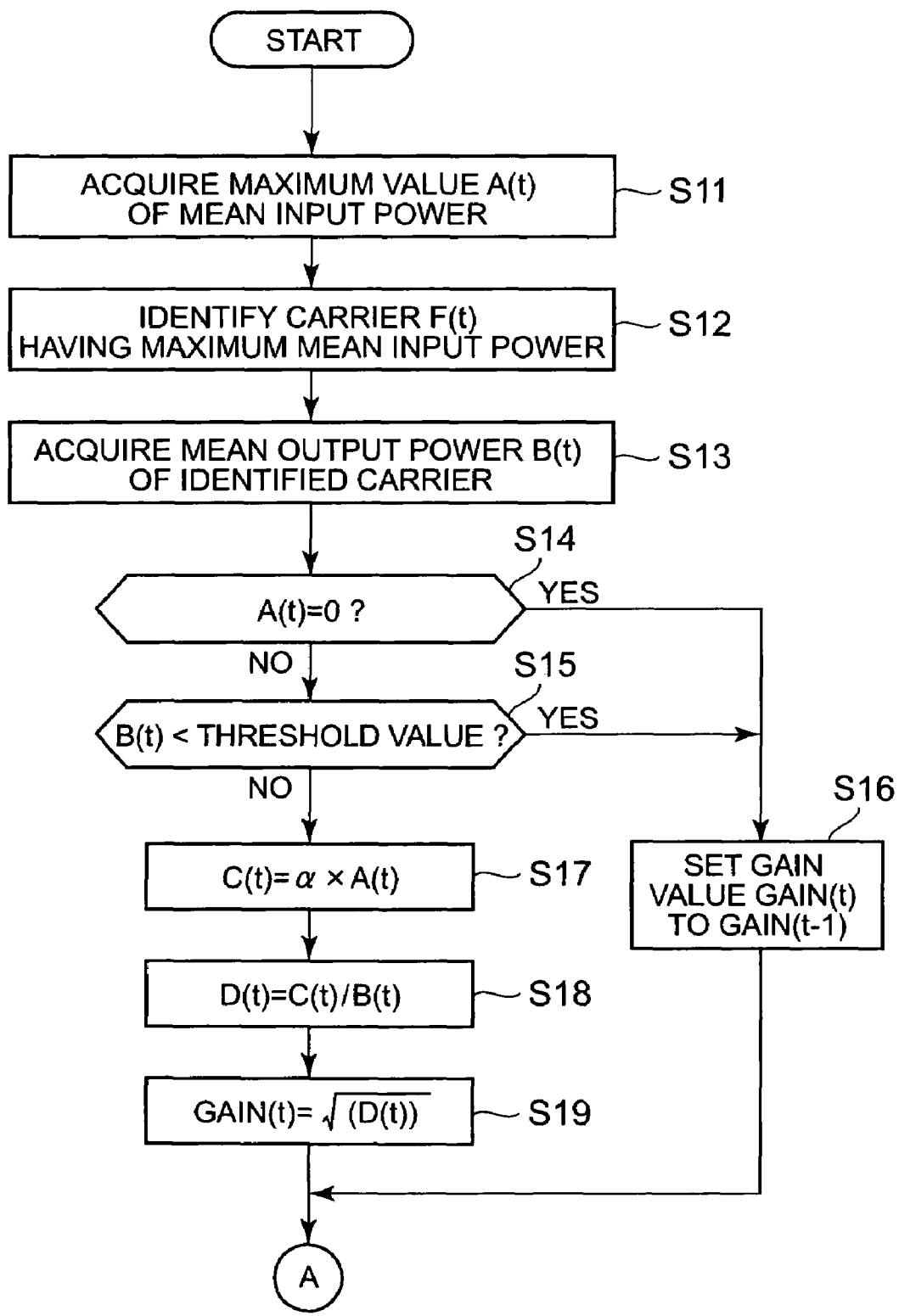
FIG. 9 is a flowchart of a calculation process of level control information in a monitoring section 18 of the transmitter according to the first embodiment of the present invention.
Figure 10:
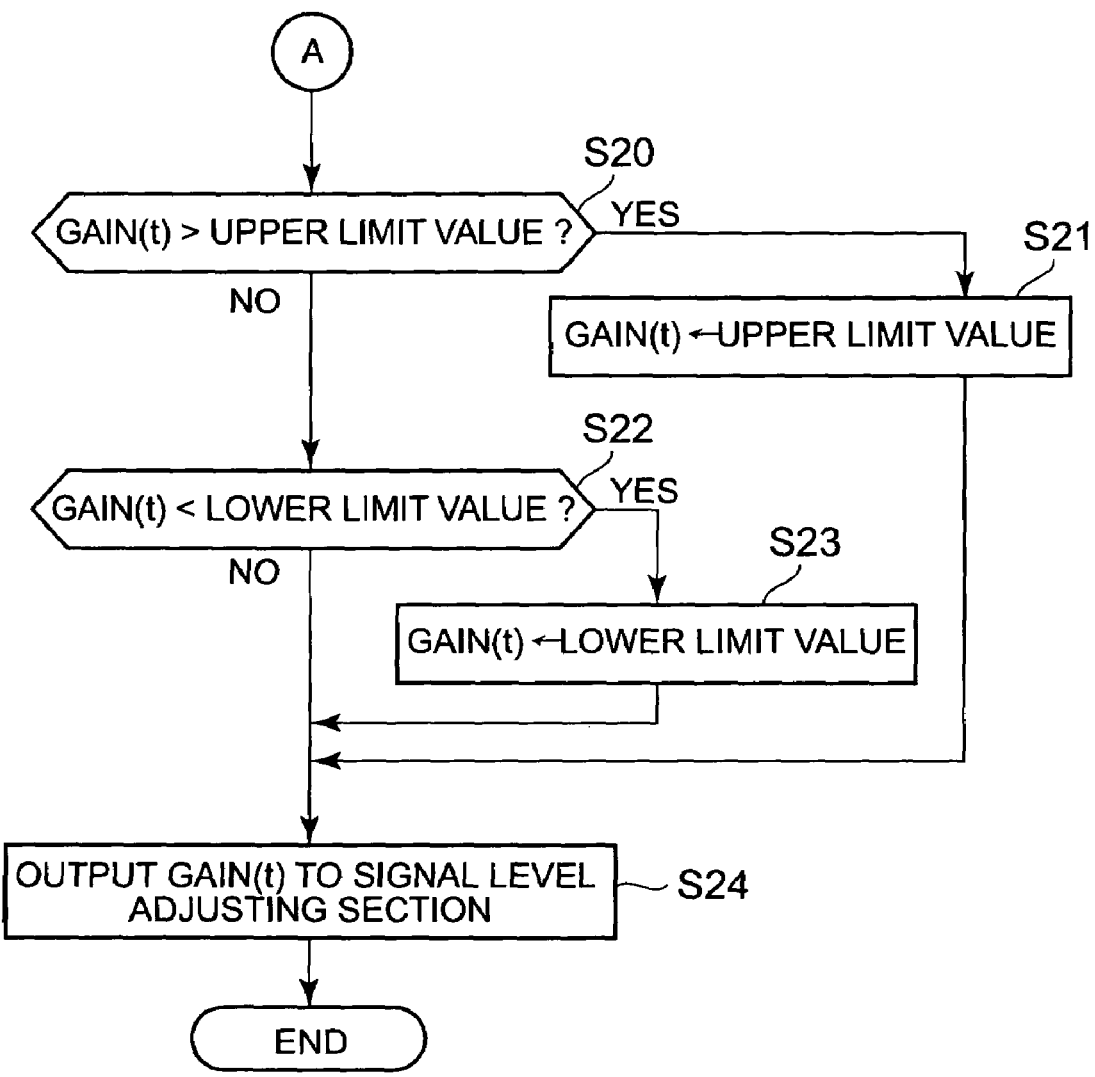
FIG. 10 is a flowchart of the calculation process of the level control information in the monitoring section 18 of the transmitter according to the first embodiment of the present invention.

Hereinafter, the calculation method of the level control information in the monitoring section 18 will be described with reference to FIGS. 9 and 10. FIGS. 9 and 10 are flowcharts of a calculation process of the level control information in the monitoring section 18 of the first transmitter.

Moreover, (A) in the flowchart of FIG. 9 is connected to (A) in the flowchart of FIG. 10.

The monitoring section 18 monitors operation statuses of the input power calculating sections 16-1 to 16-n and the output power calculating sections 17-1 to 17-n by monitoring the values and output statuses of the mean input power and the mean output power. By monitoring the operation statuses, the monitoring section 18 can see the number of current carriers or the like.

In FIG. 9, through the monitoring of the operation statuses, the monitoring section 18 acquires the maximum value $A(t)$ among the mean input power outputted from the input power calculating sections 16-1 to 16-n at the same timing (S11). Next, the monitoring section 18 identifies the input power calculating sections 16, which outputs the maximum value $A(t)$ to identify the carrier $F(t)$ having the maximum mean input power (S12) and acquires the mean output power $B(t)$ outputted from the output power calculating sections 17 corresponding to the carrier identified through the step S12 (S13).

Here, when the first transmitter handles one carrier, the monitoring section 18 just has to acquire the mean input power and the mean output power to be inputted, instead of operating in the steps S11 to S13.

Then, the monitoring section 18 confirms whether or not the maximum value $A(t)$ of the mean input power is 0 (zero), that is, there exists no carrier (S14). If the value is not 0 (zero) (No of S14), the monitoring section 18 confirms whether or not the corresponding mean output power $B(t)$ is less than the predetermined threshold value (S15).

Here, the comparison judgment of the mean output power $B(t)$ with the threshold value of S15 is a required process for the device configuration. The threshold value is a value set in the monitoring section 18 in advance.

The reason why the comparison judgment is required for the device configuration is that since when the transmission level of monitoring data (here, the carrier having the maximum mean input power) is reduced, precision of the level adjustment is degraded, precision degradation has to be prevented at a specified level.

In particular, when a gain calculation is performed with steps of S17, S18, and S19, if the mean output power $B(t)$ which is a divisor of the step S18 becomes small and approaches to 0 (zero), the calculation result is diverged. Accordingly, when the maximum mean output power $B(t)$ does not come up to the threshold value, the calculation process of the steps S17, S18, and S19 is avoided.

In the step S15, if $B(t)$ is equal to or more than the threshold value ($B(t) \geq$ threshold value) (No of S15), the monitoring section 18 judges that the level control of the multicarrier signal can be performed and performs the calculation of the level control information.

In calculating the level control information, first, the monitoring section 18 multiplies $A(t)$ by a factor $\alpha$ (S17), divides the multiplication result $C(t)$ by $B(t)$ (S18), and calculates $D(t)$. Thus, the calculation process in the steps S17 and S18 is represented by $D(t)=\alpha \cdot A(t)/B(t)$. Hereinafter, $A(t)/B(t)$ is referred to as an input to output power ratio.

Here, the factor $\alpha$ ($\alpha>0$) is a value which is determined according to the power value of the carrier and is set in the monitoring section 18 in advance. In determining the factor $\alpha$, the monitoring section 18 calculates the input to output power ratio of reference data (for example, the power value which is not an object of peak control in the peak power suppressing portion 11) of the power value of the carrier and sets the reciprocal thereof to $\alpha$.

Therefore, $D(t)$ represents the ratio of the input to output power ($A(t)/B(t)$) of observed data to the input to output power ratio $1/\alpha$ of reference data. Hereinafter, $D(t)$ is referred to as an reference observed ratio.

Then, the monitoring section 18 acquires a square root of the reference observed ratio $D(t)$ obtained in the step S19 and sets it to a gain value $GAIN(t)$ (S19). The gain value $GAIN(t)$ is a parameter relating to the level adjustment of the multicarrier signal.

In the step S14, when $A(t)$ is 0 (zero), that is, there exists no carrier (Yes of S14) or in the step S15, when $B(t)$ is less than the threshold value ($B(t)<$threshold value) (Yes of S15), the monitoring section 18 sets the gain value $GAIN(t-1)$ used just before as the gain value $GAIN(t)$ (S16).

In FIG. 10, the monitoring section 18 confirms whether or not $GAIN(t)$ is larger than an upper limit value (S20). In a step S20, if $GAIN(t)$ is larger than the upper limit value ($GAIN(t)>$upper limit value) (Yes of S20), the monitoring section 18 substitutes the value of $GAIN(t)$ with the upper limit value (S21). If $GAIN(t)$ is equal to or less than the upper limit value ($GAIN(t) \leq$upper limit value) (No of S20), the monitoring section 18 confirms whether or not $GAIN(t)$ is less than a lower limit value (S22).

In a step S22, if $GAIN(t)$ is less then the lower limit value ($GAIN(t)<$lower limit value) (Yes of S22), the monitoring section 18 substitutes the value of $GAIN(t)$ with the lower limit value (S23). If $GAIN(t)$ is equal to or more than the lower limit value ($GAIN(t) \geq$lower limit value) (No of S22), the monitoring section 18 uses current $GAIN(t)$ as it is and decides the value of $GAIN(t)$.

Here, the upper limit value and the lower limit value of $GAIN(t)$ are values which are determined according to the power value of the carrier and the number of operating carriers and are set in the monitoring section 18 in advance.

If the gain value $GAIN(t)$ is determined, the monitoring section 18 outputs $GAIN(t)$ to the signal level adjusting section 15 as the level control information (S24). This is the calculation process of the level control information in the monitoring section 18.

The monitoring section 18 periodically performs the above-described calculation process of the level control information at a specified timing. Further, the monitoring section 18 stores the gain value $GAIN(t)$ calculated at the old timing in an embedded storage unit (not shown). The stored gain value $GAIN(t)$ is read from the storage unit when a new gain value is calculated.

In FIG. 1, the signal level adjusting section 15 performs the level adjustment of the multicarrier signal by multiplying the multicarrier signal outputted from the adder 14 by the gain value GAIN(t) outputted from the monitoring section 18.

As described above, the monitoring section 18 calculates GAIN(t) based on the square root of the input to output power ratio. The power value of the carrier is represented by the sum of squares of the inphase component and the quadrature component as represented by the equation (5), and thus, by multiplying the multicarrier signal by GAIN(t), a desired level adjustment can be performed.

The multicarrier signal suffered from the level adjustment is amplified by the power amplifier 4 after undergoing the analog conversion by the D/A converter 2 and the radio frequency conversion by the frequency converting section 3 and is transmitted in the wireless manner. This is the operation of the first transmitter.

In the first transmitter, the level adjustment in the signal level adjusting section 15 is performed according to the level of the multicarrier signal, and thus, preferably, the multicarrier signal outputted from a main line system of the first transmitter (from the peak power suppressing section 11 to the adder 14) and the level control information corresponding to the multicarrier signal outputted from a control system (the input power calculating sections 16, the output power calculating sections 17, and the monitoring section 18) are inputted to the signal level adjusting section 15 at the same timing.

For this reason, the main line system or the control system may be provided with a delay unit to synchronize data outputs of the main line system and the control system.

According to the first transmitter, based on the mean input power of each carrier to the transmitter and the mean output power after the band limitation, the control amount of the level adjustment of the multicarrier signal obtained by combining the carriers is calculated and the level adjustment of the multicarrier signal is performed using the control amount. Thus, the variation in level of the multicarrier signal according to the variation in input level of each carrier can be averagedly suppressed.

A typical peak power suppressing section performs the peak control of each carrier according to the sum of the power levels of the carriers. Therefore, even when a carrier the input level of which abruptly varies is inputted to the transmitter, if the power levels of all carriers are less than the specified value, the carriers are combined through the band limitation as it is with no peak limitation. For this reason, the level of the multicarrier signal may also be abruptly varied.

Further, when a carrier the input level of which is fixed and a carrier the input level of which varies are mixed, the frequency of the peak control of the peak power suppressing section 11 becomes high according to the variation in input level and thus the peak limitation is also performed on the carrier having the fixed input level. Accordingly, the level of the carrier having the fixed input level is lowered.

As described above, in calculating the level control information, the monitoring section 18 calculates the input to output power ratio for the carrier having the maximum mean input power and calculates the gain value GAIN(t) based on the reference observed ratio D(t) which is the ratio to the input to output power ratio in reference data.

That is, the first transmitter calculates the gain value based on the mean input/output power of the carrier and multiplies the multicarrier signal by the calculated mean input/output power. Thus, when the peak limitation to the carrier in the peak power suppressing section 11 is not sufficiently performed or when the peak limitation to the carrier is excessively performed so that the level is excessively suppressed, the first transmitter can approximate the sum of the levels of the multicarrier signal corresponding to an arbitrary interval (frame or the like) to the sum of the levels when reference data is used. Accordingly, even when the variation in level of the input carrier occurs, the first transmitter can averagedly suppress the variation in level of the multicarrier signal stably.

Further, the first transmitter can be implemented by adding the input power calculating sections 16 and the output power calculating sections 17 by the number of the carriers, the monitoring section 18, and the signal level adjusting section 15 to the configuration of the conventional transmitter. Therefore, the first transmitter can use equipments of the conventional transmitter as they are, and thus an installation cost can be reduced.

In the first transmitter, the monitoring section 18 can set other conditions (for example, the second largest mean input power), in addition to the maximum, as the condition of the mean input power which is used for the calculation of the level control information. In the peak power suppressing section 11, each carrier is peak-limited according to a common multiplication factor, and thus the input to output power ratio is constant for any carrier.

However, precision of the value of the mean output power in the output power calculating section is low and, when the value of the mean output power is smaller than an actual value, the error of the input to output power ratio increases. In particular, when the value of the mean output power is originally small, the tendency is noticeable. Therefore, the mean output power used for the calculation of the input to output power ratio is preferably one as large as possible, and thus the mean input power preferably has the maximum value.

Figure 4:
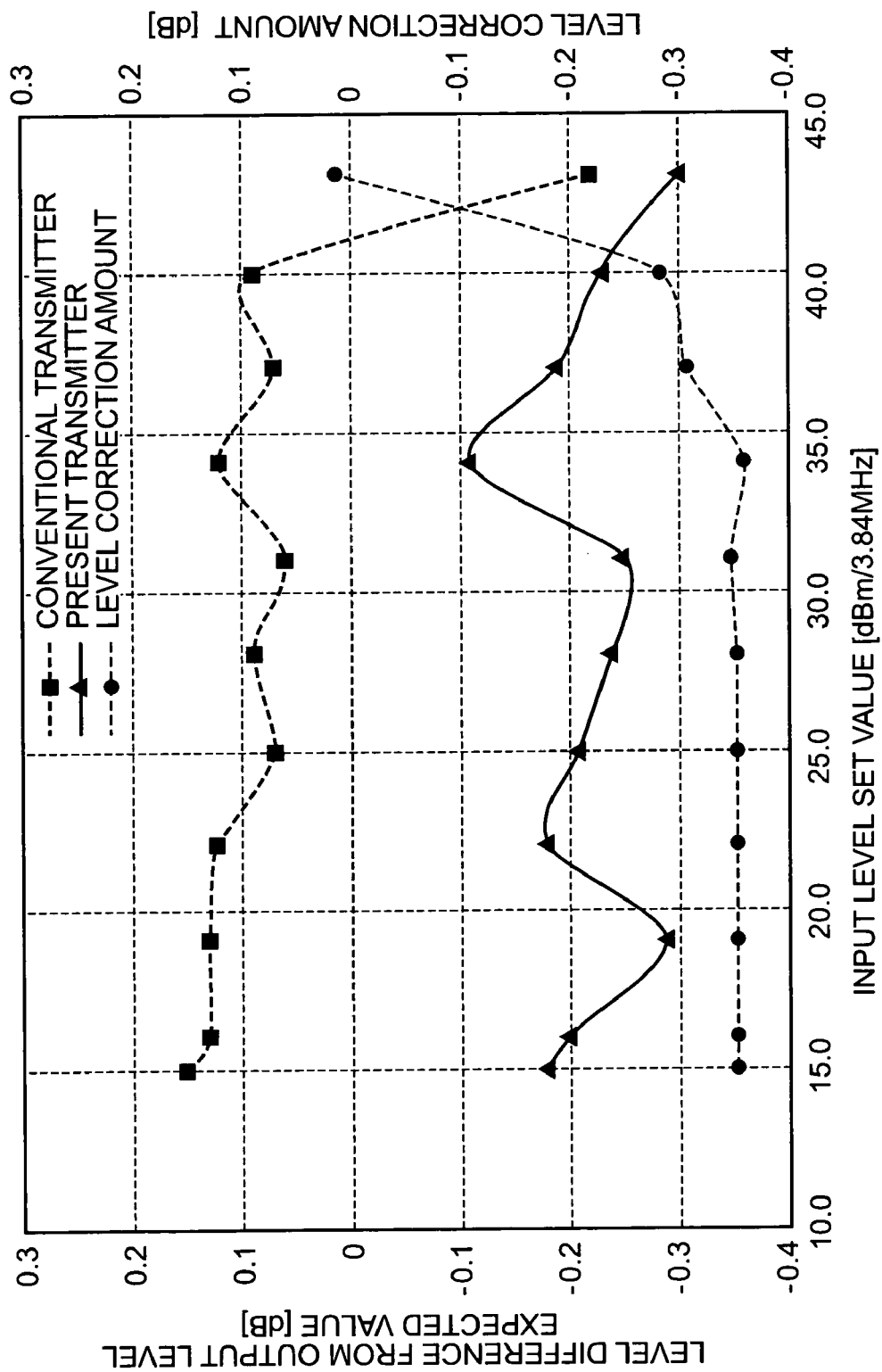
FIG. 4 is a graph showing characteristics relating to an input set level and an output level deviation in the transmitter according to the first embodiment of the present invention and a CDMA base station transmitter of a conventional art when one carrier of a 32 code-multiplexed signal is transmitted.
Figure 5:
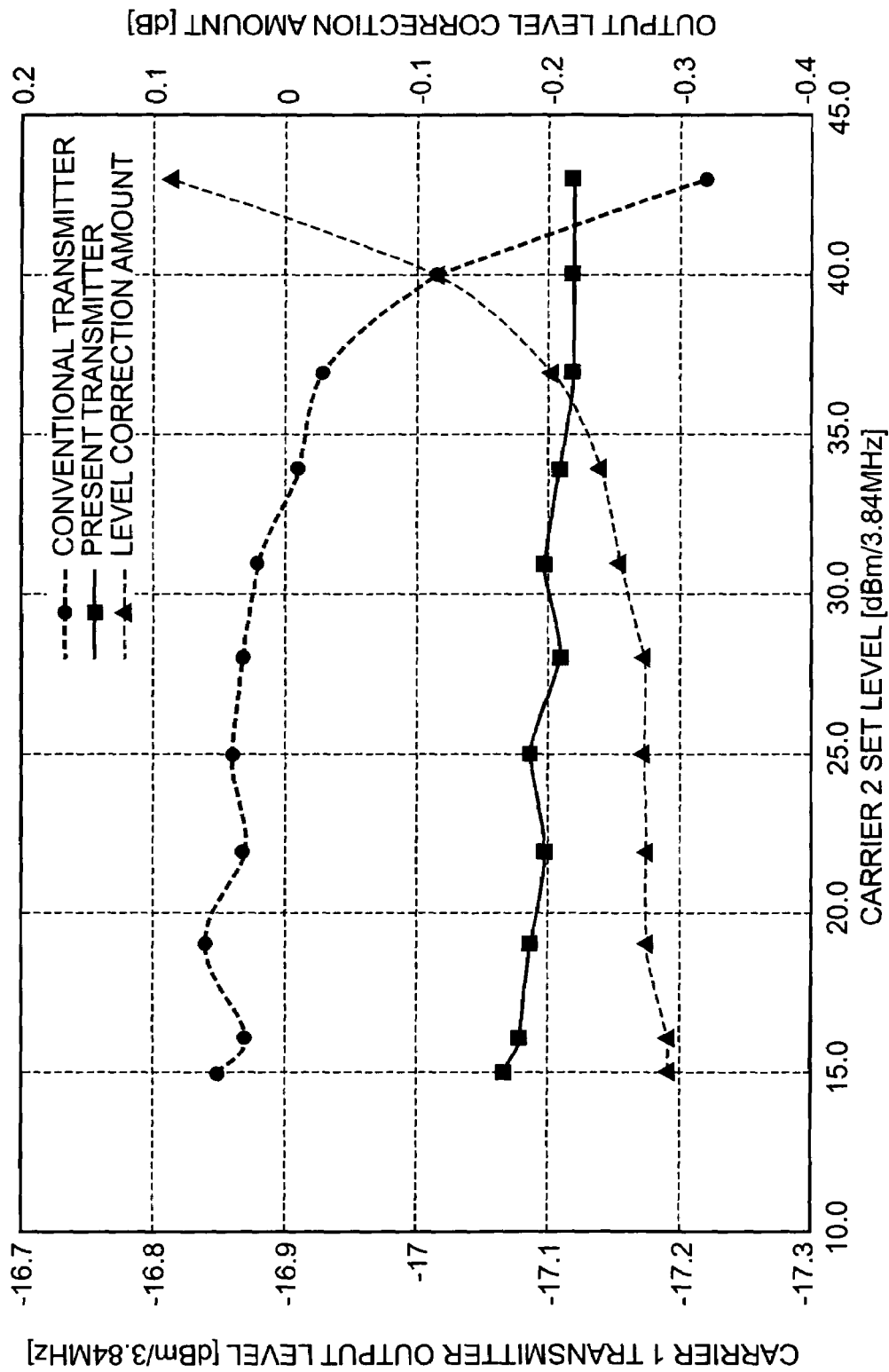
FIG. 5 is a graph showing characteristics relating to an input set level and an output level deviation in the transmitter according to the first embodiment of the present invention and the CDMA base station transmitter of the conventional art when two carriers of a 32 code-multiplexed signal are transmitted.

Next, the input/output characteristics of the carrier in the first transmitter and the conventional transmitter will be described with reference to FIGS. 4 and 5. FIG. 4 is a graph showing characteristics regarding an input set level and an output level deviation in the first transmitter and the transmitter of the conventional art when one carrier of a 32 code-multiplexed signal is transmitted. FIG. 5 is a graph showing characteristics relating to an input set level and an output level deviation in the first transmitter and the transmitter of the conventional art when two carriers of a 32 code-multiplexed signal are transmitted.

In the description of FIGS. 4 and 5, a level difference from an output level expected value represents a level difference from the output level of the transmitter. That is, when the input level increases linearly, the output level has a linearly increased value as the expected value. Further, a level correction amount is the level control information set by the monitoring section 18 which is theoretically equal to the output level of the first transmitter when the output of the transmitter of the conventional art is amplitude-controlled by the subsequent-stage signal level adjusting section 15 based on the level control information.

In the measurement of the characteristics shown in FIG. 4, the peak power suppressing section 11 which is used for the first transmitter and the conventional transmitter performs the level limitation of the carrier and set the threshold value to a fixed value. As shown in FIG. 4, in the case of the conventional transmitter, if the input set level increases, the input set level exceeds the threshold value of the peak power suppressing section by that amount and amplitude limitation is performed, which results in the deviation of about ±0.2 dB. In the first transmitter, the signal level adjusting section 15 multiplies the carrier by the level control information, and thus the deviation can be suppressed to about ±0.1 dB. Further, by changing (for example, increasing) an averaging time constant (x in the equation (7)) of each power measuring section, the deviation can be further smaller than ±0.1 dB.

Further, if (bit) precision at the time of calculating the mean power in each power measuring section is enhanced, precision of the gain value calculation in the monitoring section 18 is enhanced and precision of the level control which is performed by the signal level adjusting unit 15 is enhanced. Thus, the error of the output power can be reduced.

Further, in the measurement of the characteristics shown in FIG. 5, among two carriers, the input level of the carrier 1 is fixed and the input level of the carrier 2 varies. Further, the peak power suppressing section 11 is configured to operate based on the sum of the power levels of the carriers.

As shown in FIG. 5, in the case of the conventional transmitter, if the input set level of the carrier 2 increases, the operation frequency of the peak power suppressing section 11 becomes high, and the output level of the carrier 1 which is inputted with the constant level is lowered, not constant. For this reason, the deviation of about ±0.3 dB in the output level of the carrier 1 occurs.

On the other hand, in the first transmitter, similarly to the case of FIG. 4 in which one carrier is transmitted, the level control of the multicarrier signal is performed in the signal level adjusting section 15 based on the level control information set by the monitoring section 18. As a result, the deviation of the output level of the carrier 1 can be suppressed to about ±0.05 dB.

As apparent from the graph of FIG. 5, even when there exist multiple carriers in the W-CDMA communication scheme, the first transmitter can realize the power control of 0.1 dB or 0.05 dB.

That is, in the first transmitter, based on the mean input power in the identified carrier and the mean output power after the series of signal processes such as peak suppression, band limitation, and quadrature modulation is performed for each carrier, the level adjustment according to the current operation status of the device is performed on the multicarrier signal using the actual power value of the carrier and the threshold value determined according to the number of the operating carriers, the upper limit value, or the lower limit value. Thus, in particular, the second and third problems described above can be solved.

Second Embodiment

Figure 2:
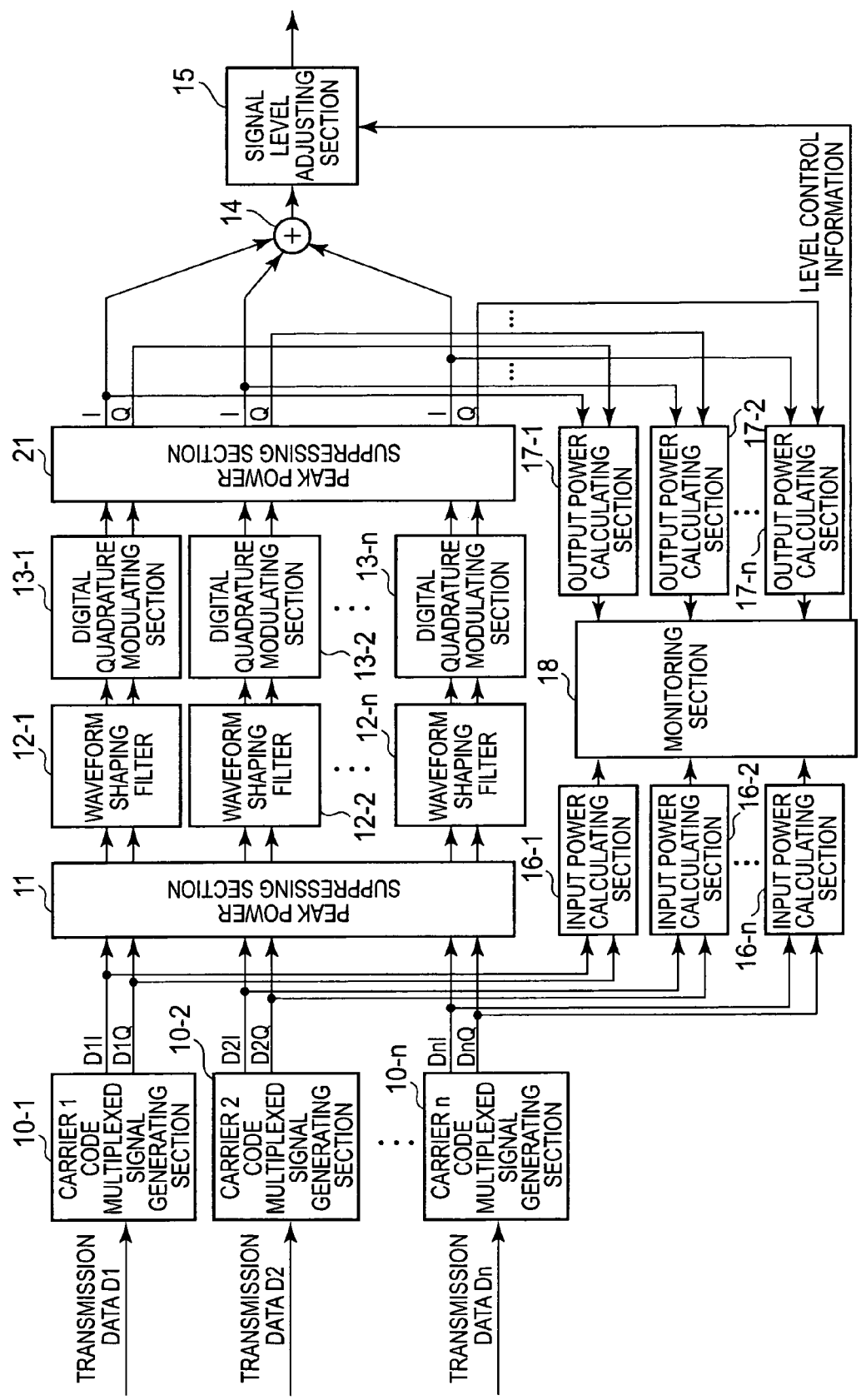
FIG. 2 is a block diagram showing a configuration of a transmitter according to a second embodiment of the present invention.

Next, a transmitter according to the second embodiment of the present invention (hereinafter, referred to as second transmitter) will be described, laying emphasis on the difference from the first transmitter. FIG. 2 is a block diagram showing a configuration of the second transmitter. Moreover, for description, like reference numerals are used to denote identical elements of the first transmitter.

The second transmitter is provided with a second peak power suppressing section 21 between the digital quadrature modulating sections 13-1 to 13-n and the adder 14. The configuration of the second peak power suppressing section 21 is the same as that of the peak power suppressing section 11. Further, in the second transmitter, each of the output power calculating sections 17-1 to 17-n calculates the mean output power of each carrier which is peak-limited by the second peak power suppressing section 21.

According to the second transmitter, the second peak power suppressing section 21 performs the peak limitation of each carrier which is band-limited by each of the waveform shaping filters 12-1 to 12-n. Thus, when the peak factor of a carrier increases, that is, is level-projected, by the band limitation, the suppression of the level of the projected portion can be performed on the carrier.

Accordingly, the monitoring section 18 performs the calculation process the level control information based on the mean output power of the previously peak-controlled carrier and outputs the calculated level control information to the signal level adjusting section 15. Therefore, the variation in level of the multicarrier signal can be averagedly suppressed reliably.

Third Embodiment

According to the third embodiment of the present invention, there is provided a transmitter which adjusts the transmission signal level of a multicarrier signal obtained by combining multiple carriers through band limitation and quadrature modulation. The transmitter has a monitoring section for outputting a level control amount which is the ratio of the input to output level ratio of a mean input level of each carrier to a mean output level after the band limitation and quadrature modulation to a predetermined expected value and a multiplying section for multiplying each carrier after the band limitation and quadrature modulation by a corresponding level control amount. Thus, the variation in level of the carrier after the band limitation can be averagedly suppressed for each carrier and the variation in level of the multicarrier signal can be averagedly suppressed.

According to the third embodiment of the present invention, there is provided a transmitter which adjusts the transmission signal level of the multicarrier signal obtained by combining multiple carriers through band limitation and quadrature modulation. The transmitter has a monitoring section, which has a table storing an estimated value of mean input level of each carrier in correlation with a control value regarding level adjustment of the carrier which is calculated based on the estimated value of the mean input level, for reading the control value corresponding to the estimated value, which is equivalent to the mean input level of each carrier, from the table and for outputting a level control amount of each carrier based on the control value and a multiplying section for multiplying each carrier after the band limitation and quadrature modulation by a corresponding level control amount. Thus, the variation in level of each carrier after the band limitation can be averagedly suppressed and the variation in level of the multicarrier signal can be averagedly suppressed.

Further, in the transmitter, the monitoring section is the one which outputs a specified level control amount among the level control amount corresponding to the respective carriers as the level control amount of the multicarrier signal. The transmitter has a level adjusting section which performs level adjustment by multiplying the multicarrier signal by the level control amount of a multicarrier. Thus, the variation in level of each carrier after the band limitation can be averagedly suppressed and thus the variation in level of the multicarrier signal can be averagedly suppressed.

Figure 3:
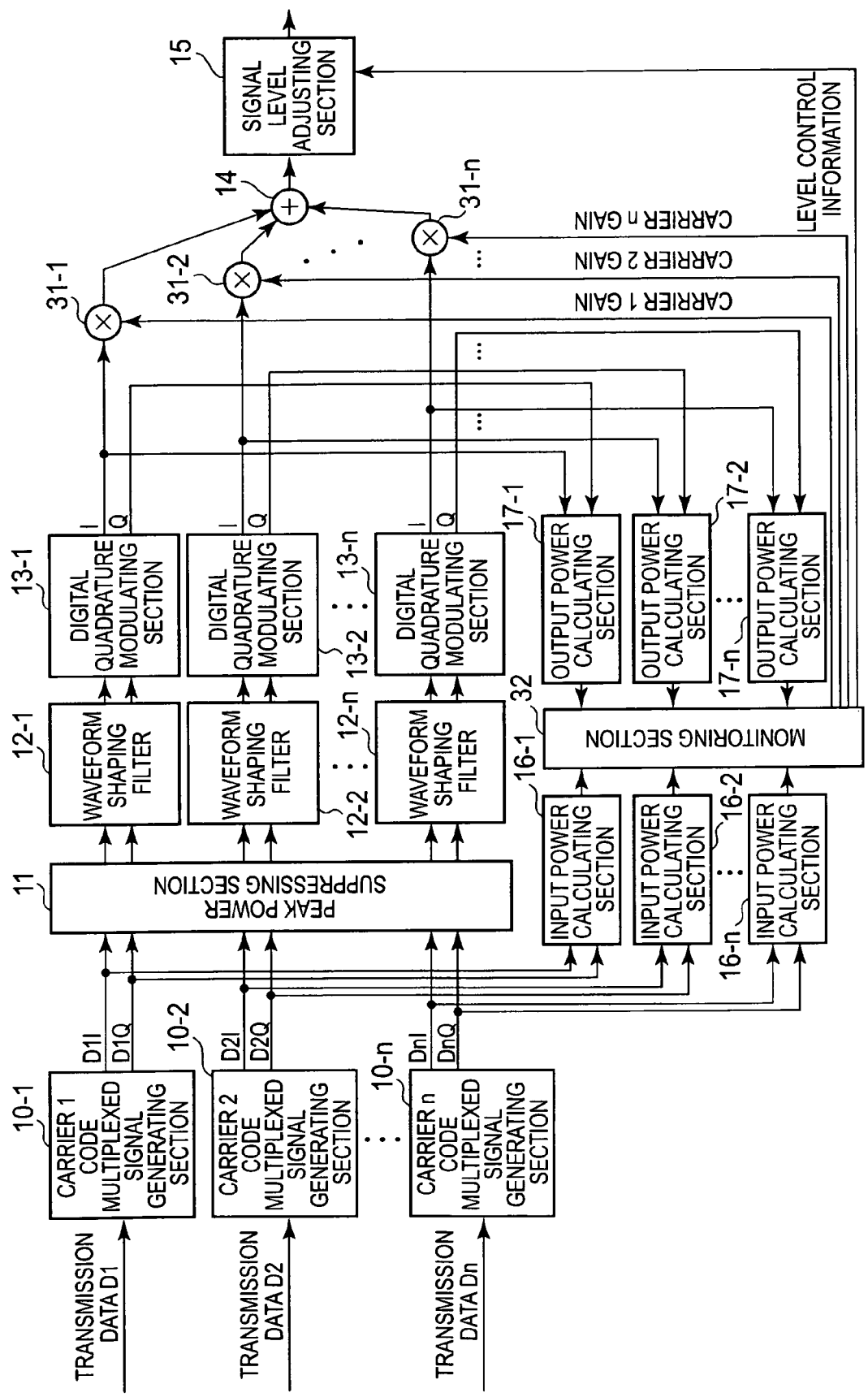
FIG. 3 is a block diagram showing a configuration of a transmitter according to a third embodiment of the present invention.

Next, a transmitter according to the third embodiment of the present invention (hereinafter, referred to as third transmitter) will be described, laying emphasis on the difference from the first transmitter. FIG. 3 is a block diagram showing a configuration of the third transmitter. Moreover, for description, like reference numerals are used to denote identical elements of the first transmitter.

The third transmitter is provided with multipliers 31-1 to 31-n corresponding to the respective carriers between the digital quadrature modulating sections 13-1 to 13-n and the adder 14. Further, a monitoring section 32 calculates level control information and outputs it to the signal level adjusting section 15. In addition, the monitoring section 32 calculates the gain value of each carrier suffered from the digital quadrature modulation and outputs it to the multipliers 31-1 to 31-n.

Moreover, the monitoring section 32 described herein is to realize the 'feed-forward control by calculation' of the first method that determines the gain value for adjusting the signal level of each carrier and the level control amount for adjusting the signal level of the multicarrier signal.

Figure 12:
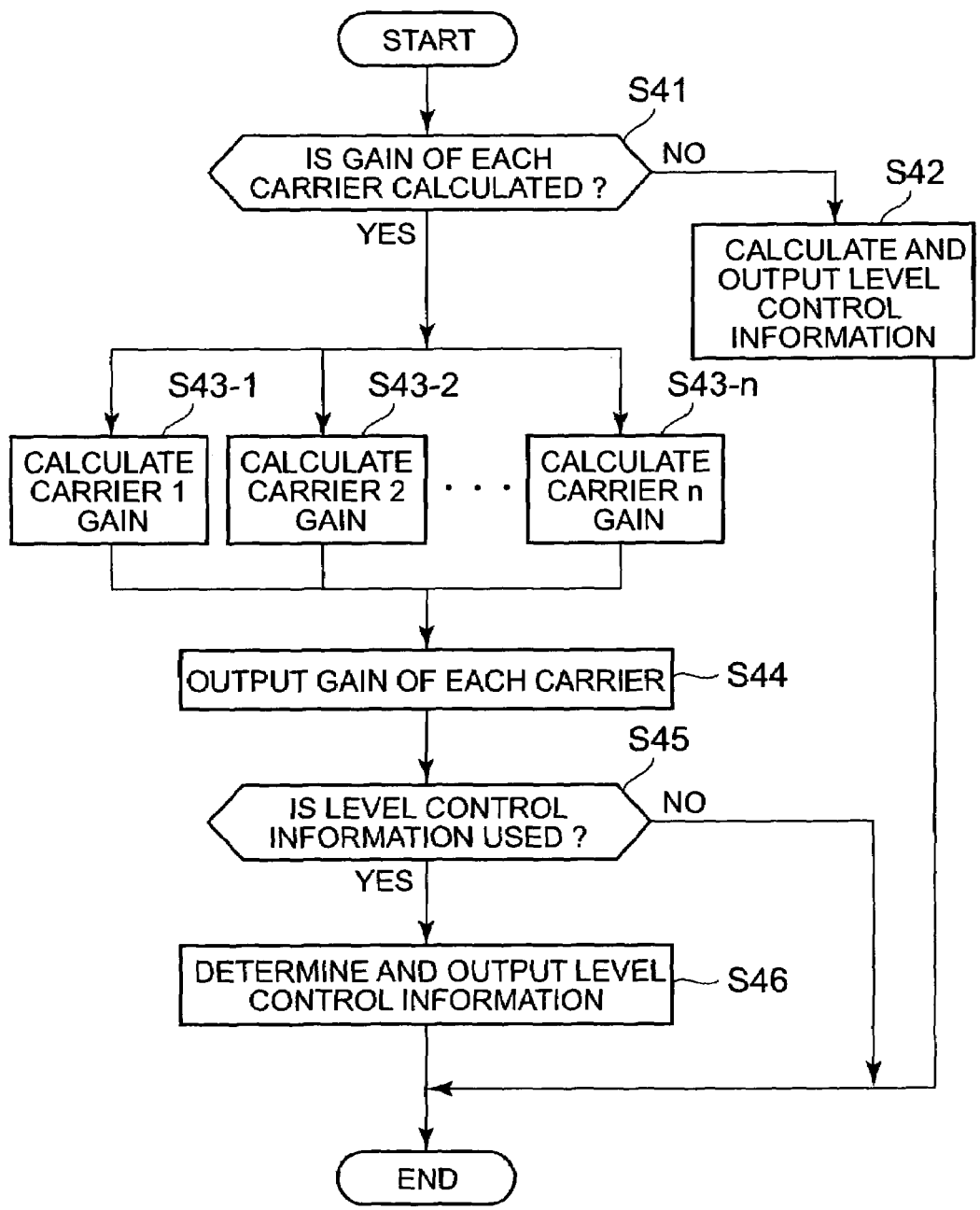
FIG. 12 is a flowchart of a calculation process of level control information and a gain value of each carrier in a monitoring section 32 of the transmitter according to the third embodiment of the present invention.
Figure 13:
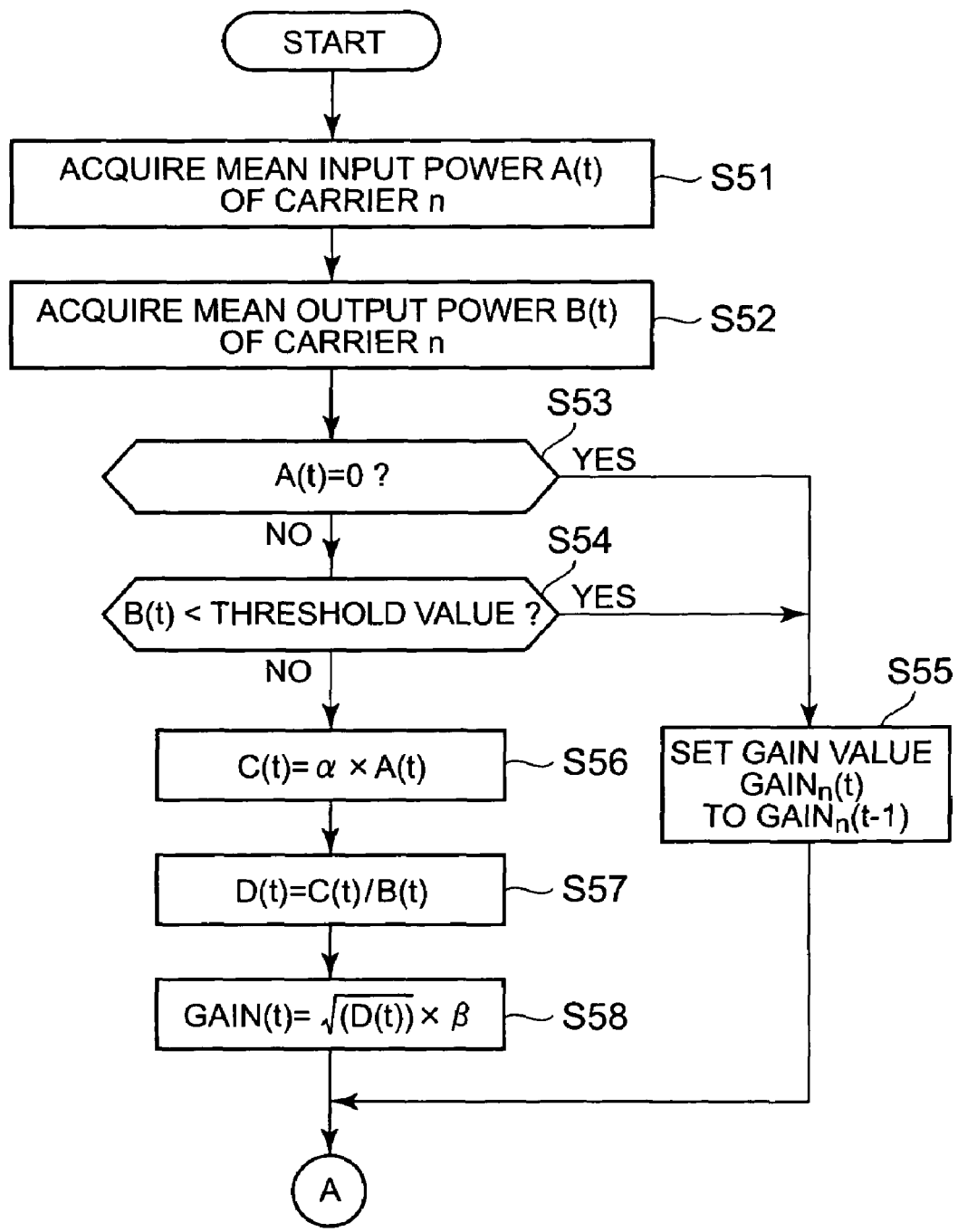
FIG. 13 is a flowchart of the calculation process of the gain values of the carriers in the monitoring section 32 of the transmitter according to the third embodiment of the present invention.
Figure 14:
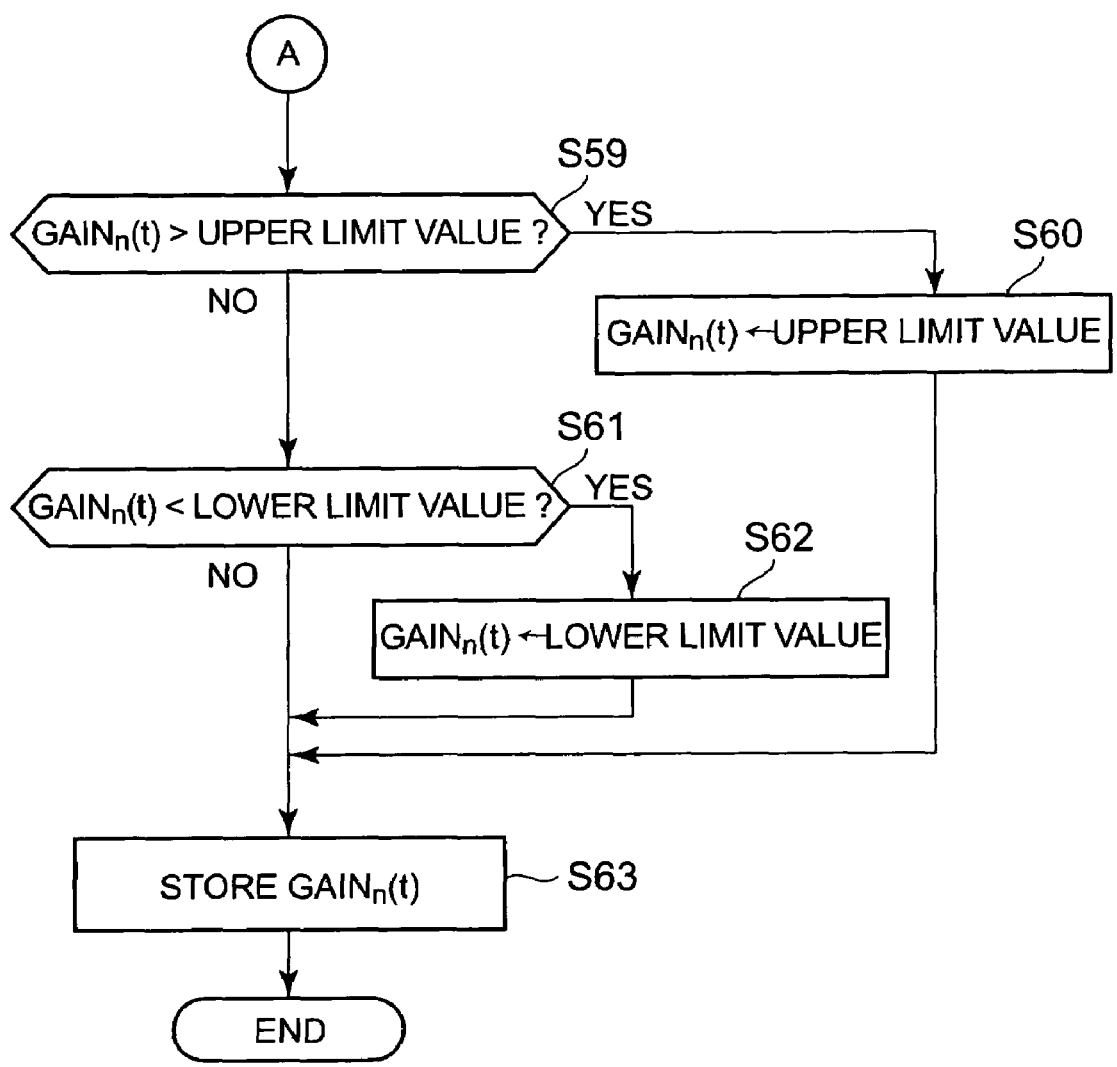
FIG. 14 is a flowchart of the calculation process of the gain values of the carriers in the monitoring section 32 of the transmitter according to the third embodiment of the present invention.

Hereinafter, the calculation method of the level control information and the gain value of each carrier in the monitoring section 32 of the third transmitter will be described with reference to FIGS. 12 to 14. FIG. 12 is a flowchart of a calculation process of the level control information and the gain value of each carrier in the monitoring section 32 of the third transmitter. FIGS. 13 and 14 are flowcharts of the calculation process of the gain values of the carriers in the monitoring section 32. Moreover, (A) in the flowchart of FIG. 13 is connected to (A) in the flowchart of FIG. 14.

In calculating the level control information and the gain value of each carrier, the monitoring section 32 previously set a process to be performed among 1) calculating only the level control information, 2) calculating only the gain value of each carrier, and 3) calculating both the level control information and the gain value of each carrier (hereinafter, referred to as calculation object setting).

In the processes of 1) to 3), precision of the level of the multicarrier signal or the carrier after the level adjustment is different. It is known that precision becomes high in an order of 3), 2), and 1). For this reason, a process to be performed in the monitoring section 32 among 1) to and 3) is preferably determined according to precision of a transmission power level to be required for each carrier.

Further, as regards a setting method of the process, the monitoring section 32 may be previously set to perform only a specified process or an administrator may select a process manually to set the process in the monitoring section 32.

In FIG. 12, first, the monitoring section 32 confirms a setting content of a calculation object to confirm whether or not the setting content is set to calculate the gain value of each carrier (S41). In a step S41, if it is confirmed that the setting content is set to calculate only the level control information of 1) (No of S41), the monitoring section 32 performs the calculation process of the level control information in an order of the flowchart shown in FIGS. 9 and 10, outputs the level control information to the signal level adjusting section 15 (S42), and ends the calculation process of the level control information.

In the step S41, if it is confirmed that the setting content is set to calculate only the gain value of each carrier of 2) or to calculate both the level control information and the gain value of each carrier of 3), the monitoring section 32 calculates the gain value of each carrier (S43).

In a step S43, the monitoring section 32 calculates the gain value for each carrier based on the mean input power of each carrier outputted from the output power calculating sections 16-1 to 16-n and the mean output power of each carrier outputted from the input power calculating sections 17-1 to 17-n. The detailed calculation method of the gain value of each carrier will be described later.

The gain value of each carrier calculated by the monitoring section 32 is outputted to the corresponding one of the multipliers 31-1 to 31-n (S44). The gain value of each carrier is multiplied by the carrier after the band limitation and digital quadrature modulation. The multiplication results of the multipliers 31-1 to 31-n are combined by the adder 14 and the combined signal is outputted to the signal level adjusting section 15 as the multicarrier signal.

Next, the monitoring section 32 confirms the setting content of the calculation object to confirm whether or not the setting content is set to calculate the level control information (S45). In the step S45, if it is confirmed that the setting content is set to calculate only the gain value of each carrier of 2) (No of S45), the monitoring section 32 ends the calculation process of the gain value of each carrier.

In the step S45, if it is confirmed that the setting content is set to calculate the level control information and the gain value of each carrier of 3) (Yes of S45), the monitoring section 32 determines the maximum gain value among the gain values calculated through the step S43 as the level control information, outputs it to the signal level adjusting section 15 (S46), and ends the calculation process.

In a step S46, the monitoring section 32 may set other conditions (for example, the second largest gain value) as the condition of the gain value which becomes the level control information, but, as described in the first transmitter, the maximum value is preferably adopted as the mean input power which is used as the input to output power ratio.

Next, the calculation process of the gain value of each carrier will be described with reference to FIGS. 13 and 14. Moreover, FIGS. 13 and 14 show a process which calculates the gain value of a carrier n, but the monitoring section 32 performs the same process for other carriers to calculate the gain values.

The monitoring section 32 monitors the values of the mean input power and the mean output power and the output statuses to monitor the operation statuses of the input power calculating sections 16-1 to 16-n and the output power calculating sections 17-1 to 17-n.

In FIG. 13, through the monitoring of the operation status, the monitoring section 32 acquires the mean input power $A(t)$ outputted from the input power calculating section 16-n among the input power calculating sections 16-1 to 16-n (S51). Next, the monitoring section 32 acquires the mean output power $B(t)$ outputted from the output power calculating section 17-n (S52).

Then, the monitoring section 32 confirms whether or not the maximum value $A(t)$ of the mean input power is 0 (zero), that is, there exists no carrier (S53). If the maximum value is not 0 (zero) (No of S53), the monitoring section 32 confirms whether or not the corresponding mean output power $B(t)$ is less than the predetermined threshold value (S54).

Here, similarly to the case of FIG. 9, the comparison judgment of the mean output power $B(t)$ and the threshold value of S54 is a required process for the device configuration. The threshold value is a value set in the monitoring section 32 in advance.

In the step S54, if $B(t)$ is equal to or more than the threshold value ($B(t) \geq$ threshold value) (No of S54), the monitoring section 32 judges that the level control of the carrier n can be performed and calculates the gain value of the carrier n.

Similarly to the case of the level control information, as regards the calculation of the gain value, the monitoring section 32 multiplies the factor $A(t)$ by the factor $\alpha$ (S56), divides the multiplication result $C(t)$ by $B(t)$ (S57), and calculates the reference observed ratio $D(t)$.

Here, similarly to the case of the level control information, the factor $\alpha$ ($\alpha > 0$) is the value which is determined according to the power value of the carrier n and is set in the monitoring section 18 in advance. In determining the factor $\alpha$, the monitoring section 32 calculates the input to output power ratio of reference data of the power value of the carrier n and sets the reciprocal thereof to $\alpha$.

Then, the monitoring section 32 acquires the square root of the reference observed ratio D(t) obtained in S58 and multiplies a correction factor β to calculate a gain value $GAIN_n(t)$ (S58).

Here, the correction factor β (β>0) is the correction factor having considered the frequency difference of the respective carriers and is previously set in the monitoring section 32. Further, the gain value $GAIN_n(t)$ is a parameter relating to the level adjustment of the carrier n.

In the step S53, when A(t) is 0 (zero), that is, there exists no carrier n (Yes of S53) or in the step S54, when B(t) is less than the threshold value (B(t)<threshold value) (Yes of S54), the monitoring section 32 sets the gain value $GAIN_n(t-1)$ used just before as the gain value $GAIN_n(t)$ (S55) Referring to FIG. 14, next, the monitoring section 32 confirms whether or not $GAIN_n(t)$ is larger than the upper limit value (S59). In the step S59, if $GAIN_n(t)$ is larger than the upper limit value ($GAIN_n(t)$>upper limit value) (Yes of S59), the monitoring section 32 substitutes the value of $GAIN_n(t)$ with the upper limit value (S60). If $GAIN_n(t)$ is equal to or less than the upper limit value ($GAIN_n(t)$≦upper limit value) (No of S59), next, the monitoring section 32 confirms whether or not $GAIN_n(t)$ is less than the lower limit value (S61).

In the step S61, if $GAIN_n(t)$ is less then the lower limit value ($GAIN_n(t)$<lower limit value) (Yes of S61), the monitoring section 32 substitutes the value of $GAIN_n(t)$ with the lower limit value (S62). If $GAIN_n(t)$ is equal to or more than the lower limit value ($GAIN_n(t)$≧lower limit value) (No of S61), the monitoring section 32 uses current $GAIN_n(t)$ as it is and decides the value of $GAIN_n(t)$.

Here, the upper limit value and the lower limit value of $GAIN_n(t)$ are values which are determined by the power value of the carrier and the number of operating carriers, similarly to the case of the level control information, and are set in the monitoring section 32 in advance.

If the gain value $GAIN_n(t)$ is determined, the monitoring section 32 stores $GAIN_n(t)$ in the embedded storage unit (S63). This is the calculation process of the gain value of the carrier in the monitoring section 32.

The monitoring section 32 periodically performs the above-described calculation process of the level control information and the gain value of each carrier at the specified timing. Further, the monitoring section 32 stores the gain value GAIN(t) for the multicarrier signal calculated at the old timing and the gain value $GAIN_n(t)$ for each carrier in the embedded storage unit (not shown). The stored gain values are read from the storage unit when a new gain value is calculated.

According to the third transmitter, the monitoring section 32 calculates the level control information for the multicarrier signal and simultaneously calculates the gain value for each carrier based on the mean input power and the mean output power of each carrier to output to the corresponding one of the multipliers 31-1 to 31-n. Each of the multipliers 31-1 to 31-n multiplies the corresponding carrier after the band limitation by the gain value.

Accordingly, the level adjustment according to the level of each carrier is performed and, for example, for a carrier the input level of which varies temporarily and abruptly, the level is further suppressed in addition to the level suppression which is uniformly performed by the peak power suppressing section 11 according to the variation. To the contrary, for a carrier the input level of which does not vary, the level suppression which is uniformly performed by the peak power suppressing section 11 is recovered. As a result, the variation of the output signal can be suppressed.

In the third transmitter, by performing the level adjustment of each carrier after the band limitation prior to the combination of the carriers, the variation in level of the carrier is averagedly suppressed and the level adjustment for the multicarrier signal is performed. Thus, the variation in level of the multicarrier signal can be averagedly suppressed more reliably.

In the above description, as the determination method of the level control information or the gain value in the monitoring section of each of the first to third transmitters, the first method ('feed-forward control by calculation') has been described. Hereinafter, the second method ('feed-forward control by table') will be described.

As a second determination method of the level control information or the gain value in the monitoring section of each of the first to third transmitters, the level control information may be outputted using a table in which the estimated value of the mean input power and the level control information are previously configured in pairs.

Figure 11:
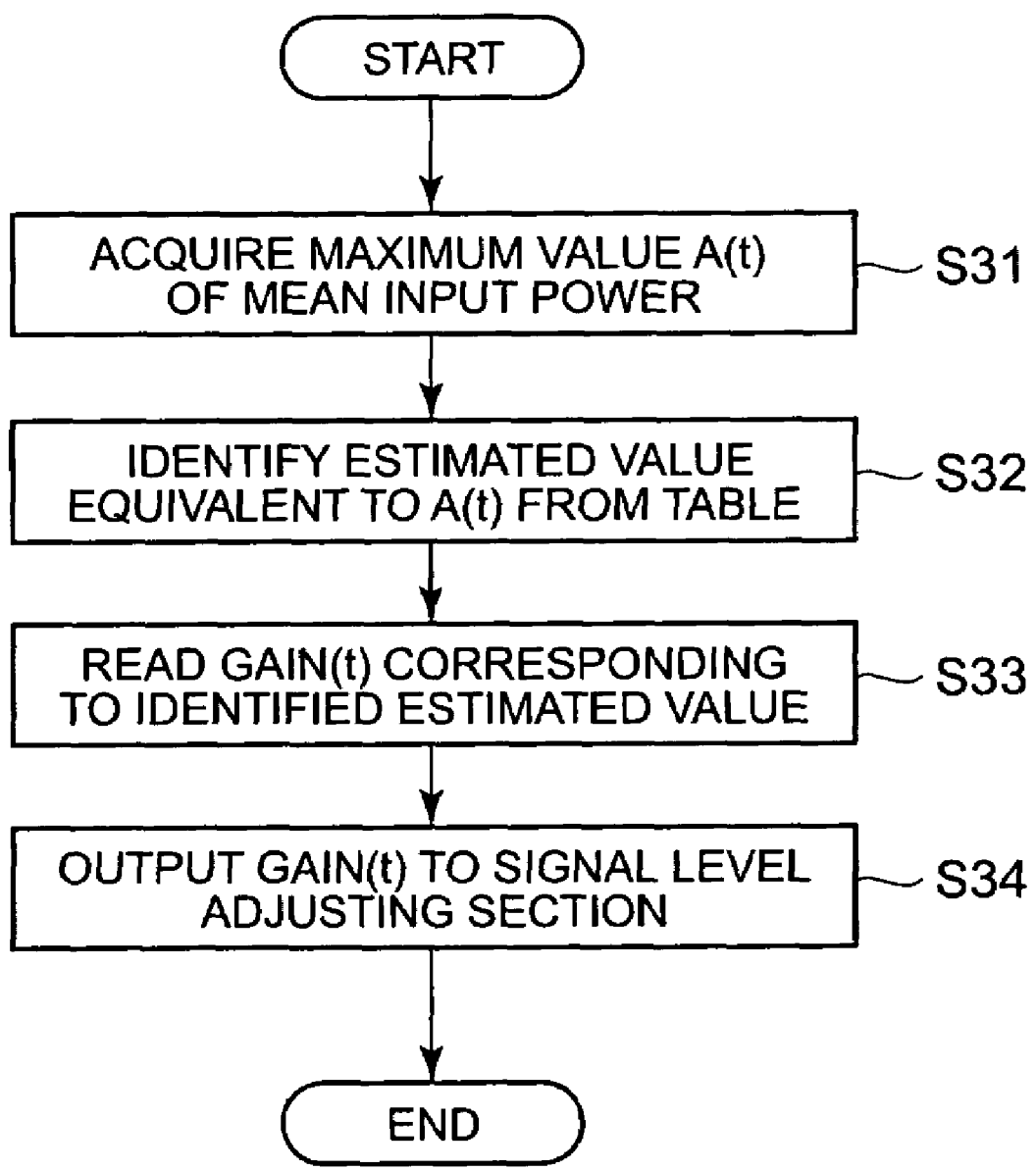
FIG. 11 is a flowchart of an output process of the level control information with a table in a monitoring section of the transmitter of each of the first to third embodiments of the present invention.

The operation of the second method ('feed-forward control by table') will be described by way of the example of the monitoring section 18 of each of the first and second transmitters with reference to FIG. 11. FIG. 11 is a flowchart of an output process of the level control information using a table in the monitoring section of each of the first and second transmitters.

In performing the above-described determination method, in the monitoring section, the table in which the estimated value of the mean input power of the carrier is stored in correlation with the gain value GAIN(t) is previously set. As the gain value GAIN(t), an optimum value of the gain value obtained by the measurement when the mean input power is the estimated value is stored.

The monitoring section monitors the operation statuses of the input power calculating sections 16-1 to 16-n and acquires the maximum value A(t) among the mean input power outputted from the input power calculating sections 16-1 to 16-n at the same timing (S31). Next, the monitoring section identifies an estimated value equivalent to the maximum value A(t) among the estimated values of the mean input power stored in the table (S32). In the step S32, the monitoring section specifically selects an estimated value which extremely approximates to the maximum value A(t) among the estimated values stored in the table to identify the estimated value.

Then, the monitoring section reads the gain value GAIN(t) corresponding to the identified estimated value (S33) and output it to the signal level adjusting section 15 as the level control information (S34). This is the output process of the level control information using the table.

In the monitoring section 32 of the third transmitter, the table in which the estimated value of the mean input power of the carrier is stored in correlation with the gain value is provided for each carrier and the above-described process is performed for each carrier. Accordingly, the gain value of each carrier can be outputted using the table.

According to the first to third transmitters, if the second method ('feed-forward control by table') is realized as the determination method of the level control information or the gain value in the monitoring section, the level control information or the gain value is outputted using the table. Thus, since the configuration for calculating the level control information or the gain value is not required, the configuration of the monitoring section can be simplified and the time required for outputting the level control information or the gain value can be reduced. As a result, the difference between output timings of the multicarrier signal or each carrier and the corresponding level control information or gain value may be mitigated.

Fourth Embodiment

Next, in a case that the third method ('feed-back control by table') is realized as the determination method of the level control information or the gain value in the monitoring section of each of the first to third transmitters, a configuration will be described by way of the fourth embodiment.

According to the fourth embodiment of the present invention, there is provided a transmitter which adjusts the transmission signal level of a multicarrier signal obtained by combining multiple carriers through band limitation and quadrature modulation. The transmitter has a multiplying section for multiplying a level control amount to be inputted for each carrier after band limitation and quadrature modulation to output a level-adjusted carrier and a monitoring section, which has a table storing an estimated value of mean input level of each carrier in correlation with an ideal value of mean output level of each carrier obtained based on the estimated value of the mean input level, for reading the ideal value of the mean output level corresponding to the estimated value, which is equivalent to the mean input level of each carrier, from the table and for adjusting a level control amount of each carrier such that the mean output level of the corresponding carrier outputted from the multiplying section is equal to the ideal value of the mean output level, to output the level control amount to the multiplying section. Thus, by performing the level control such that the level of each carrier becomes the ideal value of the mean output level corresponding to the mean input level, the variation in level of each carrier after the band limitation can be averagedly suppressed and the variation in level of the multicarrier signal can be averagedly suppressed.

Further, in the transmitter, the monitoring section is the one which outputs a specified level control amount among the level control amount corresponding to the respective carriers as the level control amount of the multicarrier. The transmitter has a level adjusting section which performs level adjustment by multiplying the multicarrier signal by the level control amount of a multicarrier. Thus, the variation in level of each carrier after the band limitation can be averagedly suppressed and thus the variation in level of the multicarrier signal can be averagedly suppressed.

Figure 15:
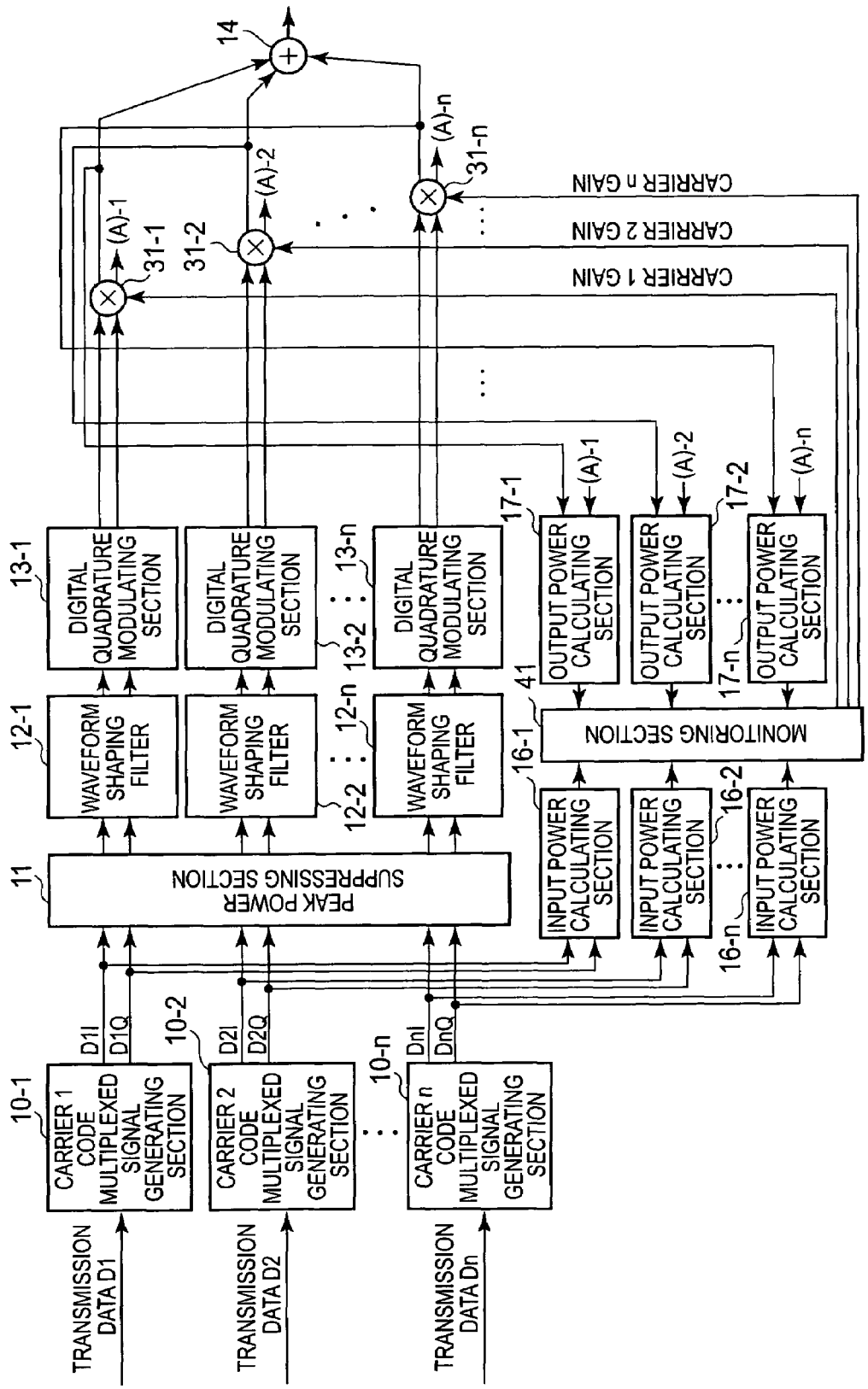
FIG. 15 is a block diagram showing a configuration of a transmitter according to a fourth embodiment of the present invention.
Figure 16:
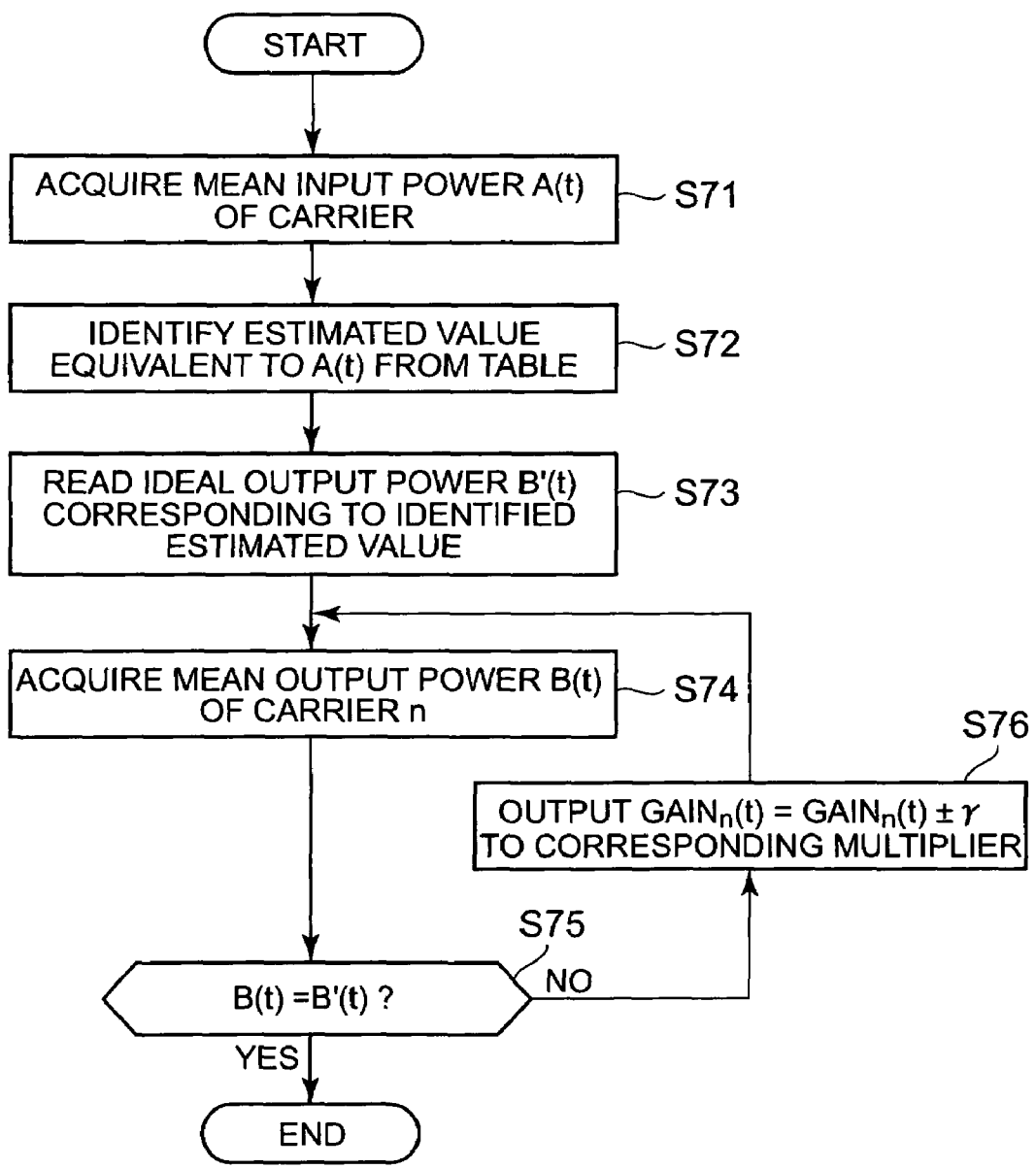
FIG. 16 is a flowchart of a calculation process of gain values of carriers in a monitoring section 41 of the transmitter according to the fourth embodiment of the present invention.

A transmitter according to the fourth embodiment of the present invention (hereinafter, referred to as fourth transmitter) will be described, laying emphasis on the difference from the first to third transmitters. FIG. 15 is a block diagram showing a configuration of the fourth transmitter and FIG. 16 is a flowchart of a calculation process of gain values of carriers in a monitoring section 41 of the fourth transmitter. Moreover, for description, like reference numerals are used to denote identical elements of the first to third transmitters.

In the fourth transmitter, each of the output power calculating sections 17-1 to 17-n calculates the mean output power of the carrier after the multiplication of the gain value in each of the multipliers 31-1 to 31-n and outputs the mean output power to the monitoring section 41. Further, the monitoring section 41 calculates the gain value of each carrier and outputs the gain value to the corresponding one of the multipliers 31-1 to 31-n. Further, the fourth transmitter is not provided with the signal level adjusting section and thus the multicarrier signal generated by the adder 14 is outputted to the D/A converter 2 as it is.

Next, the determination method of the gain value of each carrier in the monitoring section 41 will be described with reference to FIG. 16. Moreover, FIG. 16 shows a process which calculates the gain value of the carrier n, but the monitoring section 41 performs the same process for other carriers to calculate the gain values.

In performing the above-described determination method, in the monitoring section 41, the table in which the estimated value of the mean input power is stored in correlation with the ideal value of the mean output power is previously set for each carrier. As the ideal value of the mean output power, an optimum value of the mean output power obtained by the measurement when the mean input power is the estimated value is stored.

First, as a precondition, the monitoring section 41 outputs a predetermined initial value (for example, 1) of the gain value of each carrier to the corresponding one of the multipliers 31-1 to 31-n.

As the calculation process of the gain value, first, the monitoring section 41 acquires the mean input power $A(t)$ outputted from the input power calculating section 16-n among the input power calculating sections 16-1 to 16-n through the monitoring of the operation statuses (S71). Next, the monitoring section 41 identifies the estimated value equivalent to the mean input power $A(t)$ among the estimated values of the mean input power stored in the table (S72). In the step S72, the monitoring section 41 specifically selects the estimated value which approximates most to the mean input power $A(t)$ among the estimated values stored in the table.

Then, the monitoring section 41 reads ideal output power $B'(t)$, which is the ideal value of the mean output power corresponding to the identified estimated value, from the table (S73).

Further, the monitoring section 41 acquires the mean output power $B(t)$ of the carrier n outputted from the output power calculating section 17-n (S74) and compares the mean output power $B(t)$ with the ideal output power $B'(t)$ read in the step S73 to confirm whether or not they match with each other (S75).

In the step S75, if the mean output power $B(t)$ and the ideal output power $B'(t)$ do not match with each other (No of S75), the monitoring section 41 adds or subtracts a correction factor $\gamma$ to or from the gain value $GAIN_n(t-1)$ just before to calculate the new gain value $GAIN_n(t)$ and outputs it to the corresponding multiplier 31-n (S76). In the step S76, the new gain value $GAIN_n(t)$ is outputted to the multiplier 31-n and the multiplication of the carrier n is performed.

In the step S76, the correction factor $\gamma$ ($\gamma > 0$) is a parameter which is previously set in the monitoring section 41 and the value thereof varies according to the value of the mean input power or the mean output power of the carrier or the like. Further, in the step S76, the addition or subtraction of the correction factor $\gamma$ is determined according to the dimensional relationship between the mean output power $B(t)$ and the ideal output power $B'(t)$. For example, if the mean output power $B(t)$ is smaller than the ideal output power $B'(t)$, the addition is performed. To the contrary, if the mean output power $B(t)$ is larger than the ideal output power $B'(t)$, the subtraction is performed.

In the monitoring section 41, a table in which the ideal output power $B'(t)$, the mean output power $B(t)$, and the correction factor $\gamma$ are correlated with each other is set. From the relationship between the ideal output power $B'(t)$ and the mean output power $B(t)$, the correction factor $\gamma$ for use is determined and the new gain value $GAIN_n(t)$ is calculated.

Further, after executing the step S76, the monitoring section 41 returns to the step S74, acquires the mean output power of the carrier n again, and performs the comparison of the mean output power with the ideal output power B'(t) of the step S75. In the step S75, the monitoring section 41 performs a series of operations until the mean output power B(t) matches with the ideal output power B'(t) (Yes of S75). This is the determination process of the gain value in the monitoring section 41.

In the fourth transmitter described above, the monitoring section 41 calculates the ideal value of the mean output power of each carrier using the table and controls and outputs the gain value such that actual mean output power becomes the ideal value. However, similarly to the case of the monitoring section 32 of the third transmitter, the monitoring section may calculate the level control amount expected from the mean input power of each carrier or read the level control amount from the table to output to the multiplier 31, compare the mean output power after the multiplication of the level control amount in the multiplier 31 with the mean input power, correct the gain value such that the mean output power matches with the mean input power, and output the gain value.

When each of the first to third transmitters is realized by way of the first method which determines the level control amount for adjusting the signal level of the carrier or the multicarrier signal, the gain value of the multicarrier signal or each carrier is calculated based on the mean input power of each carrier before the peak limitation and the mean output power of the carrier after the peak limitation and band limitation and is outputted. By way of the feed-forward control in which the multicarrier signal or the carrier in which the peak limitation is not sufficiently performed or the peak limitation is excessively performed returns to a reference level by multiplying the gain value, the level adjustment of the multicarrier signal or each carrier is performed.

To the contrary, in the fourth transmitter, first, the monitoring section 41 outputs the predetermined initial value of the gain value of each carrier to the corresponding one of the multipliers 31-1 to 31-n, reads corresponding ideal mean output power based on the mean input power of each carrier before the peak limitation, compares the ideal mean output power with the mean output power of the carrier after the peak limitation, the band limitation, and the gain multiplication, calculates the new gain value by adding or subtracting the correction value when they are different from each other, and outputs the new gain value to the corresponding one of the multipliers 31-1 to 31-n. The monitoring section 41 repetitively performs the above-described operations.

That is, the fourth transmitter performs the level adjustment of each carrier by way of a feed-back control which compares the mean output power of the carrier after the level adjustment with the ideal value, corrects the gain value until the mean output power is equal to the ideal value, and output the gain value to the corresponding one of the multipliers 31-1 to 31-n.

In such a manner, as compared to the feed-forward control (first method) which calculates the gain value of the multicarrier signal or each carrier, the monitoring section 41 can rapidly identify the optimum gain value without using a complex calculation circuit.

Figure 17:
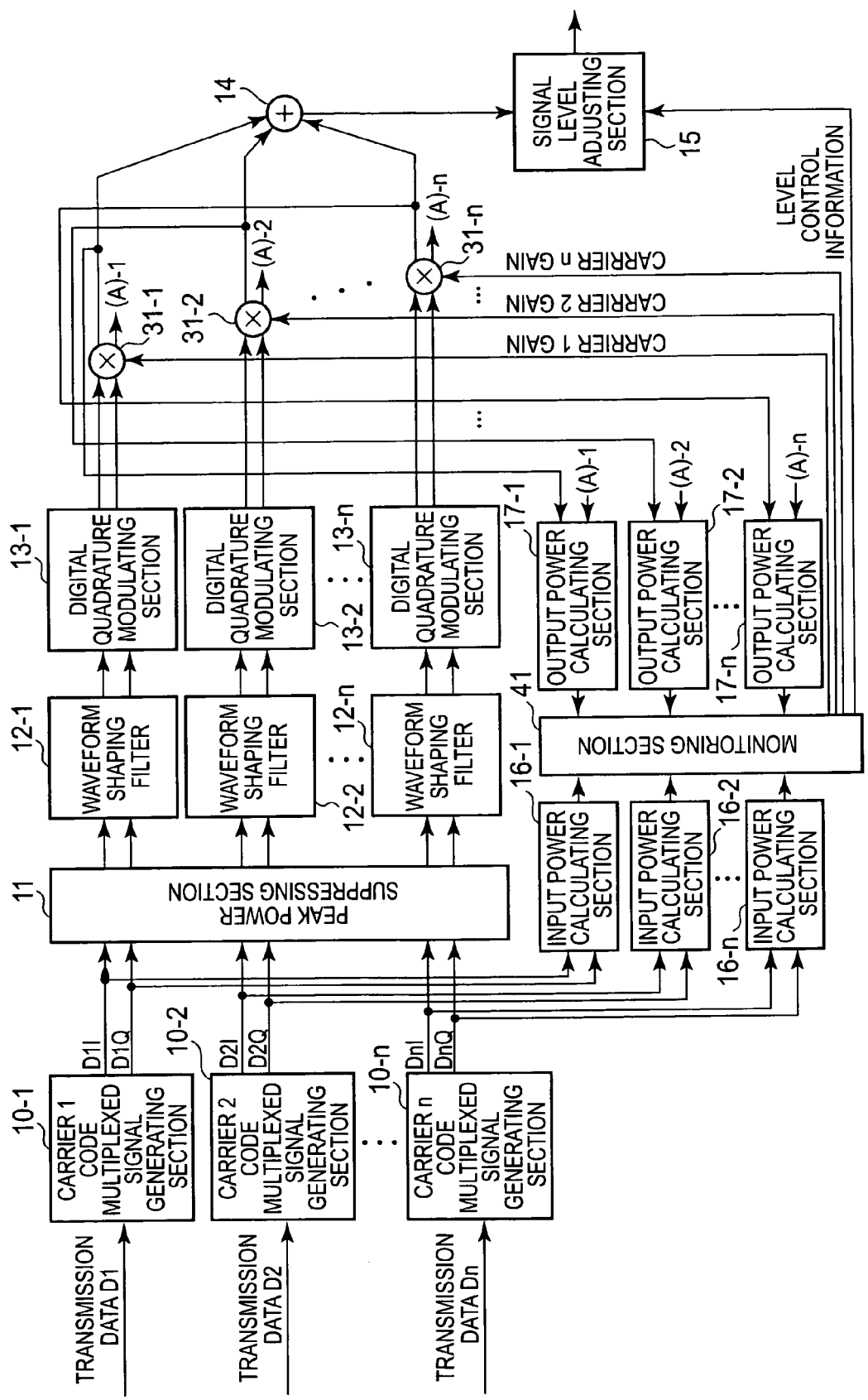
FIG. 17 is a block diagram showing a configuration of a modification of the transmitter according to the fourth embodiment of the present invention.

In the fourth transmitter, similarly to the first to third transmitters, the signal level adjusting section that performs the level adjustment of the multicarrier signal may be provided at a back end of the adder 14. FIG. 17 is a block diagram showing a configuration of a modification of the fourth transmitter, in which the signal level adjusting section 15 that performs the level adjustment of the multicarrier signal is provided at the back end of the adder 14. In this case, for example, similarly to the monitoring section 32 of the third transmitter, after the gain value of each carrier is determined, the monitoring section 41 determines the maximum gain value as the level control information and outputs the level control information to the signal level adjusting section 15. In this process, the monitoring section 41 may set other conditions (for example, the second largest gain value) as the condition of the gain value which becomes the level control information, but the maximum gain value is preferably used.

Further, the fourth transmitter performs the level adjustment by the feed-back control, and thus it takes much time until the mean output power of each carrier becomes the ideal value. Therefore, as another determination method of the level control information in the signal level adjusting section 15, until the mean output power of each carrier reaches the ideal value, similarly to the monitoring section 18 of the first transmitter, the monitoring section 41 calculates the level control information from the mean input power and the mean output power of the carrier having the maximum mean input power and outputs the level control information to the signal level adjusting section to multiply the multicarrier signal by the level control information. Accordingly, the difference between the mean output power of each carrier and the ideal value, which could not be handled by the feed-back control, can be solved.

In the third and fourth transmitters described above, based on the mean input power of each carrier and the mean output power after the series of signal processes such as peak suppression, band limitation, and quadrature modulation, the level adjustment according to the current operation status of the device is performed for each carrier using the actual power value of the carrier and the threshold value determined according to the number of the operating carriers, the upper limit value, or the lower limit value. Thus, in particular, the first problem described above can be solved.

In addition, if the level adjustment is further performed on the multicarrier signal, the level adjustment according to the current operation status of the device is also performed on the multicarrier signal, and thus all problems can be solved.

As described above, according to the transmitter which belongs to the first type of the present invention, a carrier having the maximum mean input power is identified by the monitoring section, the maximum value is acquired, and the mean output power of the identified carrier is acquired. Then, the ratio of the mean input power obtained to the mean output power is determined, the level control information which is the ratio of the ratio determined above to the predetermined expected value is calculated, and the level of the multicarrier signal is adjusted by multiplying the multicarrier signal by the level control information in the signal level adjusting section. Thus, it has an advantage that the variation in level of the multicarrier signal can be averagedly suppressed according to the variation in input level of the carrier.

Further, the multiplier that multiplies the carrier after the band limitation by the gain value is provided for each carrier. The monitoring section determines the ratio of the mean input power to the mean input power for each carrier, calculates the gain value of each carrier based on the ratio of the ratio determined above to the predetermined expected value, and outputs the gain value to the corresponding multiplier. Thus, it has an advantage that the variation in level of each carrier after the band limitation can be suppressed and the variation in level of the multicarrier signal can be averagedly suppressed.

Further, in the transmitter that belongs to the first type of the present invention, the level adjustment of each carrier or the multicarrier is performed using the gain value calculated based on the mean input power of the identified carrier or each carrier and the mean output power after the band limitation. Thus, the peak caused by the band limitation of each carrier can be adjusted together. Thus, when the peak factor threshold value is set in the peak power suppressing section 11, it is not necessary to set a low threshold value in consideration of the peak caused by the band limitation. As a result, the level adjustment according to an actual peak can be performed.

Moreover, the configurations of the transmitters (FIGS. 1, 2, 3, 15, and 17) described above all are the one of the transmitter 1 which is used for the transmission amplifier shown in FIG. 6. Among the I and Q components of the quadrature-modulated carriers outputted from the digital quadrature modulating sections 13-1 to 13-n, the I components are combined with the adder 14 to output the multicarrier signal. In the signal level adjusting section 15, the level adjustment is performed on the multicarrier signal obtained by combining the I components. Hereinafter, the transmitter 1 of this type is referred to as a digital quadrature modulation-type transmitter.

To the contrary, in order to configure a transmitter 1' which is used for a transmission amplifier shown in FIG. 18, in each transmitter, a peak voltage suppressing section 21 (FIG. 2) or the multiplier 31 provided at the back end of the digital quadrature modulating section 13 receives the I and Q components of the quadrature-modulated carriers outputted from the digital quadrature modulating sections 13-1 to 13-n and performs peak voltage suppression or gain multiplication.

Then, two adders 14-1 and 14-2 are provided at the back end of the digital quadrature modulating section 13, the peak voltage suppressing section 21, or the multiplier 31 to add the I and Q components of the carriers respectively and output the multicarrier signal after combination as the I and Q components.

Then, in the configuration which has the signal level adjusting section 15, it is assumed that the level adjustment is performed on the I and Q components of the multicarrier signal. Hereinafter, the transmitter 1' is referred to as an analog quadrature modulation-type transmitter.

As a result, the analog quadrature modulation-type transmitter 1' which is used for the transmission amplifier shown in FIG. 18 performs the same operation of the digital quadrature modulation-type transmitter 1 and has the same advantages.

Next, a transmitter which belongs to the second type of the present invention will be described.

There is provided the transmitter that belongs to the second type of the present invention. The transmitter, which transmits a multicarrier signal obtained by combining multiple carriers through peak power suppression, band limitation, and quadrature modulation, adjusts the signal level of the multicarrier signal based on mean input power of the sum of all carriers (and, in some cases, mean output power of the multicarrier signal).

The transmitter that belongs to the second type of the present invention will be described according to functional elements. The transmitter has an input power calculating section for calculating mean input power of the sum of all carriers, an output power calculating section for calculating mean output power of a multicarrier signal obtained by combining the carriers through band limitation, a monitoring section for determining the ratio of the mean input power to the mean output power and outputting level control information which is the ratio of the ratio determined above and a predetermined expected value, and a signal level adjusting section for adjusting the level of a multicarrier signal by multiplying the level control information outputted from the monitoring section. Accordingly, the variation in level of the multicarrier signal can be averagedly suppressed according to the variation in input level of the carrier.

Further, in the monitoring section, as the determination method of the level control information of the multicarrier, a method in which the determination is performed with a table in which an estimated value of the mean input power of the sum of the carriers is correlated with a level control amount or a method in which the level control amount is adjusted with a table in which the estimated value of the mean input power of the sum of the carriers is correlated with an ideal value of the mean output power of the multicarrier signal such that the mean output power is equal to the ideal value is implemented. Accordingly, with a simple control, the variation in level of the multicarrier signal can be averagedly suppressed according to the variation in input level of the carrier.

An example of a specified configuration of the transmitter that belongs to the second type of the present invention will be described by way of the fifth to sixth embodiments.

Fifth Embodiment

Next, a transmitter according to the fifth embodiment of the present invention (hereinafter, referred to as fifth transmitter) will be described, laying emphasis on the difference from the first transmitter.

Figure 19:
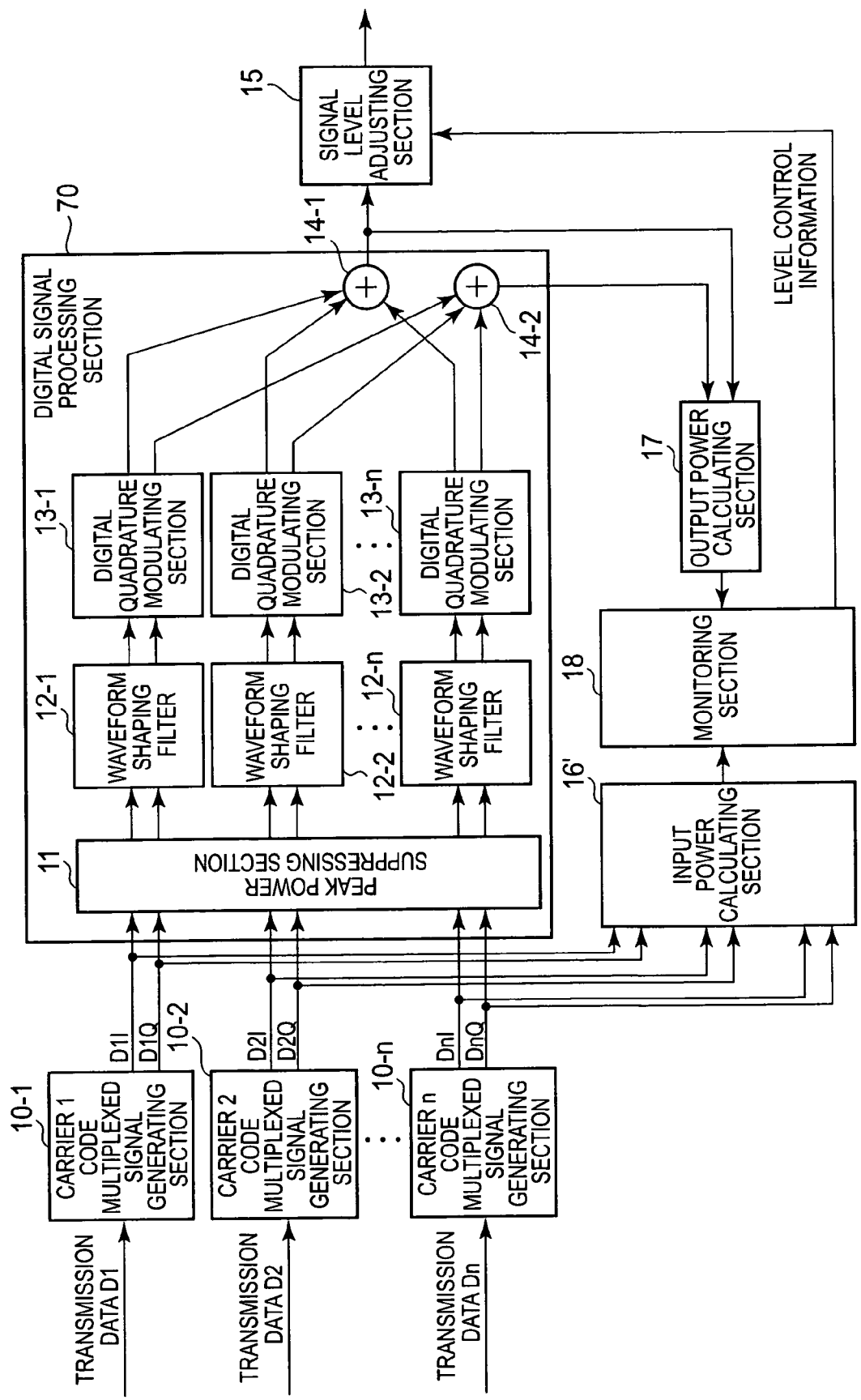
FIG. 19 is a block diagram showing a configuration of a transmitter according to a fifth embodiment of the present invention.

First, the configuration of the fifth transmitter will be described with reference to FIG. 19. FIG. 19 is a block diagram showing the configuration of the transmitter according to the fifth embodiment. Moreover, for description, like reference numerals are used to denote identical elements of the first transmitter.

The fifth transmitter has the carrier code multiplexed signal generating sections 10-1 to 10-n, the peak power suppressing section 11, the waveform shaping filters 12-1 to 12-n, the digital quadrature modulating sections 13-1 to 13-n, the adders 14-1 and 14-2, the signal level adjusting section 15, an input power calculating section 16', and output power calculating section 17, and the monitoring section 18, as the same elements as those of the first transmitter.

Moreover, in the fifth transmitter, the input power calculation object in the input power calculating section 16', the output power calculation object in the output power calculating section 17, the calculation method of the level control information in the monitoring section 18 are somewhat different from the first transmitter.

Further, in the fifth transmitter, a portion which includes the peak power suppressing section 11, the waveform shaping filters 12-1 to 12-n, the digital quadrature modulating sections 13-1 to 13-n, and the adder 14-1 and 14-2 is referred to as a digital signal processing section 70.

Next, a configuration of each element of the fifth transmitter will be described. The carrier code multiplexed signal generating section 10 to the signal level adjusting section 15 are the same as those of the first transmitter and the descriptions thereof will be omitted. Moreover, the adders 14-1 and 14-2 are provided for the I and Q components respectively.

In the fifth transmitter, the input power calculating section 16' receives all diffusion-modulated carriers outputted from the carrier code multiplexed signal generating sections 10-1 to 10-n, calculates the mean input power of the sum of all carriers based on the power value of each carrier, and outputs the mean input power to the monitoring section 18.

Here, the calculation method of the mean input power in the input power calculating section 16' will be described, laying emphasis on the difference from the input power calculating section 16 of the first transmitter.

In the first transmitter, the input power calculating section 16 is provided for each carrier and calculates the power value for the input signal of one carrier. To the contrary, in the input power calculating section 16' of the fifth transmitter, the sum of the input signals of all carriers is acquired to calculate the power value.

Thus, when the input signal of each carrier is represented by the equation (1), the sum Pow of the power levels of the input signals of all carriers can be represented by the following equation (8).

[Expression 7]

$$A_i(t) = \sum_{k=1}^{n} I_k(t) \quad A_q(t) = \sum_{k=1}^{n} Q_k(t) \quad (8)$$

$$Pow(t) = A_i(t)^2 + A_q(t)^2$$

Next, the input power calculating section 16' performs a weighting calculation process represented by the equation (6) and an averaging process represented by the equation (7) using the calculated sum Pow of the power levels, as described in the first transmitter.

The output power calculating section 17 receives the multicarrier signal in which the I and Q components are added, calculates the mean output power of the multicarrier signal, and outputs the mean output power to the monitoring section 18. The calculation method of the mean output power in the output power calculating section 17 is the same as that in the first transmitter, except that the input signal is the multicarrier signal.

The monitoring section 18 calculates a parameter relating to the level adjustment of the multicarrier signal based on the mean input power outputted from the input power calculating section 16' and the mean output power outputted from the output power calculating section 17 and outputs it to the signal level adjusting section 15 as the level control information.

The monitoring section 18 described herein is to realize the 'feed-forward control by calculation' of the first method that determines the level control amount for adjusting the signal level of the multicarrier signal.

Figure 22:
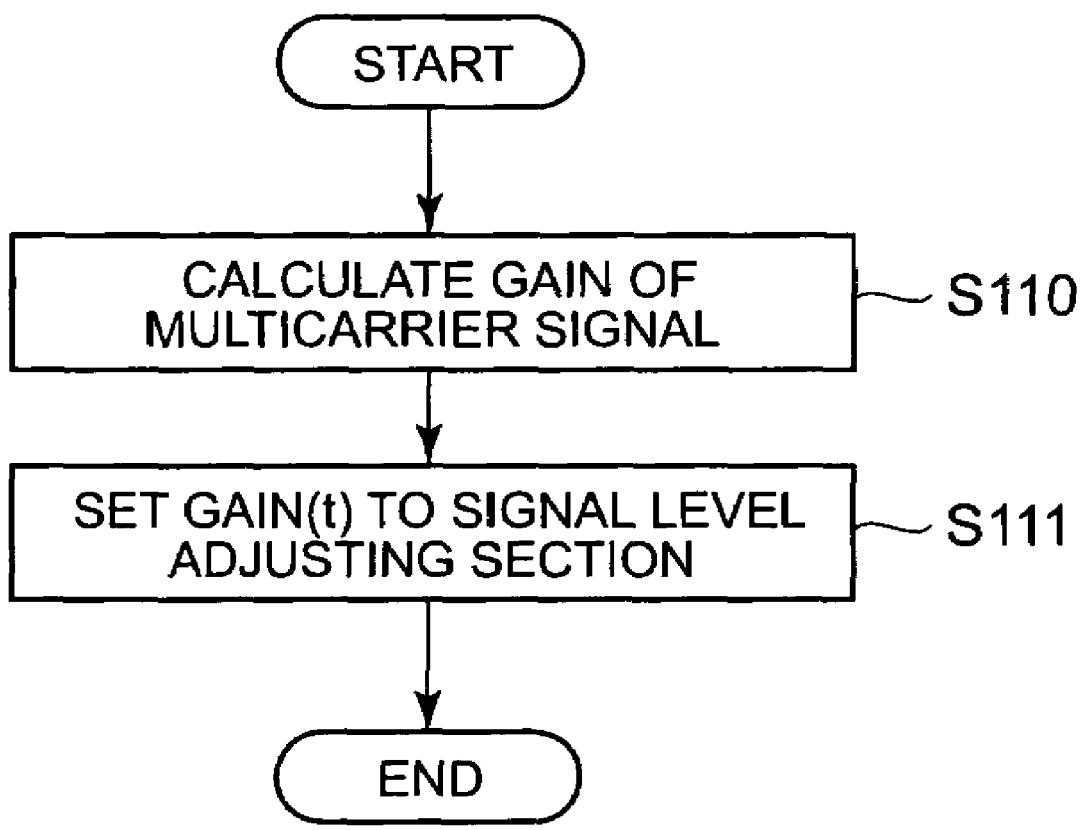
FIG. 22 is a flowchart of a setting process of level control information in a monitoring section of the fifth transmitter of the present invention.

Here, the calculation method of the level control information of the monitoring section 18 in the fifth transmitter will be described with reference to FIG. 22. FIG. 22 is a flowchart of a setting process of the level control information in the monitoring section 18 of the fifth transmitter of the present invention.

In FIG. 22, first, the monitoring section 18 calculates the level control information (gain value) of the multicarrier signal based on the mean input power of the sum of the carriers outputted from the input power calculating section 16' and the mean output power of the multicarrier signal outputted from the output power calculating section 17 (S110) and outputs the calculated level control information to the signal level adjusting section 15 (S111).

The detailed processing flow of the level control information calculation process (S110) in the monitoring section 18 of the fifth transmitter is almost the same as that described in the level control information (gain value) calculation process flow of the multicarrier in the monitoring section 18 of the first transmitter with reference to FIGS. 9 and 10 and thus the detailed description thereof will be omitted.

In FIGS. 9 and 10, there exists the step (S12) in which the carrier having the maximum mean input power among the mean input power of the multiple carriers is selected. In this case, the calculation is performed according to the mean input power and the mean output power of the selected carrier.

To the contrary, in the monitoring section 18 of the fifth transmitter, the mean input power of the sum of the carriers is inputted as the mean input power, the mean output power of the multicarrier signal is inputted as the mean output power, and the level control information of the multicarrier signal is calculated from the mean input power and the mean output power. Accordingly, (S12) is not required. This is the only difference from the calculation process in the monitoring section 18 of the first transmitter.

Then, the threshold value and the upper and lower limit values of the GAIN(t) which are used for the comparison with the mean output power B(t) during the process are values for the multicarrier which are determined according to the power value of the carrier and the number of the operating carriers.

Further, the factor $\alpha$ ($\alpha>0$) used for the calculation process is a value which is determined according to the sum of the power values of the multiple carriers and is set in the monitoring section 18 in advance. In determining the factor $\alpha$, the monitoring section 18 calculates the input to output power ratio of reference data of the sum of the power levels of the multiple carrier signals and the power value of the multicarrier signal and sets the reciprocal thereof to $\alpha$.

Next, the operation of the fifth transmitter will be described, laying emphasis on the difference from the first transmitter.

The operation of the main line system of the fifth transmitter is similar to the first transmitter. That is, transmission data of the carriers which are digital data are inputted to the corresponding carrier code multiplexed signal generating sections 10-1 to 10-n and are combined through the diffusion modulation by the unique diffusion codes. The inphase component (I component) and the quadrature component (Q component) for each carrier are outputted. The peak power suppressing section 11 performs the uniform peak limitation on the respective carriers based on the sum of the power levels of the carriers. Further, the carriers undergo the band limitation by the waveform shaping filters 12-1 to 12-n and the quadrature modulation by the digital quadrature modulating sections 13-1 to 13-n. Then, the I and Q components are combined by the adders 14-1 and 14-2 respectively. The combined signal is outputted as the multicarrier signal.

Then, as distinguishable operations of the fifth transmitter, the I and Q components of the respective carriers outputted from the carrier code multiplexed signal generating sections 10-1 to 10-n are inputted to the input power calculating section 16', and the mean input power of the sum of all carriers is calculated by the input power calculating section 16' based on the power values of the respective carriers and is outputted to the monitoring section 18.

Further, the I and Q components of the multicarrier signal combined by the adders 14-1 and 14-2 are inputted to the output power calculating section 17, and the mean output power of the multicarrier signal is calculated by the output power calculating section 17 and is outputted to the monitoring section 18.

In the monitoring section 18, based on the mean input power from the input power calculating section 16' and the mean output power from the output power calculating section 17, the level control information of the multicarrier signal is calculated and outputted. The level adjustment is performed on the multicarrier signal by the signal level adjusting section 15.

In the fifth transmitter, the level adjustment in the signal level adjusting section 15 is performed according to the level of the multicarrier signal, and thus, preferably, the multicarrier signal outputted from the main line system of the fifth transmitter (from the peak power suppressing section 11 to the adder 14) and the level control information corresponding to the multicarrier signal outputted from the control system (the input power calculating sections 16', the output power calculating sections 17, and the monitoring section 18) are inputted to the signal level adjusting section 15 at the same timing.

For this reason, the main line system or the control system may be provided with a delay unit to synchronize data outputs of the main line system and the control system.

According to the fifth transmitter, based on the mean input power of the sum of the carriers and the mean output power of the multicarrier signal, the monitoring section 18 calculates the control amount of the level adjustment of the multicarrier signal obtained by combining the carriers and the signal level adjusting section 15 performs the level adjustment of the multicarrier signal using the control amount. Thus, the variation in level of the multicarrier signal can be averagedly suppressed according to the variation of the sum of the power levels caused by the variation in input level of each carrier.

A typical peak power suppressing section 11 performs the peak control of each carrier according to the sum of the power levels of the carriers, but there are many cases in which the peak or the like is caused by the subsequent band limitation or the like. The fifth transmitter calculates the control amount of the level adjustment of the multicarrier signal based on the mean input power of the sum of the power levels of the carriers and the mean output power of the multicarrier signal obtained by combining the carriers through the band limitation reliably to perform the level adjustment. Thus, while suppressing the peak of the signal finally inputted to the amplifier including the peak or the like caused by the band limitation or the like, the variation in level of the multicarrier signal can be averagedly suppressed stably.

In the above description, as the determination method of the level control information in the monitoring section 18 of the fifth transmitter, the first method ('feed-forward control by calculation') has been described. However, similarly to the first transmitter, the determination method may be implemented with the second method ('feed-forward control by table') in which the level control information may be outputted using a table in which the estimated value of the mean input power and the level control information are previously configured in pairs.

In this case, in the monitoring section 18, the table in which the estimated value of the mean input power (in the fifth transmitter, the mean input power of the sum of the power levels of the carriers) is stored in correlation with the level control information GAIN(t) of the control object signal (in the fifth transmitter, the multicarrier signal) is previously set.

Here, as the level control information GAIN(t), an optimum value of the level control information obtained by the measurement when the mean input power of the sum of the power levels of the carriers is the estimated value is stored.

Further, in the monitoring section 18, the processing operation which realizes the second method ('feed-forward control by table') is the same as the processing operation of the monitoring section 18 of the first transmitter described with reference to FIG. 11 and the detailed description thereof will be omitted.

The difference from the processing operation of the monitoring section 18 of the first transmitter is that, while the maximum value is acquired from the mean input power of the carriers inputted from the plurality of input power calculating sections 16-1 to 16-n in the step S3 of FIG. 11, the mean input power of the sum of the power levels of the carriers inputted from the input power calculating section 16' may be acquired as it is in the monitoring section 18 of the fifth transmitter.

Sixth Embodiment

Next, as the determination method of the level control information in the monitoring section of the fifth transmitter, a configuration which realizes the third method ('feed-back control by table') will be described by way of the sixth embodiment.

Figure 20:
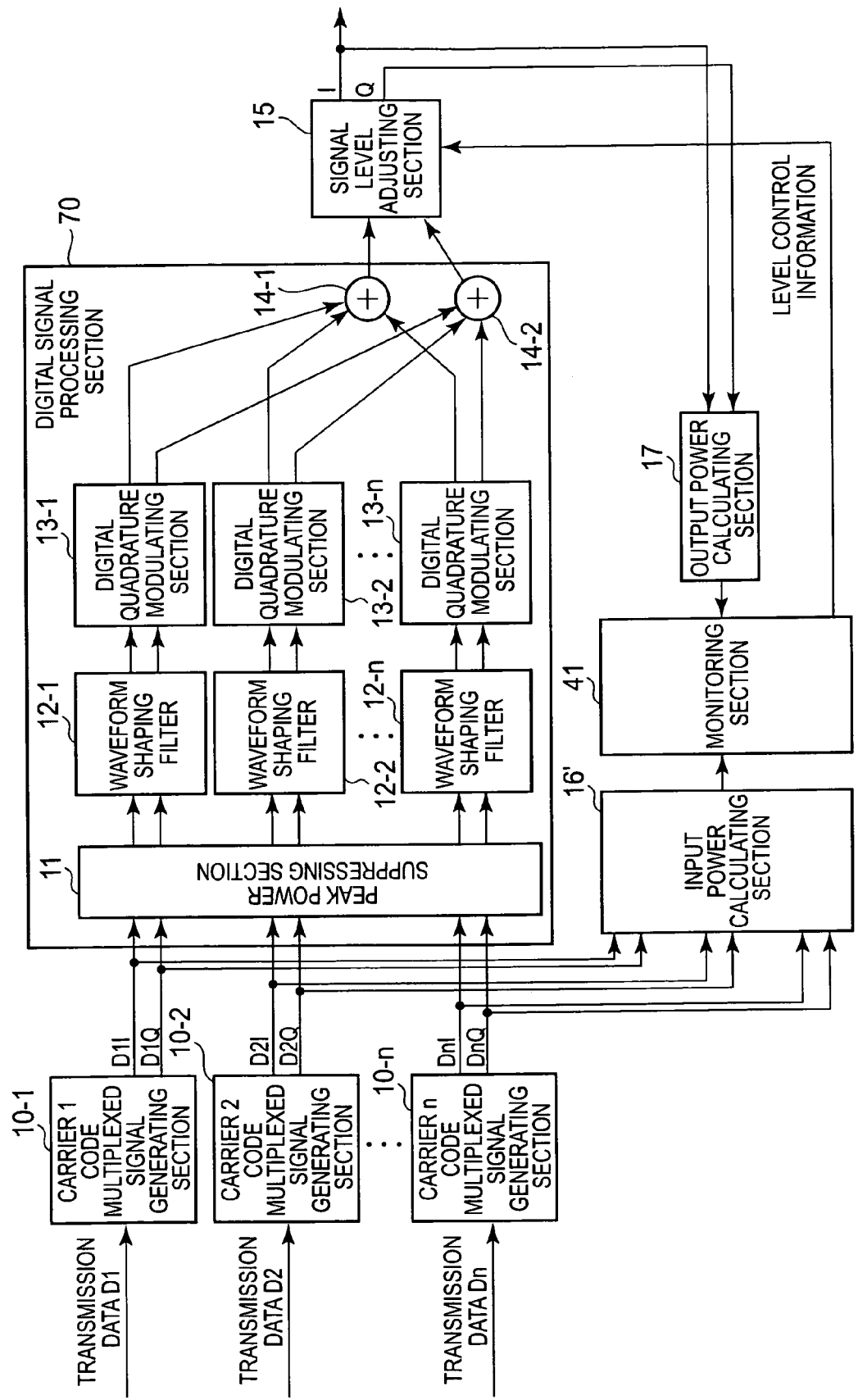
FIG. 20 is a block diagram showing a configuration of a transmitter according to a sixth embodiment of the present invention.

A transmitter according to the sixth embodiment of the present invention (hereinafter, referred to as sixth transmitter) will be described, laying emphasis on the difference from the fifth transmitter. FIG. 20 is a block diagram showing the configuration of the transmitter according to the sixth embodiment of the present invention. Moreover, for description, like reference numerals are used to denote identical elements of the fifth transmitter.

Similarly to the fifth transmitter shown in FIG. 19, the configuration of the sixth transmitter of the present invention has the main line system of each carrier (the carrier code multiplexed signal generating sections 10-1 to 10-n, the peak power suppressing section 11, the waveform shaping filters 12-1 and 12-n, the digital quadrature modulating sections 13-1 to 13-n, and the adders 14-1 and 14-2), the signal level adjusting section 15, the input power calculating section 16', the output power calculating section 17, and the monitoring section 41.

Moreover, in the sixth transmitter, the output power calculation object in the output power calculating section 17 is different from that of the fifth transmitter and the control method of the level control information in the monitoring section 41 is different from that of the monitoring section 18 of the fifth transmitter.

The output power calculating section 17 of the sixth transmitter is to calculate the mean output power of an input signal, but the multicarrier signal (both I and Q components) after the multiplication by the level control information in the signal level adjusting section 15 is inputted and the mean output power of the multicarrier signal after the level control information multiplication is calculated and outputted.

In realizing the third method ('feed-back control by table') as the determination method of the level control information for the multicarrier, in the monitoring section 41 of the sixth transmitter, a table in which the estimated value of the mean input power (in the sixth transmitter, the mean input power of the sum of the power levels of the carriers) is stored in correlation with the ideal value of the mean output power of the signal to be controlled (in the sixth transmitter, the multicarrier signal) is previously set.

Here, as the ideal value of the mean output power, an optimum value of the mean output power obtained by the measurement when the mean output power is the estimated value is stored.

Next, the determination process of the level control information for the multicarrier in the monitoring section 41 of the sixth transmitter will be outlined. The determination process is a process which reads the ideal value (ideal output power) of the mean output power corresponding to the mean input power of the sum of the power levels of the carriers outputted from the input power calculating section 16' from the table and adjusts the level control information again such that the mean output power of the multicarrier after the level control information multiplication from the output power calculating section 17 is equal to the ideal output power, to thereby output the level control information to the signal level adjusting section 15.

Moreover, the specified processing flow of the determination process of the level control information in the monitoring section 41 of the sixth transmitter is the same as the control flow of the monitoring section 41 in the fourth transmitter which belongs to the first type and is described with reference to FIG. 16 and thus the detailed description thereof will be omitted. A difference is that, while FIG. 16 shows the process that acquires the mean input power of the identified carrier and controls the gain value of the carrier, the sixth transmitter acquires the mean input power of the sum and controls the level control information for the multicarrier.

Moreover, the configurations of the fifth and sixth transmitters described above all (FIGS. 19 and 20) have the configuration of the digital quadrature modulation-type transmitter 1 that is used for the transmission amplifier shown in FIG. 6. In these cases, only the I component from the output from the digital signal processing section 70 may be inputted to the signal level adjusting section 15 (FIG. 19) or only the I component from the output from the signal level adjusting section 15 may be set to the output of the transmitter (FIG. 20).

To the contrary, in order to configure the analog quadrature modulation-type transmitter 1 that is used for the transmission amplifier shown in FIG. 18, in each transmitter, the signal level adjusting section 15 may receive both I and Q components of the output from the digital signal processing section 70 to perform the level adjustment (FIG. 19) or both I and Q components of the output from the signal level adjusting section 15 may be set to the output of the transmitter.

As such, the transmitter 1' which is used for the transmission amplifier shown in FIG. 18 performs the same operation of the transmitter 1 and has the same advantages.

In the fifth and sixth transmitters shown in FIGS. 19 and 20, similarly to the conventional transmitter shown in FIG. 7 and the transmitter that belongs to the first type (the first to fourth transmitters), the peak power suppressing section 11, the waveform shaping filters 12-1 and 12-n, the digital quadrature modulating sections 13-1 to 13-n, and the adders 14-1 and 14-2 are arranged inside the digital signal processing section 70. Alternatively, the inside of the digital signal processing section 70 may have other configurations.

Figure 21:
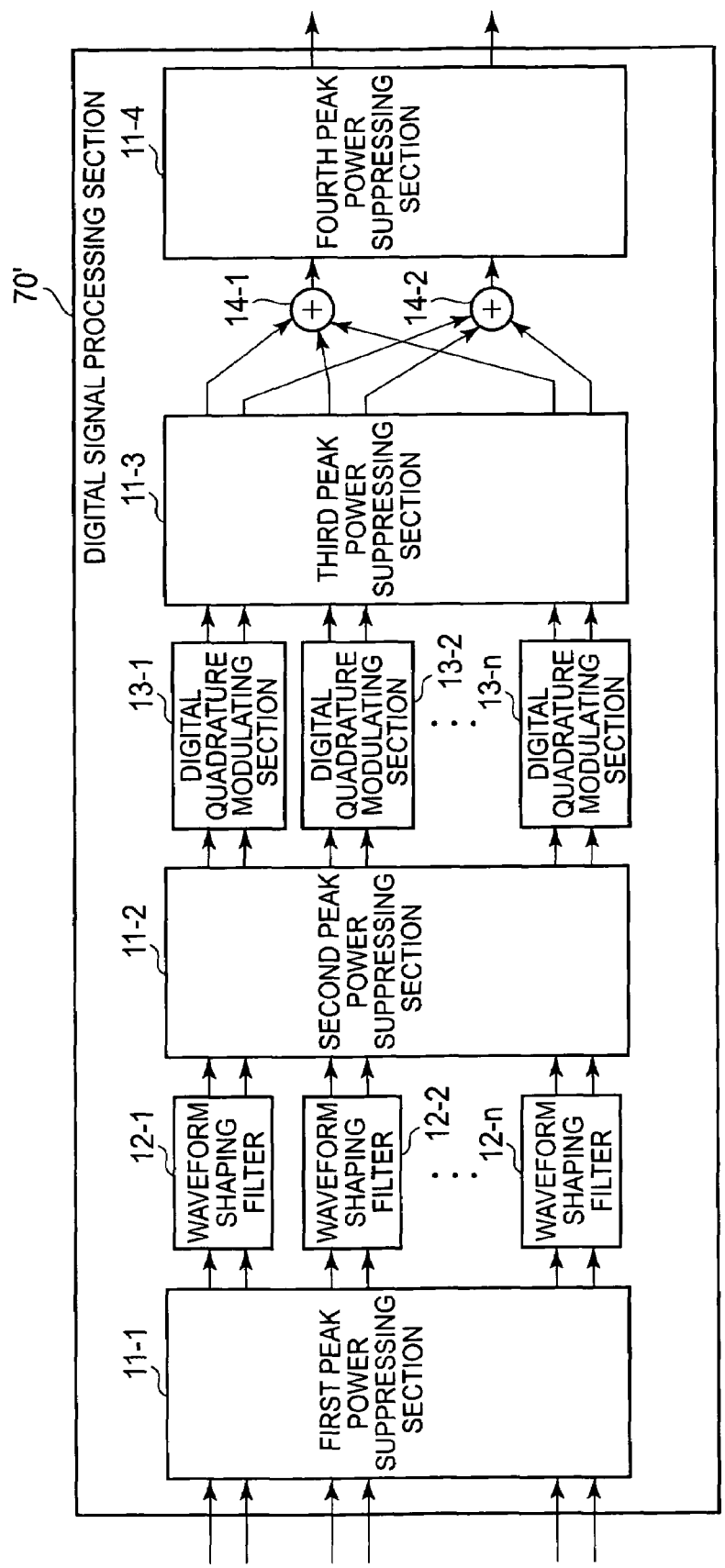
FIG. 21 is a block diagram showing another internal configuration example of a digital signal processing section in the sixth transmitter of the present invention.

In another example of the configuration of the inside of the digital signal processing section 70 in the fifth or sixth transmitter, as shown in FIG. 21, first to fourth peak power suppressing sections 11-1 to 11-4, the waveform shaping filters 12-1 and 12-n, the digital quadrature modulating sections 13-1 to 13-n, and the adders 14-1 and 14-2 are arranged. FIG. 21 is a block diagram showing another example of the configuration of the inside of the digital signal processing section 70 in the sixth transmitter of the present invention.

Based on the level of a carrier to be inputted or based on the level of a signal obtained by combining the carriers, each of the first to third peak power suppressing sections 11-1 to 11-3 performs the uniform power limitation on each carrier and outputs each carrier signal after the limitation.

Further, based on the level of a multicarrier to be inputted, the fourth peak power suppressing section 11-4 performs the power limitation on the multicarrier signal and outputs the multicarrier signal after the limitation.

The details of the operation of each peak power suppressing section 11 is as described in the first transmitter and the description thereof will be omitted.

Moreover, each of the first to fourth peak power suppressing sections internally performs the peak reduction operation several times, so that the reduction in peak power can be further ideally realized.

Further, in the configuration of FIG. 21, the first to fourth peak power suppressing sections are provided, but all of them do not need to be provided. In consideration of target efficiency, the circuit size, or the like, the peak power suppressing section has to be arranged at one position or more.

As described above, according to the transmitter which belongs to the second type of the present invention, in the monitoring section, the level adjustment according to the current operation status of the device is performed on the multicarrier signal using the actual power value of the carrier and the threshold value determined according to the number of the operating carriers, the upper limit value, or the lower limit value, based on the mean input power of the sum of the power levels of all acquired carriers (and, in some cases, the mean output power of the multicarrier signal). Thus, in particular, the second and third problems described above can be solved. As a result, while suppressing the peak of the signal finally inputted to the amplifier including the peak or the like caused by the band limitation or the like, the variation in level of the multicarrier signal can be averagedly suppressed stably.

Next, a transmitter which belongs to the third type of the present invention will be described.

There is provided the transmitter that belongs to the third type of the present invention. The transmitter, which transmits a multicarrier signal obtained by combining multiple carriers through peak power suppression, band limitation, and quadrature modulation, adjusts the signal level of a peak power-suppressed signal of each carrier based on mean input power of each carrier before the peak power suppression and, in some cases, mean output power of the carrier after the peak power suppression.

The transmitter that belongs to the third type of the present invention will be described according to functional elements. The transmitter has a peak power suppressing and adjusting section having a peak power suppressing section for performing uniform peak power suppression based on the sum of carriers for each carrier, input power calculating sections, arranged to correspond to the carriers, for calculating mean input power which is mean power before the peak power suppression, an output power calculating section for calculating mean output power which is mean power after the peak power suppression, a monitoring section for determining the ratio of the mean input power to the mean output power and outputting level control information which is the ratio of the ratio determined above and a predetermined expected value, and a signal level adjusting section for adjusting the level of the carrier signal by multiplying the peak power-suppressed signal by the level control information outputted from the monitoring section. Accordingly, the level adjustment is performed for each carrier after the uniform peak power suppression based on the sum of the carriers. As a result, the variation in level of the carrier signal can be averagedly suppressed according to the variation in input level of the carrier.

In the transmitter of the third type of the present invention which transmits a multicarrier signal obtained by combining multiple carriers through band limitation and quadrature modulation, the peak power suppressing and adjusting section is arranged before the band limitation, between the band limitation and the quadrature modulation, or between the quadrature modulation and the combination. Thus, the variation in level of the carrier signal can be averagedly suppressed according to the variation in input level of the carrier at the respective arrangement positions.

Further, in the monitoring section, as the determination method of the level control information of the carrier, a method in which the determination is performed with a table in which an estimated value of the mean input power of the carrier is correlated with a level control amount or a method in which the level control amount is adjusted with a table in which the estimated value of the mean input power of the carrier is correlated with an ideal value of the mean output power of the carrier such that the mean output power is equal to the ideal value is implemented. Accordingly, with a simple control, the variation in level of the carrier signal can be averagedly suppressed according to the variation in input level of the carrier.

An example of a specified configuration of the transmitter that belongs to the third type of the present invention will be described by way of the seventh embodiment.

Seventh Embodiment

Figure 23:
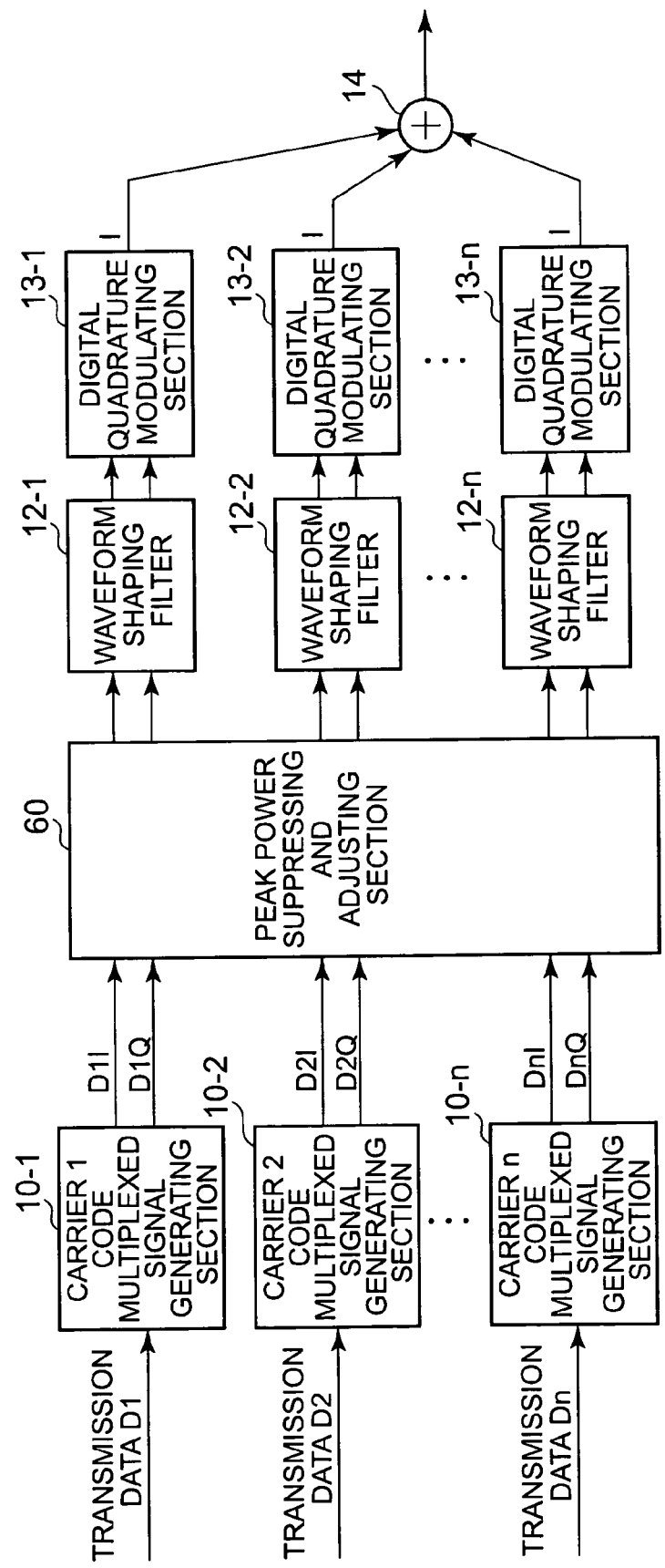
FIG. 23 is a block diagram showing a configuration a first transmitter ((7-1)th transmitter) according to a seventh embodiment of the present invention.

Next, a first example of the configuration of the transmitter according to the seventh embodiment of the present invention (hereinafter, referred to as (7-1)th transmitter) will be described with reference to FIG. 23, laying emphasis on the difference from the first transmitter. FIG. 23 is a block diagram showing the configuration of a first transmitter (the (7-1)th transmitter) according to the seventh embodiment of the present invention. Moreover, for description, like reference numerals are used to denote identical elements of the conventional transmitter or the first transmitter.

Moreover, FIG. 23 shows the configuration in the digital quadrature modulation-type transmitter 1, but, if the elements from the digital quadrature modulating sections 13-1 to 13-n are used for both I and Q component output, the analog quadrature modulation-type transmitter 1' may be configured.

The (7-1)th transmitter of the present invention has the substantially same configuration as the conventional transmitter shown in FIG. 7 or the first to fourth transmitters. The (7-1)th transmitter has the carrier code multiplexed signal generating sections 10-1 to 10-n, the waveform shaping filters 12-1 and 12-n, the digital quadrature modulating sections 13-1 to 13-n, and the adder 14. Further, in the (7-1)th transmitter, instead of the conventional peak power suppressing section 51, a peak power suppressing and adjusting section 60 is provided.

Next, the configuration of each element of the (7-1)th transmitter will be described. The descriptions of the carrier code multiplexed signal generating sections 10-1 to 10-n, the waveform shaping filters 12-1 and 12-n, the digital quadrature modulating sections 13-1 to 13-n, and the adder 14 which are the same configuration as those of the conventional transmitter or the first to fourth transmitters of the present invention will be omitted.

Moreover, the adder 14 adds only the I components of the quadrature-modulated signals outputted from the digital quadrature modulating sections 13-1 to 13-n.

The peak power suppressing and adjusting section 60 which is the distinguishable portion of the (7-1)th transmitter uniformly performs the peak power suppression based on the sum of the carriers to be inputted for each carrier, performs the level adjustment based on the mean input power of each carrier or the level adjustment based on the mean input power of each carrier and the mean power after the peak power limitation, and outputs each carrier after the level adjustment.

Figure 24:
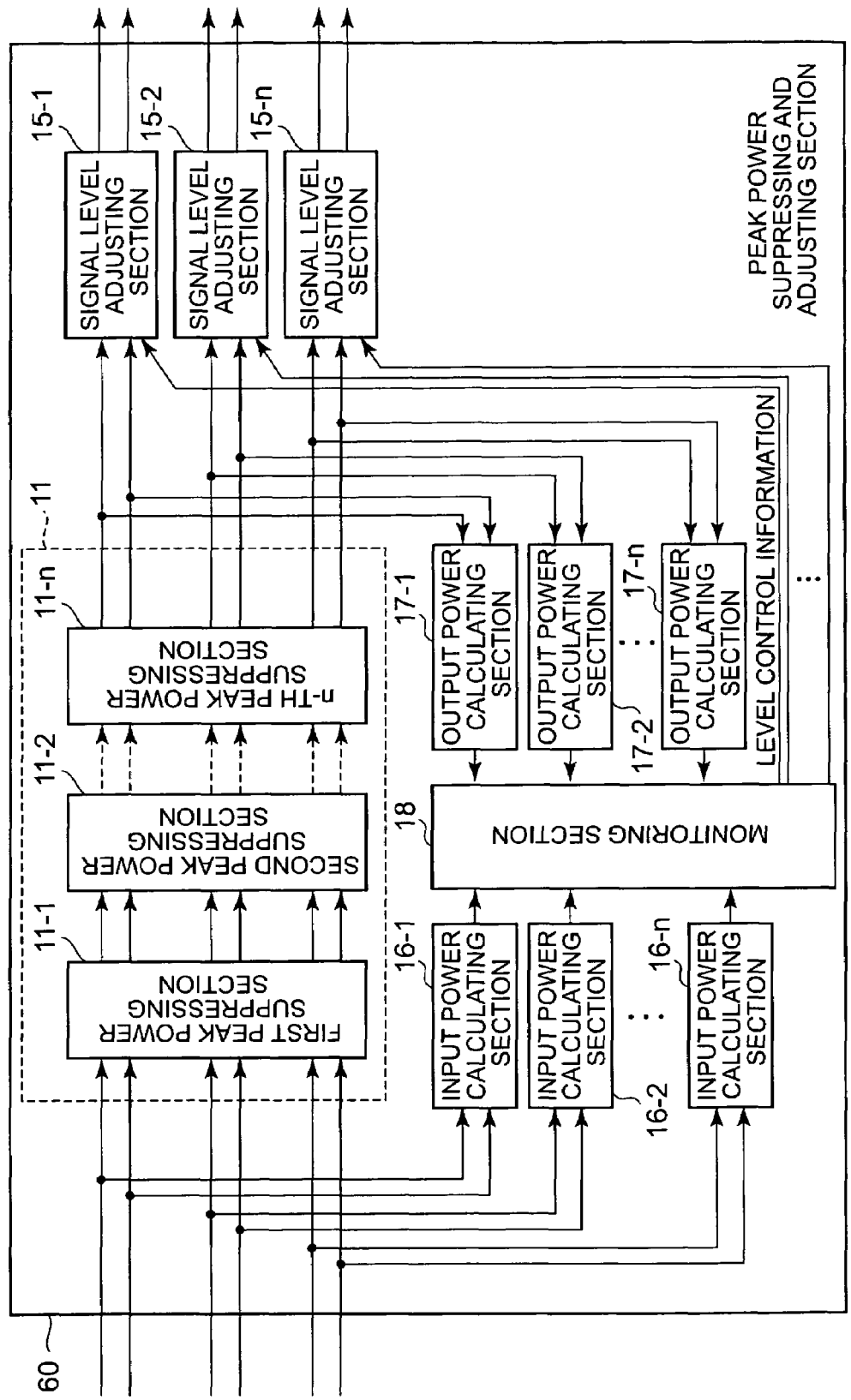
FIG. 24 is a block diagram showing a configuration of a first example of the inside of a peak power suppressing and adjusting section of the (7-1)th transmitter of the present invention.

A specified example of the configuration of the peak power suppressing and adjusting section 60 of the (7-1)th transmitter (first example) will be described with reference to FIG. 24. FIG. 24 is a block diagram showing the first example of the inside of the peak power suppressing and adjusting section 60 of the (7-1)th transmitter of the present invention.

As the first example of the inside of the peak power suppressing and adjusting section 60 of the (7-1)th transmitter of the present invention, as shown in FIG. 24, a configuration which has a peak power suppressing section 11 having a plurality (in FIG. 24, n) of peak power suppressing sections, the signal level adjusting sections 15-1 to 15-n, the input power calculating sections 16-1 to 16-n and the output power calculating sections 17-1 to 17-n which are arranged for the respective carriers, and the monitoring section 18 is provided.

Next, the respective elements of the inside of the peak power suppressing and adjusting section 60 will be described.

In order to suppress the maximum power of the multicarrier signal inputted to the power amplifier in the transmission amplifier, the peak power suppressing section 11 performs the peak detection based on instantaneous power and mean power to the sum of the power levels of the carriers. When the peak is detected, the peak power suppressing section 11 uniformly suppresses the power values of the carriers and outputs the power-suppressed carriers. This is the same as the conventional peak power suppressing section.

Moreover, in FIG. 24, the first and n-th peak power suppressing sections are provided in multi-stage and the peak reduction operation is performed several times. Thus, the reduction in peak power can be further ideally realized. In consideration of target efficiency, the circuit size, or the like, the peak power suppressing section has to be arranged at one position or more.

As regards the details of the operation of the peak power suppressing section 11, since it is the same as the first transmitter, the description thereof will be omitted.

The signal level adjusting sections 15-1 to 15-n performs a level adjustment control on the carriers from the peak power suppressing section 11 based on the level control information outputted from the later-described monitoring section 18 and outputs the level-adjusted carriers.

The input power calculating sections 16-1 to 16-n, which are respectively provided for each carrier, receives carriers before the input to the peak power suppressing section 11, that is, before the peak power suppression, calculates the mean input power based on the power value of the corresponding input signal, and output the mean input power to the monitoring section 18. Moreover, the calculation method of the mean input power in the input power calculating sections 16-1 to 16-n is the same as that of the first transmitter, and thus the description thereof will be omitted.

The output power calculating sections 17-1 to 17-n, which are respectively provided for each carrier, receives the carriers after the peak power suppression outputted from the peak power suppressing section 11, calculates the mean output power based on the power level of the corresponding input signal, and outputs the mean output power to the monitoring section 18. Moreover, in the calculation method of the mean output power in the output power calculating sections 17-1 to 17-n, a different calculation object signal from that of the first transmitter is inputted. However, the calculation method of the mean output power of the calculation object signal is the same as that of the first transmitter, and thus the description thereof will be omitted.

The monitoring section 18 receives the mean input power outputted from the input power calculating sections 16-1 to 16-n and the mean output power outputted from the output power calculating sections 17-1 to 17-n, calculates the parameters regarding the level adjustment of the carrier signals based on two types of mean power outputted from both calculating sections which are correlated with each carrier, and outputs the parameters to the signal level adjusting sections 15-1 to 15-n provided for the respective calculation object carriers as the level control information.

Figure 25:
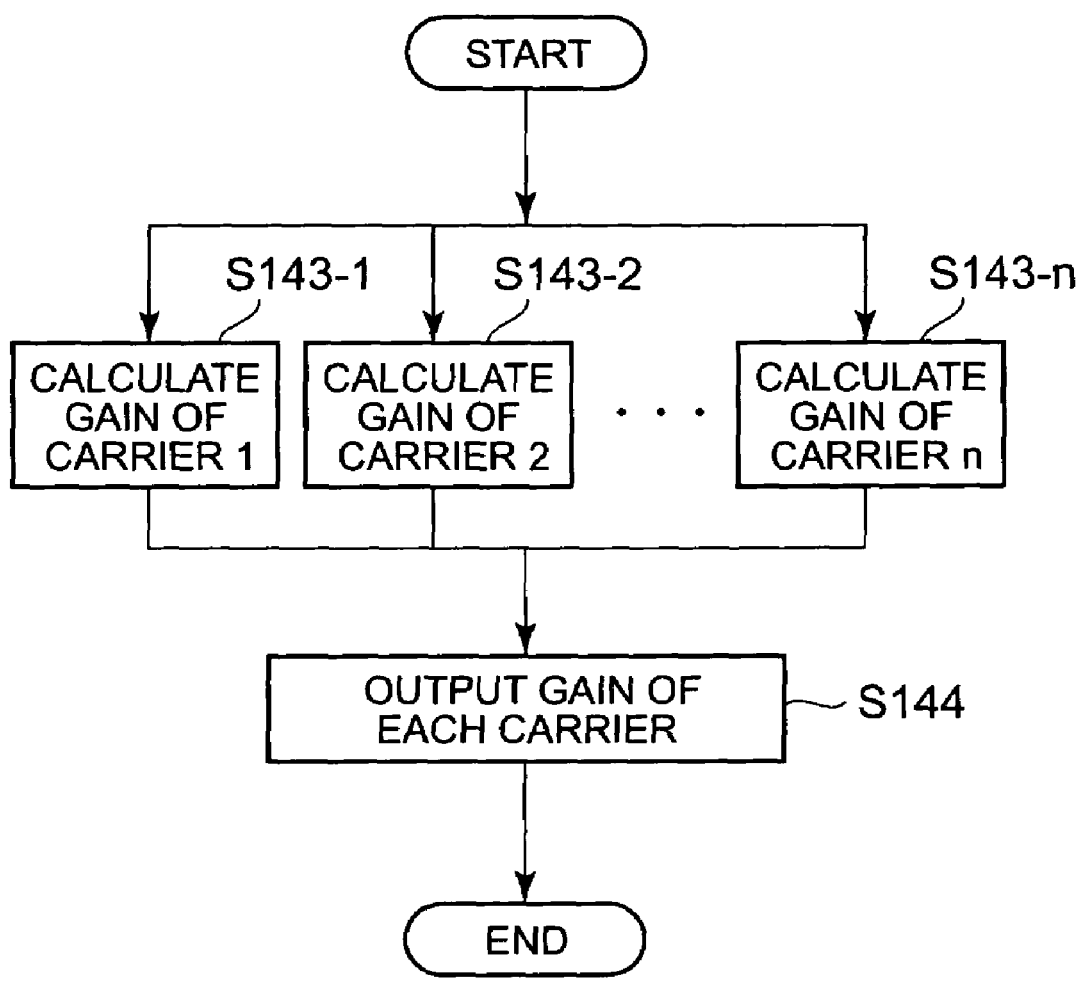
FIG. 25 is a flowchart of a setting process of level control information of each carrier in a monitoring section of the seventh transmitter of the present invention.

In the monitoring section 18, the calculation method of the level control information of each carrier will be described with reference to FIG. 25. FIG. 25 is a flowchart of a setting process of the level control information of each carrier in the monitoring section 18 of the seventh transmitter of the present invention.

In FIG. 25, the monitoring section 18 calculates the gain values for each carrier (S143-1 to S143-n) and outputs the gain values to the signal level adjusting sections 15-1 to 15-n (S144) respectively.

An outline of the process in the steps S143-1 to S143-n is that, based on the mean input power outputted from the input power calculating sections 16-1 to 16-n corresponding to the calculation object carrier and the mean output power outputted from the output power calculating sections 17-1 to 17-n, the gain value of the carrier is calculated. Moreover, the specified processing method of the gain value calculation is the same as the process which is described in the third transmitter with reference to FIGS. 13 and 14, and thus the description thereof will be omitted.

The monitoring section 18 periodically performs the above-described calculation process of the level control information (gain value) of each carrier at the specified timing. Further, the monitoring section 18 stores the gain value $GAIN_n(t)$ for each carrier calculated at the old timing in the embedded storage unit (not shown). The stored gain value $GAIN_n(t)$ is read from the storage unit when a new gain value is calculated.

The operation of the peak power suppressing and adjusting section 60 of the (7-1)th transmitter will be described with reference to FIG. 24. The peak power suppressing section 11 uniformly performs the peak power suppression on the signals of the respective carriers to be inputted based on the sum of the power levels of the carriers, so that the peak power-suppressed signals are outputted.

At the same time, the carriers before the input to the peak power suppressing section 11 are inputted to the input power calculating sections 16-1 to 16-n, such that the mean input power is calculated. Further, the carriers from the peak power suppressing section 11 are input to the output power calculating sections 17-1 to 17-n, such that the mean output power is calculated. The monitoring section 18 calculates the level control information (gain value) from the mean input power and the mean output power for each carrier. The level control information is outputted to the signal level adjusting sections 15-1 to 15-n corresponding to the calculation object carriers.

Further, the signal level adjusting sections 15-1 to 15-n multiply the uniformly peak power-suppressed carriers outputted from the peak power suppressing section 11 by the gain values outputted from the monitoring section 18, such that the level-adjusted signals are outputted for the respective carriers.

The operation of the seventh transmitter of the present invention will be described with reference to FIG. 23. Transmission data of each carrier which is digital data is inputted to the corresponding one of the carrier code multiplexed signal generating sections 10-1 to 10-n and combined through the diffusion modulation by the unique diffusion code, such that the I and Q components are outputted. The peak power suppressing and adjusting section 60 uniformly performs the peak power suppression on each carrier based on the sum of the carriers and performs the level adjustment based on the mean input power of each carrier or the level adjustment based on the mean input power of each carrier and the mean power after the peak power suppression, such that each carrier having been level-adjusted is outputted.

Further, each carrier signal after the peak suppression and level adjustment is band-limited by the corresponding one of the waveform shaping filters 12-1 and 12-n and quadrature-modulated by the corresponding one of the digital quadrature modulating sections 13-1 to 13-n. The adder 14 combines the I components of the quadrature-modulated carriers and outputs the combined signal as the multicarrier signal.

According to the seventh transmitter, in an interval that the peak suppression is performed by the peak power suppressing section 11, it can be expected that the mean output power from the output power calculating section 17 is suppressed with respect to the mean input power from the input power calculating section 16. However, the level adjustment according to the current operation status of the device is performed for each carrier using the actual power value of the carrier and the threshold value determined according to the number of the operating carriers, the upper limit value, or the lower limit value based on the mean input power and the mean output power after the peak suppression. Thus, the seventh transmitter can approximate each carrier signal corresponding to an arbitrary interval (frame or the like) to the level when reference data is used. In particular, the first problem described above can be solved. Further, even when the level of the input carrier varies, the variation in level of each carrier signal can be averagedly suppressed stably. Finally, the variation in level of the multicarrier signal can be suppressed.

In the above description, as the determination method of the level control information in the monitoring section 18 of the seventh transmitter, the first method ('feed-forward control by calculation') has been described. However, similarly to the first to sixth transmitters, the determination method may be implemented with the second method ('feed-forward control by table') in which the level control information may be outputted using a table in which the estimated value of the mean input power and the level control information are previously configured in sets.

In this case, in the monitoring section 18, the table in which the estimated value of the mean input power (in the seventh transmitter, the mean input power of each carrier) is stored in correlation with the level control information GAIN(t) of the control object signal (in the seventh transmitter, the carrier signal after the peak suppression) is previously set.

Here, as the level control information GAIN(t), an optimum value of the level control information obtained by the measurement when the mean input power of each carrier is the estimated value is stored.

Figure 26:
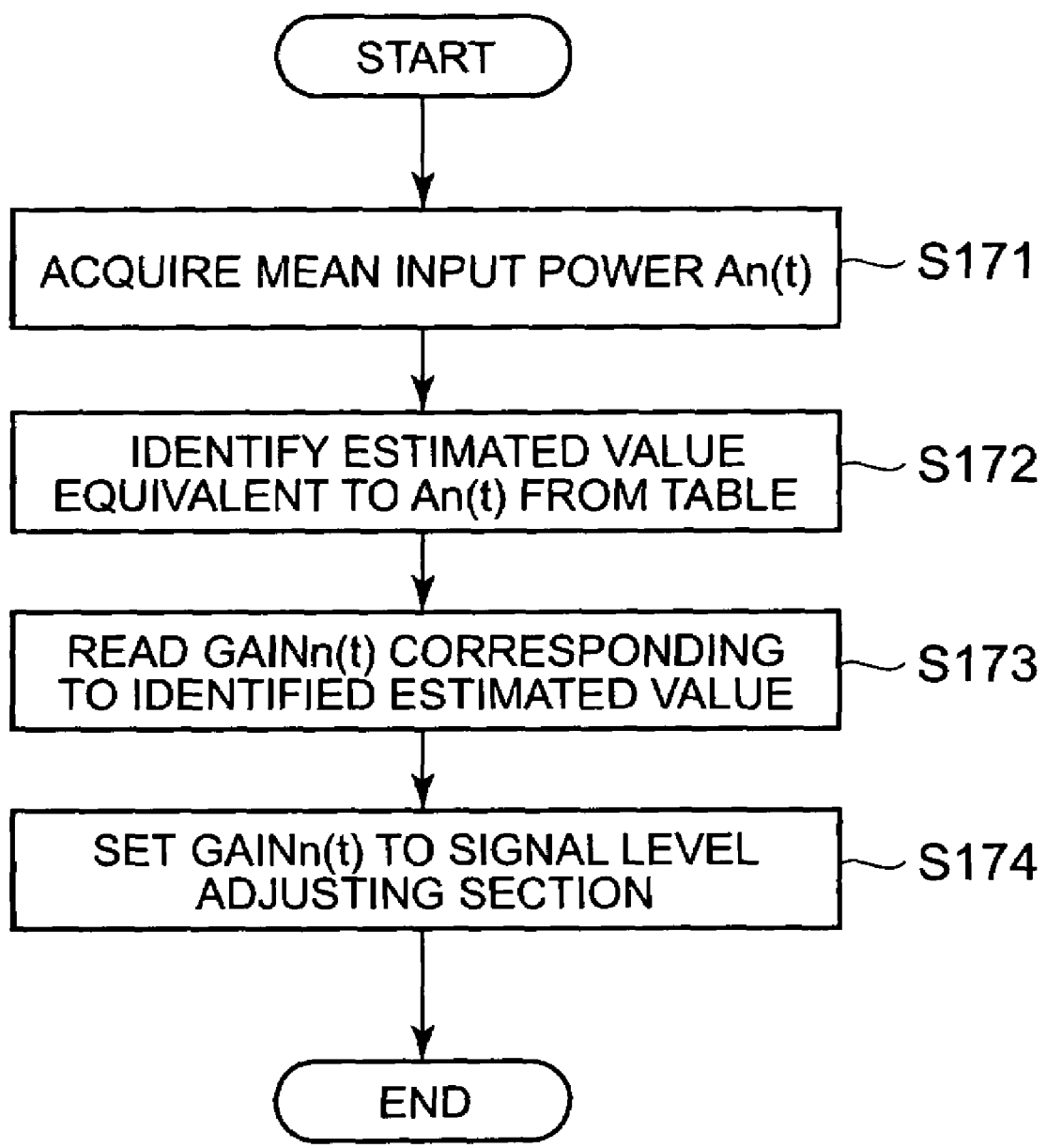
FIG. 26 is a flowchart of an output process of the level control information with a table in the monitoring section of the seventh transmitter.

Further, in the monitoring section 18, the processing operation which realizes the second method ('feed-forward control by table') will be described with reference to FIG. 26. FIG. 26 is a flowchart of an output process of the level control information using the table in the monitoring section 18 of the seventh transmitter. FIG. 26 shows the process when the level control information of the carrier n is determined, but the monitoring section 18 performs the same process for other carriers to determine the level control information.

The monitoring section 18 monitors the operation statuses of the input power calculating section 16-n and acquires the mean input power $An(t)$ from the input power calculating section 16-n (S171). Next, the monitoring section identifies the estimated value equivalent to the mean input power $An(t)$ among the estimated values of the mean input power stored in the table (S172). In the step S172, the monitoring section specifically selects the estimated value, which approximates most to the mean input power $An(t)$, among the estimated values stored in the table, to identify the estimated value.

Further, the monitoring section reads the level control information (gain) $GAIN_n(t)$ corresponding to the identified estimated value (S173) and outputs the level control information to the signal level adjusting section 15-n (S174) This is the output process of the level control information using the table.

According to the seventh transmitter, in the peak power suppressing and adjusting section 60, conventionally, when the peak power suppression is uniformly performed on each carrier based on the sum of the power levels of the carriers inputted to any peak power suppressing section 11, the monitoring section 18 calculates the level control information regarding the level adjustment based on the input power of each carrier or the level adjustment based on the input power of each carrier and the power after the peak power suppression and performs the level adjustment after the peak power suppression is performed. Thus, bad effects of the uniform peak power suppression based on the sum of the power levels of the carriers can be adjusted according to the levels of the respective carrier signals. Thus, the variation in output level of each carrier can be averagedly suppressed.

Figure 27:
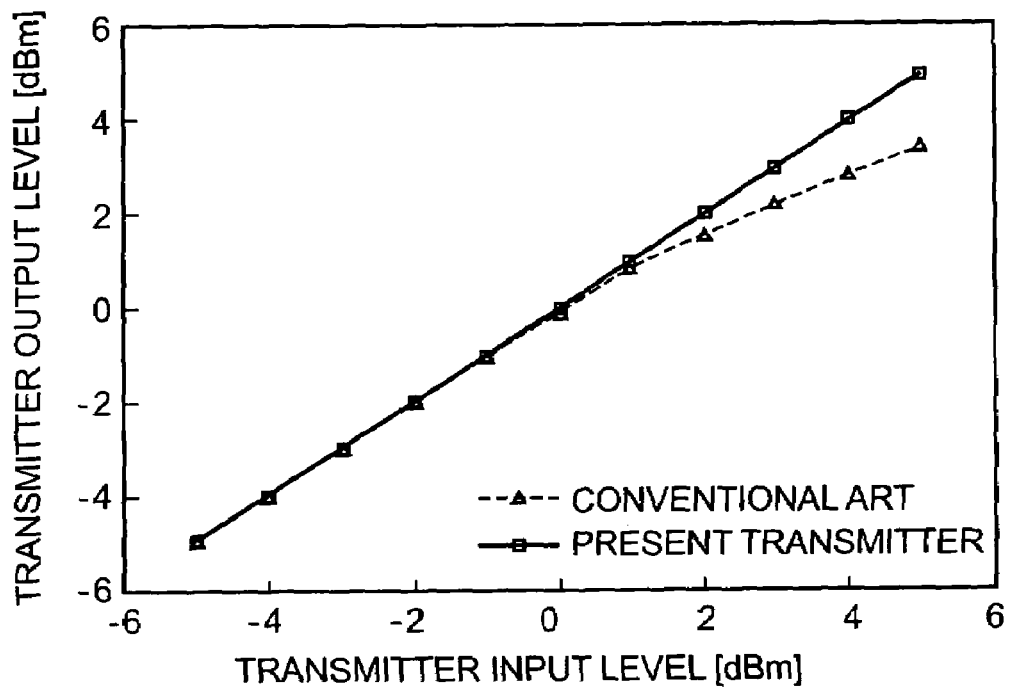
FIG. 27 is a graph showing a simulation example relating to an input set level and an output level in the seventh transmitter and the transmitter of the conventional art when one carrier of a 32 code-multiplexed signal is transmitted.
Figure 28:
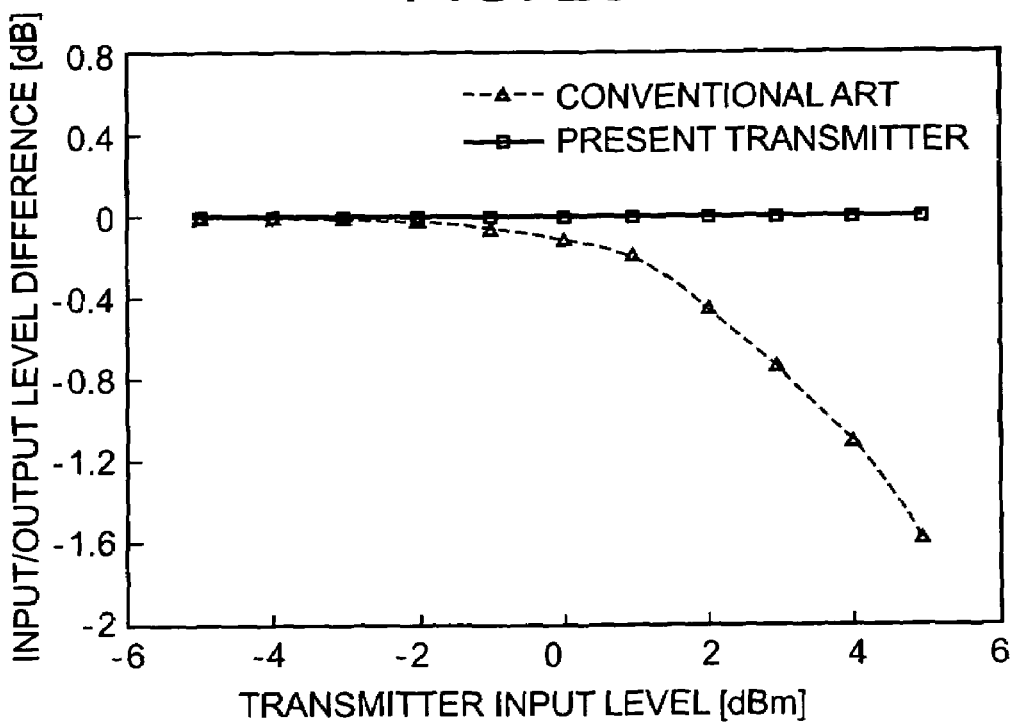
FIG. 28 is a graph showing a simulation example relating to an input set level and a level deviation.
Figure 29:
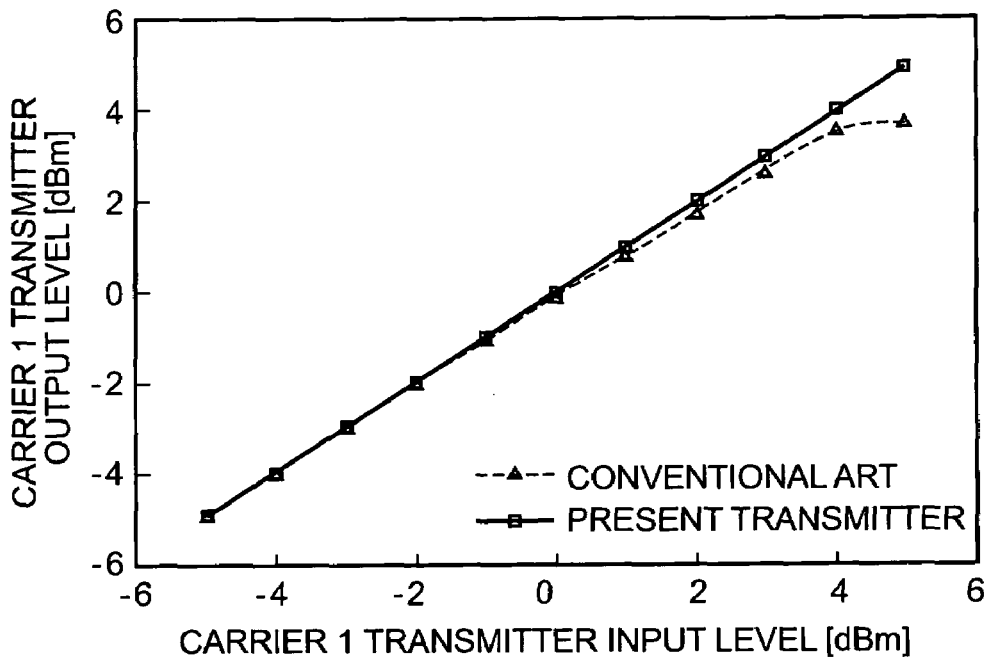
FIG. 29 is a graph showing a simulation example relating to an input set level and an output level for a level-varying carrier (carrier 1) when two carriers of a 32 code-multiplexed signal are transmitted.
Figure 30:
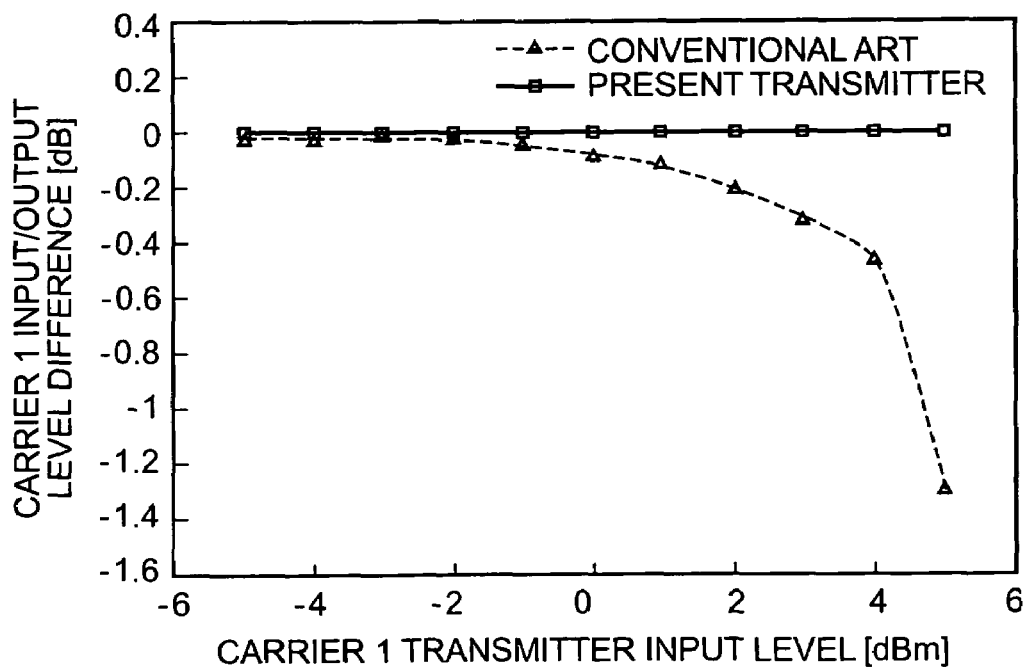
FIG. 30 is a graph showing a simulation example relating to an input set level and an input/output level difference for the carrier 1.
Figure 31:
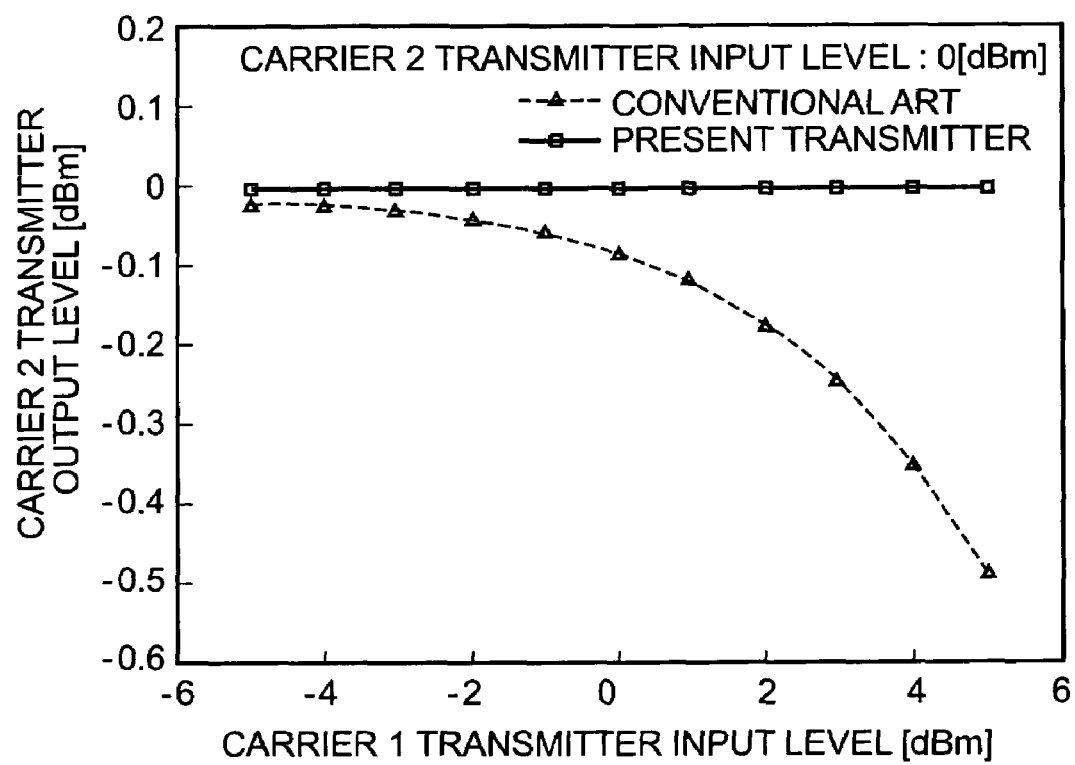
FIG. 31 is a graph showing, for a level-fixed carrier (carrier 2), a simulation example relating to an input set level of the carrier 1 and an input/output level difference of the carrier 2.

Next, input/output characteristics of one carrier in the seventh transmitter and the conventional transmitter will be described with reference to FIGS. 27 to 31. FIG. 27 is a graph showing a simulation example relating to an input set level and an output level in the seventh transmitter and the transmitter of the conventional art when one carrier of a 32 code-multiplexed signal is transmitted. FIG. 28 is a graph showing a simulation example relating to an input set level and a level deviation. FIG. 29 is a graph showing a simulation example relating to an input set level and an output level for a level-varying carrier (carrier 1) when two carriers of a 32 code-multiplexed signal are transmitted. FIG. 30 is a graph showing a simulation example relating to the difference between an input set level and an input/output level for the carrier 1. FIG. 31 is a graph showing, for a level-fixed carrier (carrier 2), a simulation example relating to the difference between an input set level of the carrier 1 and an input/output level of the carrier 2.

In the descriptions of FIGS. 27 and 28, the input/output level difference denotes the level difference between the input set level and the output level of the transmitter. That is, when the input level increases linearly, the output level has a linearly increased value as the expected value.

In the measurement of the characteristics shown in FIGS. 27 and 28, the peak power suppressing section 11 which is used for the seventh transmitter and the conventional transmitter performs the level limitation of the carrier and the threshold value is set to a fixed value (at the time of 0 dBm transmission, mean power +6 dB). As shown in FIG. 27, in the case of the conventional transmitter, if the input set level increases, the input set level exceeds the threshold value of the peak power suppressing section 11 by that amount and the amplitude limitation is performed. Thus, as the input set level increases, the level deviation occurs. In the seventh transmitter, the signal level adjusting section 15 multiplies the carrier by the level control information, and thus the input/output characteristics can be maintained linearly. That is, the input/output level difference can be constant.

Further, in the measurement of the characteristics shown in FIGS. 29 to 31, among two carriers, the input level of the carrier 2 is fixed and the input level of the carrier 1 varies. Further, the peak power suppressing section 11 is configured to operate based on the sum of the power levels of the carriers. The threshold value is set to the fixed value (at the time of 0 dBm transmission of two carriers, mean power +6 dB).

As shown in FIGS. 29 and 30, as for the carrier 1, similarly to the one carrier transmission, if the input set level increases, the input set level exceeds the threshold value of the peak power suppressing section by that amount and amplitude limitation is performed. Thus, as the input set level increases, the level deviation occurs.

Further, as shown in FIG. 31, in the conventional transmitter, as for the carrier 2, if the input set level of the carrier 1 increases, the operation frequency of the peak power suppressing section 11 becomes high, and the output level of the carrier 2 which is inputted with the constant level is lowered, not constant. For this reason, as the set level of the carrier 1 increases, the deviation in the output level of the carrier 2 occurs.

On the other hand, in the seventh transmitter, similarly to the case of FIG. 28 in which one carrier is transmitted, the level control of the carrier signals is performed in the signal level adjusting sections 15-1 to 15-n based on the level control information set by the monitoring section 18. As a result, the variation of the output level of each carrier can be suppressed.

Figure 32:
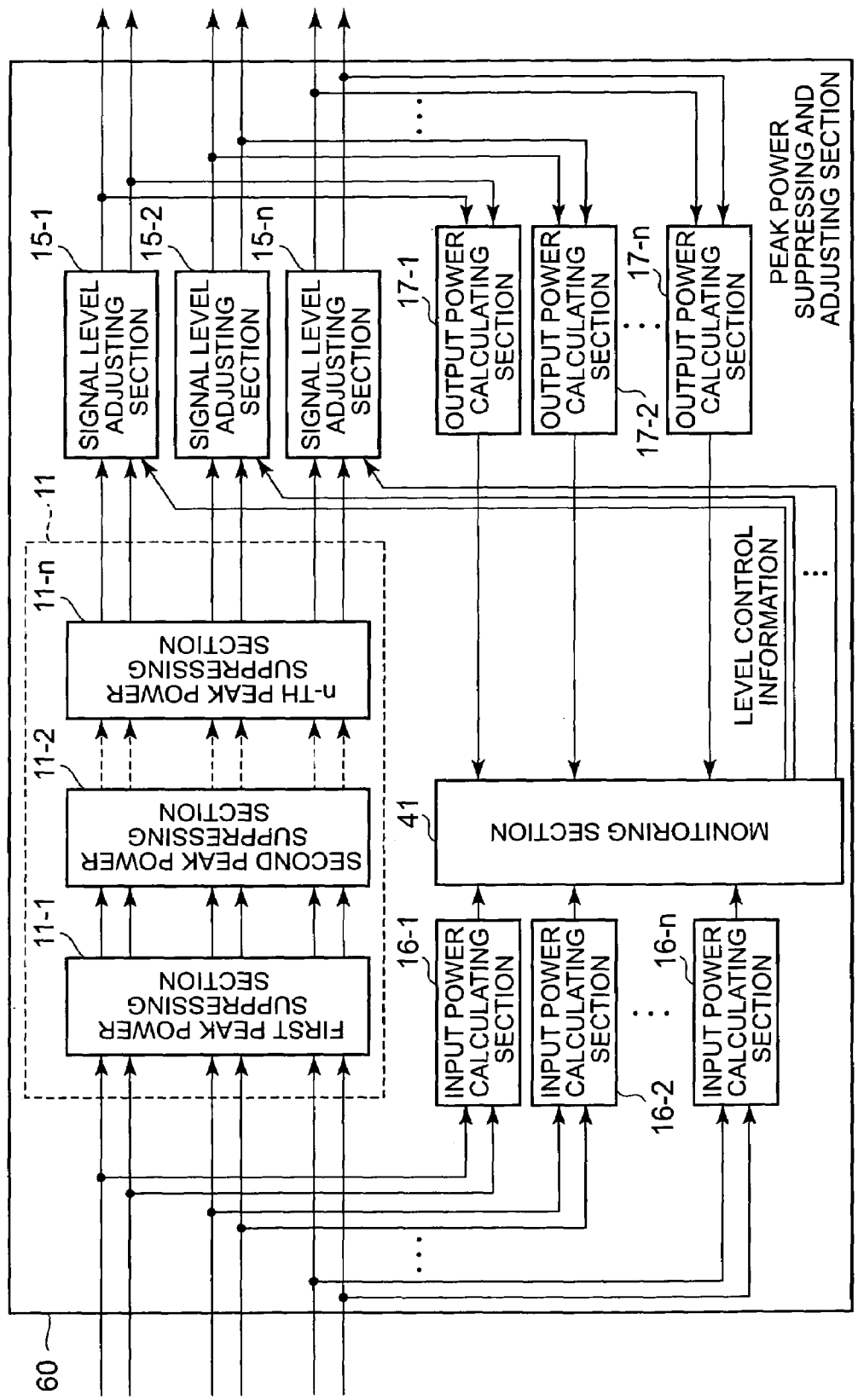
FIG. 32 is a block diagram showing a configuration of a second example of the inside of the peak power suppressing and adjusting section 60 of the (7-1)th transmitter of the present invention.

Next, a specified example (second example) of the configuration of the peak power suppressing and adjusting section 60 when the third method ('feed-back control by table') is realized as the determination method of the level control information in the monitoring section in the seventh transmitter will be described with reference to FIG. 32. FIG. 32 is a block diagram showing the second example of the inside of the peak power suppressing and adjusting section 60 of the (7-1)th transmitter of the present invention. Moreover, for description, like reference numerals are used to denote identical elements of the first example of FIG. 24.

As the second example of the inside of the peak power suppressing and adjusting section 60 of the (7-1)th transmitter of the present invention, as shown in FIG. 32, a configuration which has a peak power suppressing section 11 having a plurality (in FIG. 32, n) of peak power suppressing sections, the signal level adjusting sections 15-1 to 15-n, the input power calculating sections 16-1 to 16-n and the output power calculating sections 17-1 to 17-n which are arranged to correspond to each carrier, and the monitoring section 41 is provided.

Moreover, in the second example, the output power calculation object in the output power calculating section 17 is different from the first example and the control method of the level control information in the monitoring section 41 is different from the monitoring section 18 of the first example.

Each of the output power calculating sections 17-1 to 17-n of the second example calculates the mean output power of the signal to be inputted. Each of the output power calculating sections 17-1 to 17-n receives each carrier signal after the level control information multiplication in each of the signal level adjusting sections 15-1 to 15-n, calculates the mean output power of the carrier signal after the level control information multiplication, and output the mean output power.

In order to realize the third method ('feed-back control by table') as the determination method of the level control information for each carrier, in the monitoring section 41 of the second example, the table in which the estimated value of the mean input power (in the seventh transmitter, mean input power of each carrier) is stored in correlation with the ideal value of the mean output power of the control object signal (in the seventh transmitter, each carrier signal) is previously set.

Here, as the ideal value of the mean output power, an optimum value of the mean output power obtained by the measurement when the mean output power is the estimated value is stored.

Next, the determination process of the level control information for each carrier in the monitoring section 41 of the second example will be outlined. The determination process is a process which reads the ideal value (ideal output power) of the mean output power corresponding to the mean input power of the respective carriers outputted from the input power calculating sections 16-1 to 16-n from the table for each carrier and adjusts the level control information again such that the mean output power of the multicarrier after the level control information multiplication from the corresponding one of the output power calculating sections 17-1 to 17-n is equal to the ideal output power, to thereby output the level control information to the corresponding one of the signal level adjusting sections 15-1 to 15-n.

Moreover, the specified processing flow of the determination process of the level control information in the monitoring section 41 of the second example is the same as the control flow of the monitoring section 41 in the fourth transmitter which belongs to the first type and is described with reference to FIG. 16 and thus the description thereof will be omitted.

In the seventh transmitter described with reference to FIG. 32, the monitoring section 41 calculates the ideal value of the mean output power of each carrier using the table and controls and outputs the gain value such that the actual mean output power becomes the ideal value. However, similarly to the case of the monitoring section 32 of the third transmitter, the monitoring section may calculate the level control amount expected from the mean input power of each carrier or read the level control amount from the table to output it to the signal level adjusting section 15, compare the mean output power after the multiplication of the level control amount in the signal level adjusting section 15 with the mean input power, correct the gain value such that the mean output power matches with the mean input power, and output the gain value.

In the seventh transmitter, if the second example is used for the peak power suppressing and adjusting section 60, the level adjustment of each carrier is performed by way of the feedback control which compares the mean output power of each carrier signal after the level adjustment with the ideal value, corrects the level control information until the mean output power is equal to the ideal value, and output the level control information to the signal level adjusting sections 15-1 to 15-n. Thus, as compared to the feed-forward control (first method) which calculates the level control information of each carrier, the monitoring section 41 can rapidly identify the optimum level control information without using the complex calculation circuit.

Till now, as the specified example of the configuration of the transmitter which belongs to the third type of the present invention, as shown in FIG. 23, the transmitter (the (7-1)th transmitter) in which the peak power suppressing and adjusting section 60 is arranged at the front end of the waveform shaping filters 12-1 and 12-n has been described. However, the peak power suppressing and adjusting section 60 may be arranged at other positions.

Figure 33:
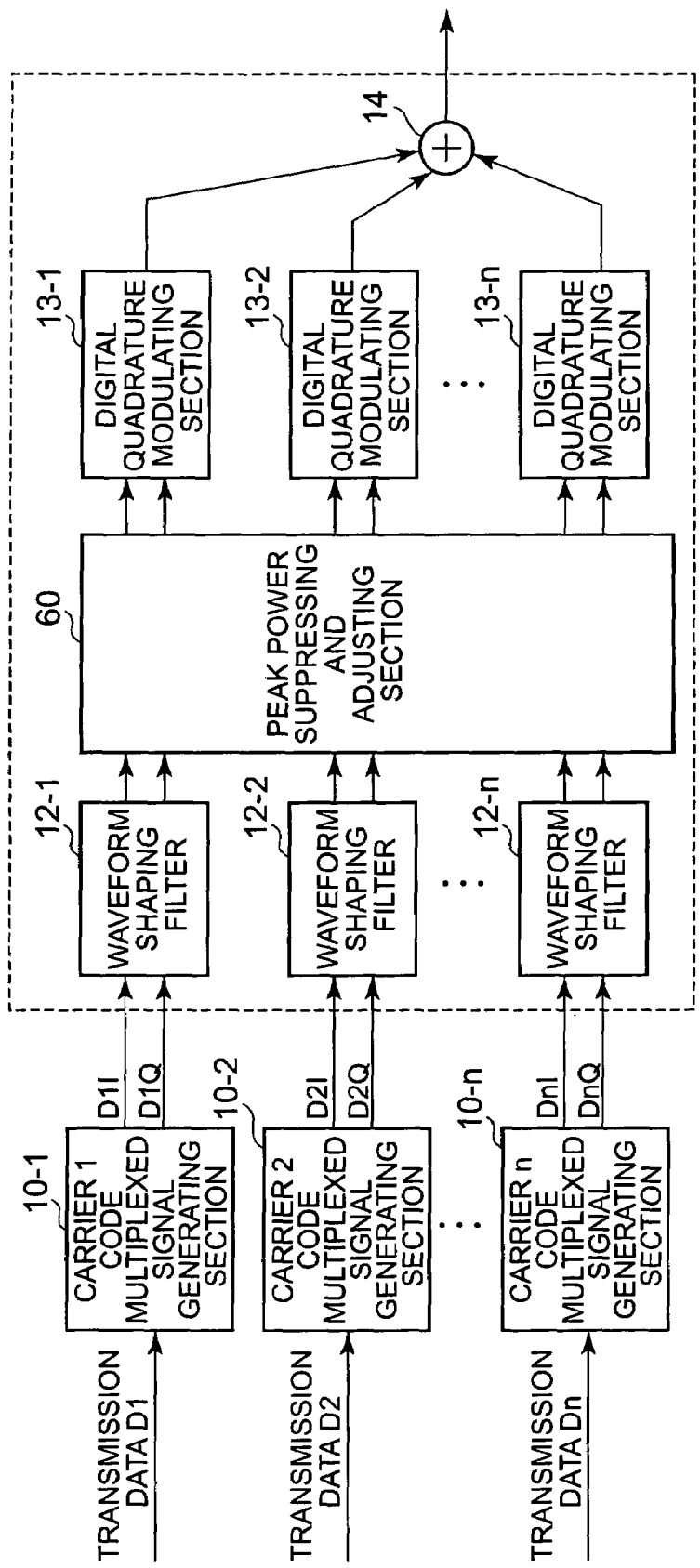
FIG. 33 is a block diagram showing a configuration of a second transmitter ((7-2)th transmitter) according to the seventh embodiment of the present invention.
Figure 34:
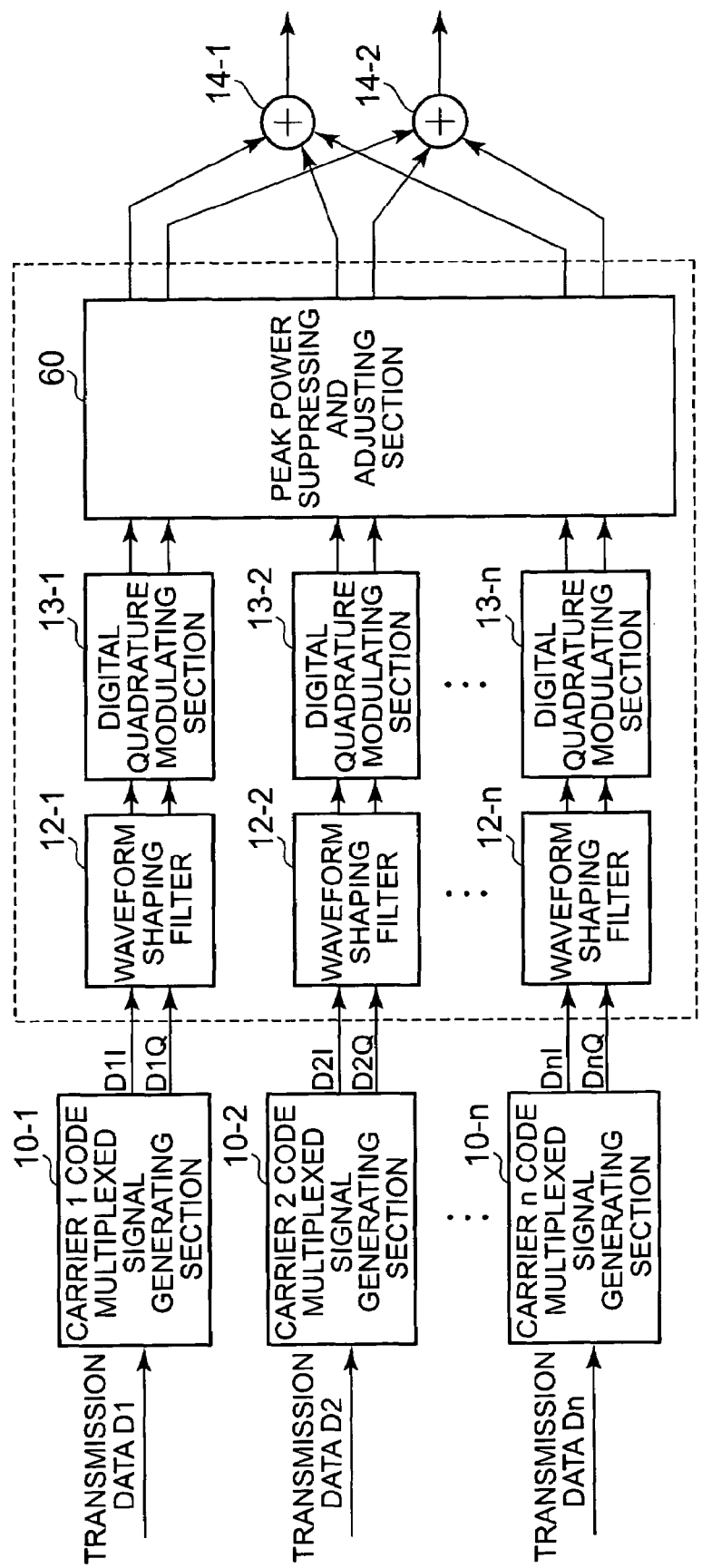
FIG. 34 is a block diagram showing a configuration of a third transmitter ((7-3)th transmitter) according to the seventh embodiment of the present invention.

As a specified example, as shown in FIG. 33, a transmitter ((7-2) th transmitter) in which the peak power suppressing and adjusting section 60 is provided between the waveform shaping filters 12-1 and 12-n and the digital quadrature modulating sections 13-1 to 13-n or, as shown in FIG. 34, a transmitter ((7-3) th transmitter) in which the peak power suppressing and adjusting section 60 is provided between the digital quadrature modulating sections 13-1 to 13-n and the adder 14 can be considered.

FIG. 33 is a block diagram showing a configuration of a second transmitter (the (7-2)th transmitter) according to the seventh embodiment of the present invention and FIG. 34 is a block diagram showing a configuration of a third transmitter (the (7-3) th transmitter) according to the seventh embodiment of the present invention.

In the (7-2)th transmitter, the peak power suppressing and adjusting section 60 is provided at the back end of the waveform shaping filters 12-1 and 12-n. Further, while the uniform peak power suppression is performed on each carrier based on the sum of the power levels of the carriers after the band limitation in the waveform shaping filters 12-1 and 12-n, the level adjustment according to the mean input power of each carrier is performed. Thus, when the peak factor of the carrier increases, that is, the level is projected by the band limitation, the suppression of the level of the projected portion can be performed on the carrier. Further, the bad effects of the uniform peak power suppression based on the sum can be adjusted according to the level of each carrier signal.

Further, in the (7-3)th transmitter, the peak power suppressing and adjusting section 60 is provided at the back end of the digital quadrature modulating sections 13-1 to 13-n. Further, while the uniform peak power suppression is performed on each carrier based on the sum of the carriers after the modulation in the digital quadrature modulating sections 13-1 to 13-n, the level adjustment according to the mean input power of each carrier is performed. Thus, in consideration of that the increase in peak factor, that is, the level projection caused by the total signal processes, such as the band limitation, the digital quadrature modulation or the like, performed for each carrier, while the projected portion for the carrier can be suppressed by performing the uniform peak power suppression based on the sum of the power levels of the carriers, the bad effects of the uniform peak power suppression based on the sum can be adjusted according to the level of each carrier signal.

In the transmitter according to the third type, the level adjustment is performed according to the level of each carrier signal in the signal level adjusting sections 15-1 to 15-n, and thus, preferably, the carrier signal outputted from the main line system (the peak power suppressing section 11) and the level control information corresponding to the carrier signal outputted from the control system (the input power calculating sections 16, the output power calculating sections 17, the monitoring section 18 or 41) are inputted to the signal level adjusting sections 15-1 to 15-n at the same timing.

For this reason, the main line system or the control system may be provided with the delay unit or the like to synchronize the data outputs of the main line system and the control system.

According to the transmitter according to the third type, based on the mean input power of each carrier before the peak power suppression in the peak power suppressing section 11 and the mean output power after the peak power suppression, the control amount of the level adjustment of each carrier is calculated and the level adjustment of each carrier signal after the peak suppression is performed using the control amount. Thus, the bad effects of the uniform level suppression based on the sum of the carriers in the peak power suppressing section 11 can be adjusted according to the mean input level of each carrier and thus the variation in level of each carrier signal can be averagedly suppressed.

As a specified phenomenon, the typical peak power suppressing section 11 performs the peak control of each carrier according to the sum of the power levels of the carriers. Thus, even when there exists a carrier the input level of which abruptly varies, if the sum of the power levels of all carriers is less then the specified value, the peak control is not performed. However, a proper gain value is calculated in the monitoring section 18 or 41 for the carrier the input level of which abruptly varies and the level suppression is performed by the signal level adjusting section 15 corresponding to the carrier, such that the variation is suppressed. Finally, the variation in level of the multicarrier signal is suppressed.

Further, as another phenomenon, when a carrier A the input level of which varies a little and a carrier B the input level of which varies abruptly are mixed, the frequency of the peak control (suppression) in the peak power suppressing section 11 becomes high according to the variation in input level of the carrier B and thus the uniform peak limitation is also performed on the carrier A. Accordingly, the level of the carrier is lowered.

To the contrary, in the monitoring section 18 or 41, the gain value which can recover the uniform peak suppression performed in the peak power suppressing section 11 is calculated from the ratio between the mean power of the carrier A before and after the peak control (suppression), and the level control (actually, increase) is performed by the signal level adjusting section 15 corresponding to the carrier A, such that the level is recovered. Finally, the variation in level of the multicarrier signal is suppressed.

According to the transmitter according to the third type, based on the mean input power of each carrier and the mean output power after the series of signal processes such as the peak suppression, the band limitation, and the quadrature modulation, the level adjustment according to the current operation status of the device is performed for each carrier using the actual power value of the carrier and the threshold value determined according to the number of the operating carriers, the upper limit value, or the lower limit value. Thus, it is possible to approximate each carrier signal corresponding to the arbitrary interval (frame or the like) to the level when reference data is used. In particular, the first problem described above can be solved. Further, even when the level of the input carrier varies, the variation in level of each carrier signal can be averagedly suppressed stably. Finally, the variation in level of the multicarrier signal can be suppressed.

Next, a transmitter which belongs to the fourth type of the present invention will be described.

As the fourth type, there is provided a transmitter, which transmits a multicarrier signal obtained by combining multiple carriers through band limitation and quadrature modulation while performing peak power suppression, adjusts the signal level of a peak power-suppressed signal of a multicarrier based on mean input power of a multicarrier before the peak power suppression (and, in some cases, mean output power of the multicarrier after the peak power suppression).

Further, the transmitter which belongs to the fourth type of the present invention will be described according to functional elements. The transmitter has a peak power suppressing and adjusting section which has a peak power suppressing section for performing peak power suppression on a multicarrier, an input power calculating section calculating mean input power which is mean power before the peak power suppression, an output power calculating section for calculating mean output power which is mean power after the peak power suppression, a monitoring section for determining the ratio of the mean input power to the mean input power and outputting level control information which is the ratio of the ratio determined above to a predetermined expected value, and a signal level adjusting section for adjusting the level of a multicarrier signal by multiplying the signal after the peak power suppression by the level control information outputted from the monitoring section. Accordingly, the level adjustment is performed after the peak power suppression is performed on the multicarrier, and thus the variation in level of the multicarrier signal after the peak suppression can be averagedly suppressed according to the variation in input level of the multicarrier signal.

A specified example of the configuration of the transmitter which belongs to the fourth type of the present invention will be described by way of the eighth embodiment.

Eighth Embodiment

Figure 35:
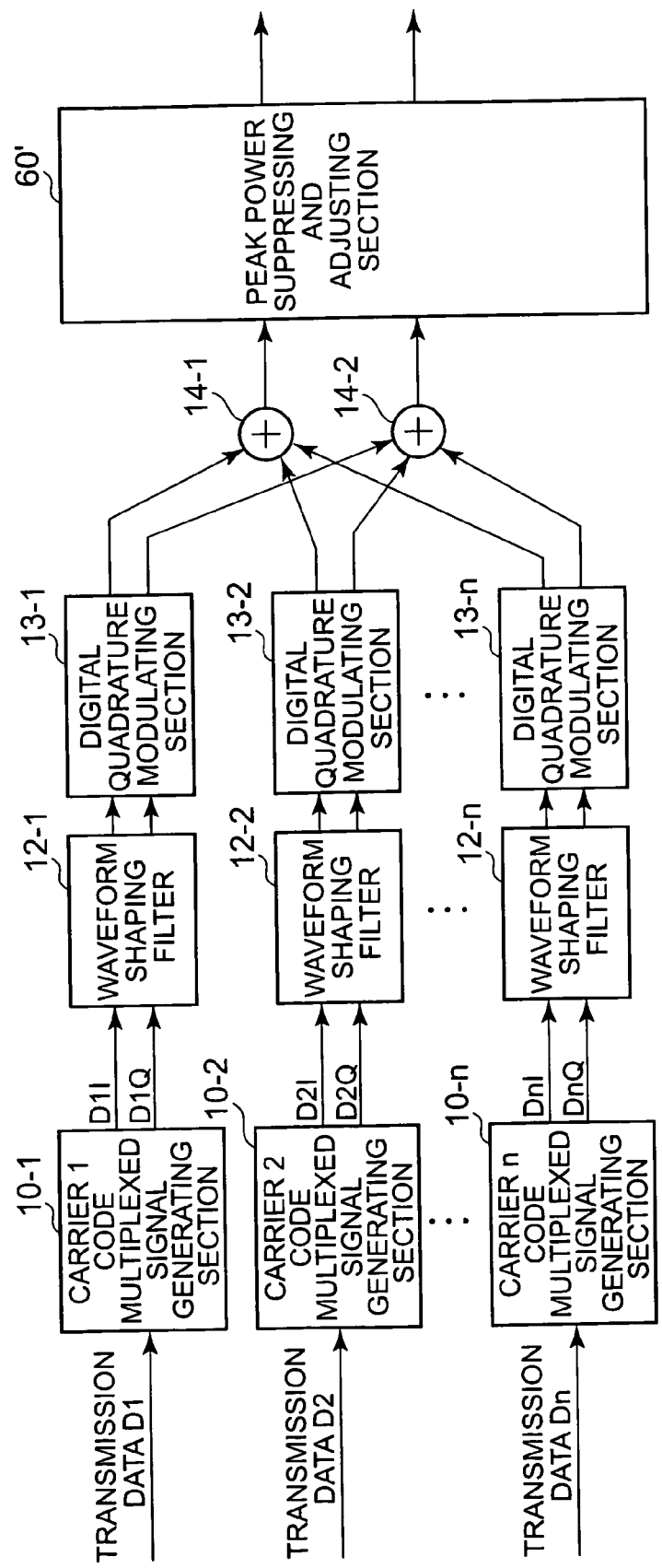
FIG. 35 is a block diagram showing a configuration of a transmitter (an eighth transmitter) according to an eighth embodiment of the present invention.

Next, an example of the configuration of the transmitter according to the eighth embodiment of the present invention will be described with reference to FIG. 35, laying emphasis on the difference from the seventh transmitter. FIG. 35 is a block diagram showing the configuration of the transmitter according to the eighth embodiment of the present invention (eighth transmitter). Moreover, for description, like reference numerals are used to denote identical elements of the seventh transmitter.

Moreover, FIG. 35 shows the configuration in the analog quadrature modulation-type transmitter 1', but, if the elements from the digital quadrature modulating sections 13-1 to 13-n are configured to output only the I components, the digital quadrature modulation-type transmitter 1 may be configured.

The eighth transmitter of the present invention has the carrier code multiplexed signal generating sections 10-1 to 10-n, the waveform shaping filters 12-1 and 12-n, the digital quadrature modulating sections 13-1 to 13-n, and the adder 14 which have the same configuration as those of the seventh transmitter of the present invention shown in FIG. 23 or the like. In the eighth transmitter, instead of the peak power suppressing and adjusting section 60 in the seventh transmitter provided in the middle of the processes for each carrier, the peak power suppressing and adjusting section 60' is provided for the multicarrier signal at the back end of the adder 14.

The peak power suppressing and adjusting section 60' which is the distinguishable portion of the eighth transmitter, performs the peak power suppression based on the input multicarrier, performs the level adjustment based on the mean input power of the multicarrier or the level adjustment based on the mean input power of the multicarrier and the mean power after the peak power suppression, and outputs each carrier after the level adjustment.

Figure 36:
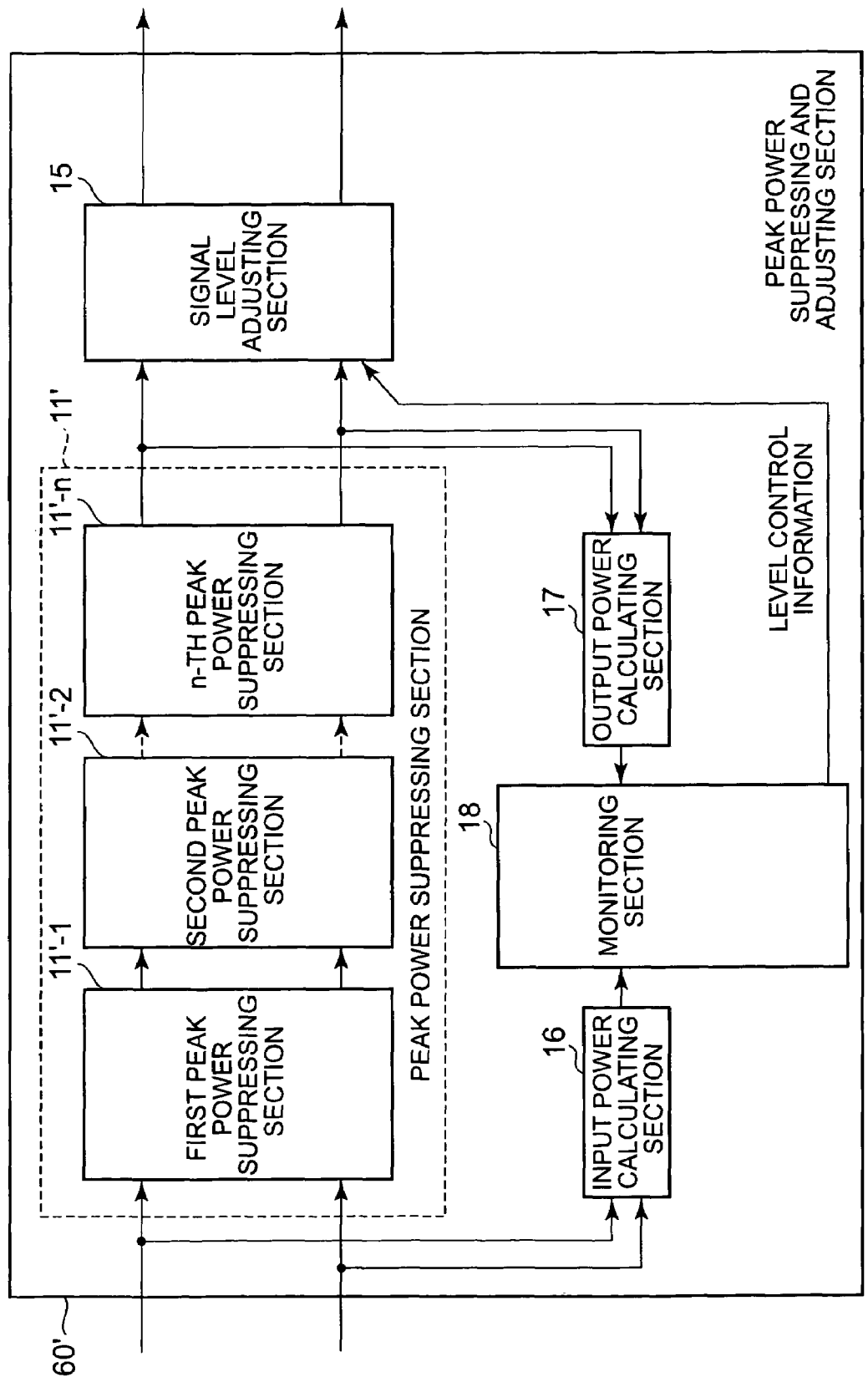
FIG. 36 is a block diagram showing a configuration of a first example of the inside of a peak power suppressing and adjusting section of the eighth transmitter of the present invention.

A specified example (first example) of the configuration of the peak power suppressing and adjusting section 60' of the eighth transmitter will be described with reference to FIG. 36. FIG. 36 is a block diagram showing the configuration of the first example of the inside of the peak power suppressing and adjusting section 60' of the eighth transmitter. Moreover, FIG. 36 shows the configuration in the analog quadrature modulation-type transmitter 1', but, if the input/output is only the I component, the digital quadrature modulation-type transmitter 1 may be configured.

As the first example of the inside of the peak power suppressing and adjusting section 60' of the eighth transmitter of the present invention, as shown in FIG. 36, a configuration which has a peak power suppressing section 11' having a plurality (in FIG. 36, n) of peak power suppressing sections, the signal level adjusting section 15, the input power calculating section 16, the output power calculating section 17, and the monitoring section 18 is provided.

Next, the respective elements of the inside of the peak power suppressing and adjusting section 60' will be described.

In order to suppress the maximum power of the multicarrier signal inputted to the power amplifier in the transmission amplifier, the peak power suppressing section 11' performs the peak detection based on instantaneous power and mean power of the multicarrier signal. When the peak is detected, the peak power suppressing section 11' suppresses the power level of the multicarrier and outputs the power-suppressed multicarrier.

Moreover, in FIG. 36, the first and n-th peak power suppressing sections are provided in multi-stage and the peak reduction operation is performed several times. Thus, the reduction in peak power can be further ideally realized. In consideration of target efficiency, the circuit size, or the like, the peak power suppressing section has to be arranged at one position or more.

An outline of the operation of the peak power suppressing section 11' is the substantially same as that of the first transmitter. In the first transmitter, the peak factor is calculated from the sum of the power levels of the multiple input carriers and the peak suppression is performed for each carrier. To the contrary, the eighth transmitter is different from the first transmitter in that the multicarrier signal obtained by combining the multiple carriers is input, and thus the peak factor is calculated from power of the multicarrier signal to be inputted and the peak suppression is performed on the multicarrier signal.

The signal level adjusting section 15, the input power calculating section 16, the output power calculating section 17, and the monitoring section 18 respectively have the same configuration as those in the inside of the peak power suppressing and adjusting section 60 of the seventh transmitter. In the seventh transmitter, the signals inputted to the respective elements are the carrier signals. On the other hand, in the eighth transmitter, the signal inputted to each element is the multicarrier signal. The specified calculation method or control method is the same, and thus the description thereof will be omitted.

In the above description, as the determination method of the level control information in the monitoring section 18 of the eighth transmitter, the first method ('feed-forward control by calculation') has been described. However, similarly to the first to seventh transmitters, the determination method may be implemented with the second method ('feed-forward control by table') in which the level control information may be outputted using a table in which the estimated value of the mean input power and the level control information are previously configured in sets.

In this case, in the monitoring section 18, the table in which the estimated value of the mean input power (in the eighth transmitter, the mean input power of the multicarrier) is stored in correlation with the level control information GAIN (t) of the control object signal (in the eighth transmitter, the multicarrier signal after the peak suppression) is previously set.

Here, as the level control information GAIN(t), an optimum value of the level control information obtained by the measurement when the mean input power of the multicarrier is the estimated value is stored.

Further, in the monitoring section 18, the processing operation when the second method ('feed-forward control by table') is realized is the same as that described in the monitoring section 18 of the seventh transmitter with reference to FIG. 26 and thus the detailed description thereof will be omitted. Moreover, FIG. 26 shows the process when the level control information for the carrier n is determined, but the monitoring section 18 of the eighth transmitter controls the multicarrier signal.

The operation of a first peak power suppressing and adjusting section 60' of the eighth transmitter is the same as the operation of the peak power suppressing and adjusting section 60 of the (7-1)th transmitter and the description thereof will be omitted. The peak power suppressing section 11 performs the peak power limitation (suppression) based on the multicarrier. The input power calculating section 16 calculates the mean input power of the multicarrier before the peak power suppression. In some cases, the output power calculating section 17 calculates the mean output power after the peak power suppression and the monitoring section 18 calculates the level control information (gain value) from the mean input power and the mean output power or acquires the level control information corresponding to the mean input power by using the table. The signal level adjusting section 15 performs the level adjustment by multiplying the multicarrier outputted from the peak power suppressing section 11 by the gain value, such that the level-adjusted multicarrier signal is outputted.

Figure 37:
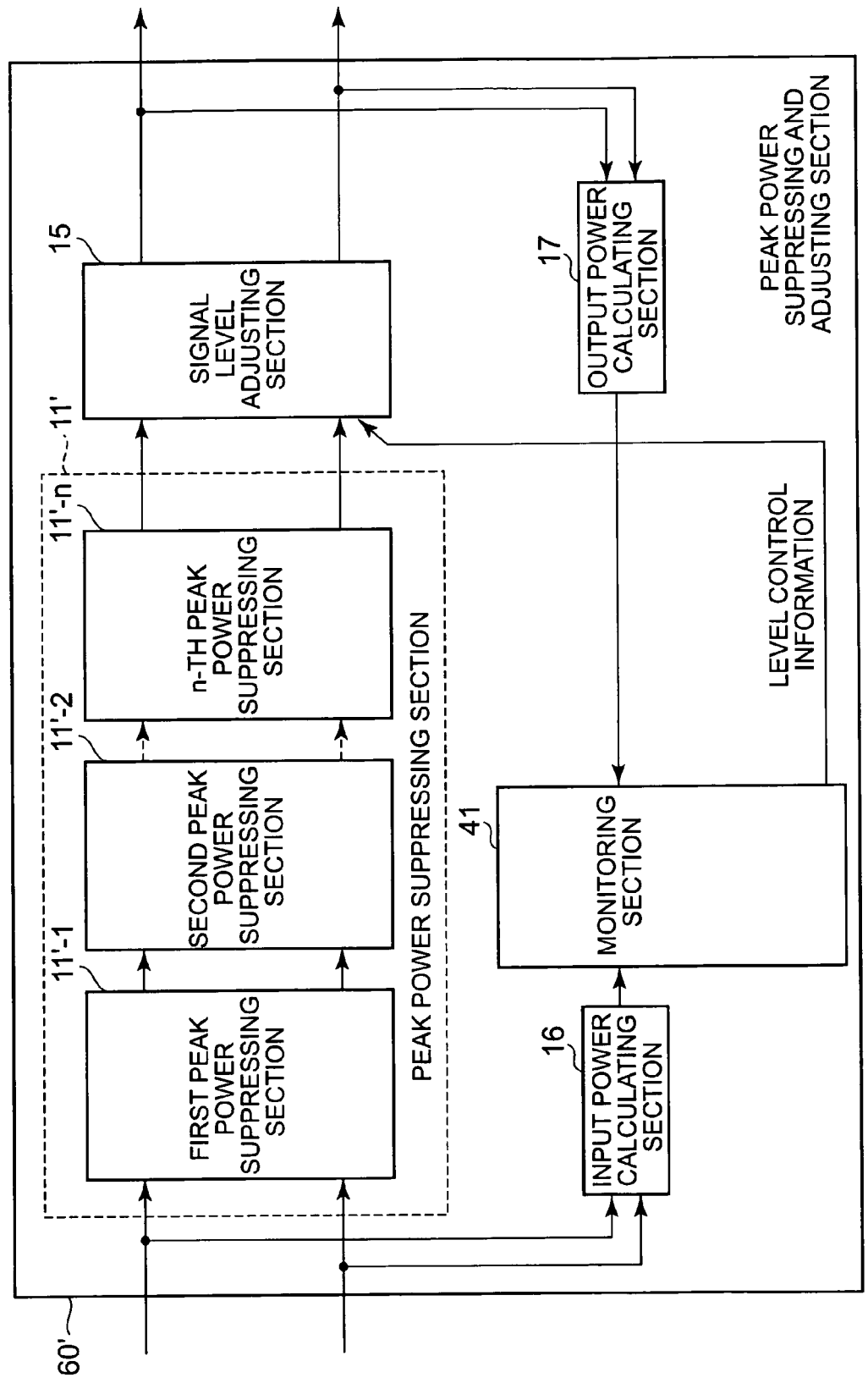
FIG. 37 is a block diagram showing a configuration of a second example of the inside of the peak power suppressing and adjusting section of the eighth transmitter of the present invention.

Next, a specified example (second example) of the configuration of the peak power suppressing and adjusting section 60' when the third method ('feed-back control by table') is realized as the determination method of the level control information in the monitoring section in the eighth transmitter will be described with reference to FIG. 37. FIG. 37 is a block diagram showing the configuration of the second example of the inside of the peak power suppressing and adjusting section 60' of the eighth transmitter of the present invention. Moreover, for description, like reference numerals are used to denote identical elements of the first example of FIG. 36. Moreover, FIG. 37 shows the configuration in the analog quadrature modulation-type transmitter 1', but, if the output from the transmitter is only the I component, the digital quadrature modulation-type transmitter 1 may be configured.

As the second example of the inside of the peak power suppressing and adjusting section 60' of the eighth transmitter of the present invention, as shown in FIG. 37, a configuration which has a peak power suppressing section 11' having a plurality (in FIG. 37, n) of peak power suppressing sections, the signal level adjusting section 15, the input power calculating section 16, the output power calculating section 17, and the monitoring section 41 is provided.

Moreover, in the second example, the output power calculation object in the output power calculating section 17 is different from the first example and the control method of the level control information in the monitoring section 41 is different from the monitoring section 18 of the first example.

The output power calculating section 17 of the second example calculates the mean output power of the signal to be inputted. The output power calculating section 17 receives the multicarrier signal after the level control information multiplication in the signal level adjusting section 15, calculates the mean output power of the multicarrier signal after the level control information multiplication, and output the mean output power.

In order to realize the third method ('feed-back control by table') as the determination method of the level control information for the multicarrier, in the monitoring section 41 of the second example, the table in which the estimated value of the mean input power (in the eighth transmitter, mean input power of the multicarrier) is stored in correlation with the ideal value of the mean output power of the control object signal (in the eighth transmitter, the multicarrier signal) is previously set.

Here, as the ideal value of the mean output power, an optimum value of the mean output power obtained by the measurement when the mean output power is the estimated value is stored.

Next, the determination process of the level control information for each carrier in the monitoring section 41 of the second example will be outlined. The determination process is a process which reads the ideal value (ideal output power) of the mean output power corresponding to the mean input power of the multicarrier outputted from the input power calculating section 16 from the table and adjusts the level control information again such that the mean output power of the multicarrier after the level control information multiplication from the output power calculating section 17 is equal to the ideal output power, to thereby output the level control information to the signal level adjusting section 15.

Moreover, the specified processing flow of the determination process of the level control information in the monitoring section 41 of the second example is the same as the control flow of the monitoring section 41 in the fourth transmitter which belongs to the first type and is described with reference to FIG. 16 and thus the description thereof will be omitted.

In the eighth transmitter described with reference to FIG. 37, the monitoring section 41 calculates the ideal value of the mean output power of the multicarrier signal by using the table and controls and outputs the gain value such that the actual mean output power becomes the ideal value. However, similarly to the case of the monitoring section 32 of the third transmitter, the monitoring section may calculate the level control amount expected from the mean input power of the multicarrier signal or read the level control amount from the table to output it to the signal level adjusting section 15, and the signal level adjusting section 15 compare the mean output power after the multiplication of the level control amount with the mean input power, correct the gain value such that the mean output power matches with the mean input power, and output the gain value.

In the eighth transmitter, if the second example is used for the peak power suppressing and adjusting section 60', the level adjustment of the multicarrier is performed by way of the feed-back control which compares the mean output power of the multicarrier signal after the level adjustment with the ideal value, corrects the level control information until the mean output power is equal to the ideal value, and outputs the level control information to the signal level adjusting section 15. Thus, as compared with the feed-forward control (first method) which calculates the level control information of the multicarrier, the monitoring section 41 can rapidly identify the optimum level control information without using the complex calculation circuit.

The operation of the eighth transmitter of the present invention will be described with reference to FIG. 35. Transmission data of the carriers which are digital data are inputted to the carrier code multiplexed signal generating sections 10-1 to 10-n and are combined through the diffusion modulation by the unique diffusion codes. The I component and the Q component for each carrier are outputted. Further, the carriers undergo the band limitation by the waveform shaping filters 12-1 to 12-n and the quadrature modulation by the digital quadrature modulating sections 13-1 to 13-n. Then, the quadrature-modulated carriers are combined by the adders 14-1 and 14-2. The I and Q components are outputted as the multicarrier signal.

Further, in the peak power suppressing and adjusting section 60', the peak factor is calculated from power of the multicarrier, the peak power suppression is performed on the multicarrier, the level adjustment is performed based on the mean input power of the multicarrier or the level adjustment is performed based on the mean input power of the multicarrier and the mean power after the peak power limitation, and the multicarrier after the level adjustment is outputted.

According to the transmitter of the fourth type, based on the mean input power of the multicarrier before the peak power suppression in the peak power suppressing section 11 and the mean output power after the peak power suppression, the level adjustment according to the current operation status of the device is performed for the multicarrier using the threshold value, the upper limit value, or the lower limit value which is determined according to the power value of the actual multicarrier. Thus, the bad effects of the uniform level suppression performed on the calculation interval of the mean power in the peak power suppressing section 11 can be adjusted according to the mean input level of the multicarrier. In particular, the second and third problems can be solved and thus the variation in level of the multicarrier signal can be averagedly suppressed.

As a specified phenomenon, when the input level of the multicarrier abruptly varies and the multicarrier undergoes the peak control (suppression) in the peak power suppressing section 11, the uniform peak suppression is performed in an averaging interval (suppression interval) for calculating the peak factor in the peak power suppressing section 11 and the level of the multicarrier is overall lowered. To the contrary, in the monitoring section 18 or 41, the gain value which can recover the uniform peak suppression performed in the peak power suppressing section 11 is calculated from the ratio between the mean power of the multicarrier before and after the peak control (suppression), and the signal level adjusting section 15 corresponding to the multicarrier multiplies the gain value, so that the level is recovered. The variation in level of the multicarrier signal is suppressed.

In the present invention described above, the transmitters according to the first to third types relate to a process in which the uniform level suppression is performed on the carriers based on the sum of the power levels in the peak power suppressing section 11 as the main line system and thereafter the multicarrier signal is obtained by combining multiple input carriers through the band limitation and quadrature modulation. In the control system (the input power calculating section, and output power calculating section, the monitoring section, the signal level adjusting section, and the multiplier), based on the mean input power of the carrier, the level adjustment is performed such that the mean power of the carrier or the multicarrier becomes the ideal value which recovers the bad effects of the level suppression in the peak power suppressing section 11 at any position of the main line system. Even when the variation in input level of each carrier inputted to the transmitter occurs, it has advantages that the variation in level of the carrier or the multicarrier signal can be suppressed and the multicarrier signal finally outputted from the transmitter can be stabilized.

Further, in the present invention, the transmitter according to the fourth type relates to a process in which the level suppression is performed on the multicarrier signal after the combination in the peak power suppressing section 11. In the control system, based on the mean input power of the multicarrier signal, the level adjustment is performed such that the mean output power of the multicarrier becomes the ideal value which recovers the bad effects of the level suppression in the peak power suppressing section 11. Even when the variation in input level of each carrier inputted to the transmitter occurs and the variation of the multicarrier signal just after the combination occurs, it has advantages that the variation in level of the multicarrier signal can be suppressed and the multicarrier signal finally outputted from the transmitter can be stabilized.

Further, in the transmitter of the present invention, in the interval that the peak suppression is operated by the peak power suppressing section 11, the uniform peak suppression is performed and thus the level of the multicarrier is overall lowered. However, since the level adjustment according to the current operation status of the device is performed on each carrier or the multicarrier using the actual power value of the carrier or the multicarrier and the threshold value determined by the number of the operating carriers, the upper limit value or the lower limit value based on the mean input power and the mean output power. Thus, it is possible to approximate each carrier signal corresponding to the arbitrary interval (frame or the like) to the level when reference data is used. Further, the bad effects caused by the uniform peak suppression according to the abrupt level variation performed by the peak power suppressing section 11 are recovered and, even when the variation in level of the input carrier occurs, the variation in level of each carrier signal can be averagedly and stably suppressed. Finally, it has an advantage that the variation in level of the multicarrier signal can be suppressed.

Further, in the transmitter according to the respective types of the present invention, if the second method ('feed-forward control by table') is used as the determination method of the level control information in the monitoring section, the level control information is outputted with correlation by using the table. Thus, since the configuration for calculating the level control information is not required, the configuration of the monitoring section can be simplified. Further, since the time required for the output of the level control information can be reduced, it has an advantaged that the difference between the output timings of the control object signal and the corresponding level control information can be reduced.

Further, when the second method ('feed-forward control by table') is used, in the configuration of each transmitter, the output power calculating section 17 or the output power calculating sections 17-1 to 17-n is not required, and thus it has an advantage that the entire configuration of the transmitter can be reduced as compared to the first method.

Further, when the third method ('feed-back control by table') is used as the determination method of the level control information in the monitoring section, by way of the feed-back control which compares the mean output power of the carrier or the multicarrier signal after the level adjustment with the ideal value, adjusts the level control information such that the mean output power becomes the ideal value, and outputs the level control information to the signal level adjusting section 15, the level adjustment of the carrier or the multicarrier signal is performed. Thus, as compared to the feed-forward control (first method) which calculates the level control information of the carrier or the multicarrier signal, it has an advantage that the monitoring section 41 can rapidly identify the optimum level control information without using the complex calculation circuit.

Further, the transmitter of the present invention can be implemented by adding the input power calculating section 16 and, if necessary, the output power calculating section 17, the monitoring section 18, the signal level adjusting section 15 and, if necessary, the multiplier 31 to the configuration of the conventional transmitter. Therefore, the transmitter of the present invention can use the equipment of the conventional transmitter as it is, and thus it has an advantage that the device cost can be reduced.

Moreover, till now, the transmitter of the third or fourth type is described as a transmitter which adjusts the signal level of the peak power-suppressed signal based on the mean input power before the peak power suppression (and, in some cases, the mean output power of the multicarrier after the peak power suppression) in the peak power suppressing section 11 (limiter) provided with respect to each carrier or the multicarrier. However, the present invention is not limited to the limiter. The present invention may be applied to a functional element which nonlinearly operates, that is, a circuit which operates in only a level lower than a predetermined level or a device which adjusts the signal level of output signal based on mean input power of sequential signals (and, in some cases, the mean output power of the multicarrier after the peak power suppression) of a nonlinear filter or the like.

The transmitter of the present invention described above sets the power level as the control object. That is, the transmitter performs the adjustment of the power level of each carrier or the multicarrier signal based on the power level of each carrier or the multicarrier signal. Alternatively, a voltage level may be set to the control object. In this case, the same advantages can also be obtained.

Further, the above-described transmitter of the present invention may be used as the transmitter 1 or 1' of the transmission amplifier of FIG. 6 or 18, and thus the multicarrier signal having the stable level is supplied from the transmitter 1 or 1'. Therefore, the generation of nonlinear distortion can be prevented through the amplification in the power amplifier 4. As a result, a high quality wireless communication can be realized.

Further, the transmitter of the present invention can change the configuration of the carrier code multiplexed signal generating section 10. Thus, the same advantages can be obtained in a wireless communication scheme other than the CDMA communication scheme (for example, TDMA (Time Division Multiple Access) or OFDM (Orthogonal Frequency Division Multiplexing)).

Further, the transmitter of the present invention can change the configuration of the carrier code multiplexed signal generating section 10, and thus it can be used for devices (for example, a relay station) other than the base station.

According to the present invention, there is the transmitter in which the peak suppressing section detects whether there exists the peak based on the level of the input signal and outputs the level-suppressed signal when the peak is detected. The input power calculating section calculates the level of the signal before it is inputted to the peak suppressing section. The output power calculating section calculates the level of the signal after it is outputted from the peak suppressing section. The adjusting unit controls the signal level of the output signal such that the signal level of the signal is adjusted based on the level calculated by the input power calculating section and the level calculated by the output power calculating section. Therefore, it has an advantage that the variation in level of the output signal can be suppressed according to the variation in level of the input signal.

According to the present invention, there is the transmitter which adjusts the signal level of the multicarrier signal obtained by combining multiple carriers. In the transmitter, the peak suppressing section detects whether there exists the peak based on the sum of power levels of the input carriers and outputs the power level-suppressed carriers when the peak is detected. The input power calculating section calculates the mean power level for each carrier before the power level suppression. The output power calculating section calculates the mean power level for each carrier after the power level suppression. The monitoring section outputs the level control information of the multicarrier signal based on the mean power level before the power level suppression and the mean power level after the power level suppression. The level adjusting section adjusts the level of the multicarrier signal. Therefore, it has an advantage that the variation in level of the multicarrier signal can be suppressed according to the variation in input level of each carrier.

According to the present invention, there is provided the transmitter which controls such that the signal level of the multicarrier signal obtained by combining the multiple carriers is adjusted. In the transmitter, the peak suppressing section detects whether there exists the peak based on the sum of the power levels of the input carriers, suppresses the power levels of the carrier when the peak is detected and outputs the power level-suppressed carriers. The input power calculating section calculates the mean power level for each carrier before the power level suppression. The output power calculating section calculates the mean power level for each carrier after the power level suppression. The monitoring section outputs the level control information of each carrier based on the mean power level before the power level suppression and the mean power level after the power level suppression. The level adjusting section adjusts the level of each carrier. Therefore, it has an advantage that the variation in level of the carrier after the power level suppression can be averagedly suppressed for each carrier according to the variation in input level of the carrier. As a result, it has an advantage that the variation in level of the multicarrier signal can be averagedly suppressed.

According to the present invention, there is provided the transmitter which adjusts the signal level of the multicarrier signal obtained by combining multiple carriers. In the transmitter, the peak suppressing section detects whether there exists the peak based on the sum of the power levels of the input carriers and outputs the power level-suppressed carriers when the peak is detected. The input power calculating section calculates the mean power level of the sum of the carriers before the power level suppression. The output power calculating section calculates the mean power level of the sum of the carriers after the power level suppression. The monitoring section outputs the level control information of the multicarrier signal based on the mean power level of the sum before the power level suppression and the mean power level of the sum after the power level suppression. The level adjusting section adjusts the level of the multicarrier signal. The level control of the multicarrier signal is performed from the mean power of the sum of the multiple carriers. Thus, it has an advantage that the variation in level of the multicarrier signal can be suppressed according to the variation in input level of each carrier.

According to the present invention, there is the transmitter which adjusts the signal level of the multicarrier signal obtained by combining the multiple carriers. In the transmitter, the peak suppressing section detects whether there exists the peak based on the power level of the input multicarrier signal, suppresses the power level of the multicarrier signal when the peak is detected and outputs the power level-suppressed multicarrier signal. The input power calculating section calculates the mean power level of the multicarrier signal before the power level suppression. The output power calculating section calculates the mean power level of the multicarrier signal after the power level suppression. The monitoring section outputs the level control information of the multicarrier signal based on the mean power level before the power level suppression and the mean power level after the power level suppression. The level adjusting section adjusts the level of the multicarrier signal. Therefore, it has an advantage that the variation in level after the peak suppression can be suppressed according to the variation in input level of the multicarrier.

INDUSTRIAL APPLICABILITY

The present invention is suitable for a transmitter which, for the multiple carriers, can averagedly suppress the variation in input level of the multicarrier signal to the amplifier according to variation in input level of each carrier.

The invention claimed is:

1. A transmitter for suppressing a variation in input level of a multicarrier signal obtained by combining multiple carriers, the transmitter comprising:
    a peak suppressing section for detecting whether there exists a peak by comparing a ratio between the instantaneous power and the mean power of the sum of power levels of inputted carriers with a predetermined peak factor threshold value and outputting the carriers the power levels of which are suppressed such that the power of each carrier after the combination becomes specified power by uniformly multiplying a multiplication factor corresponding to the sum of power levels for each carrier when the peak is detected;
    an input power calculating section for calculating a mean input power level for each carrier before the carriers are inputted to the peak suppressing section;
    an output power calculating section for calculating a mean output power level for each carrier after the carriers are outputted from the peak suppressing section;
    a monitoring section for determining a gain value based on the mean input power level calculated by the input power calculating section and the mean output power level calculated by the output power calculating section and outputting the gain value as level control information which controls the signal level of the multicarrier signal; and
    a level adjusting section for adjusting the level of the multicarrier signal based on the level control information outputted from the monitoring section.

2. A transmitter for suppressing a variation in input level of a multicarrier signal obtained by combining multiple carriers such that the signal level of the multicarrier signal is adjusted, the transmitter comprising:
    a peak suppressing section for detecting whether there exists a peak by comparing a ratio between the instantaneous power and the mean power of the sum of power levels of inputted carriers with a predetermined peak factor threshold value and outputting the carriers the power levels of which are suppressed such that the power of each carrier after the combination becomes specified power by uniformly multiplying a multiplication factor corresponding to the sum of power levels for each carrier when the peak is detected;
    an input power calculating section for calculating a mean input power level for each carrier before the carriers are inputted to the peak suppressing section;
    an output power calculating section for calculating a mean output power level for each carrier after the carriers are outputted from the peak suppressing section;
    a monitoring section for determining a gain value based on the mean input power level calculated by the input power calculating section and the mean output power level calculated by the output power calculating section for each carrier and outputting the gain value as level control information which controls the signal level of each carrier signal; and a level adjusting section for adjusting the level of each carrier based on the corresponding level control information for each carrier.

3. A transmitter for suppressing a variation in input level of a multicarrier signal obtained by combining multiple carriers, the transmitter comprising:

a peak suppressing section for detecting whether there exists a peak by comparing a ratio between the instantaneous power and the mean power of the sum of power levels of inputted carriers with a predetermined peak factor threshold value and outputting the carriers the power levels of which are suppressed such that the power of each carrier after the combination becomes specified power by uniformly multiplying a multiplication factor corresponding to the sum of power levels for each carrier when the peak is detected;

an input power calculating section for calculating a mean input power level of the sum for each carrier before the carriers are inputted to the peak suppressing section;

an output power calculating section for calculating a mean output power level of the sum for each carrier after the carriers are outputted from the peak suppressing section;

a monitoring section for determining a gain value based on the mean input power level of the sum calculated by the input power calculating section and the mean output power level of the sum calculated by the output power calculating section and outputting the gain value as level control information which controls the signal level of the multicarrier signal; and a level adjusting section for adjusting the level of the multicarrier signal based on the level control information outputted from the monitoring section.

4. A transmitter for suppressing a variation in input level of a multicarrier signal obtained by combining multiple carriers, the transmitter comprising:

a peak suppressing section for detecting whether there exists a peak by comparing a ratio between the instantaneous power and the mean power of a power level of the inputted multicarrier signal with a predetermined peak factor threshold value and outputting the multicarrier signal the power level of which is suppressed such that the power of multicarrier becomes specified power by multiplying a multiplication factor corresponding to the power level for multicarrier when the peak is detected;

an input power calculating section for calculating a mean input power level for the multicarrier signal before the multicarrier signal is inputted to the peak suppressing section;

an output power calculating section for calculating a mean output power level for the multicarrier signal outputted from the peak suppressing section;

a monitoring section for determining a gain value based on the mean input power level calculated by the input power calculating section and the mean output power level calculated by the output power calculating section and outputting the gain value as level control information which controls the signal level of the multicarrier signal; and a level adjusting section for adjusting the level of the multicarrier signal based on the level control information outputted from the monitoring section.

* * * * *